United States Patent
Takemura et al.

(10) Patent No.: US 7,006,953 B2
(45) Date of Patent: Feb. 28, 2006

(54) METHOD AND APPARATUS FOR PREDICTING THE LIFE OF A ROLLING BEARING, ROLLING BEARING SELECTION APPARATUS USING THE LIFE PREDICTION APPARATUS, AND STORAGE MEDIUM

(75) Inventors: Hiromichi Takemura, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 876 days.

(21) Appl. No.: 09/940,510

(22) Filed: Aug. 29, 2001

(65) Prior Publication Data

US 2002/0046012 A1 Apr. 18, 2002

(30) Foreign Application Priority Data

Aug. 29, 2000 (JP) .......................... P.2000-259767
Nov. 30, 2000 (JP) .......................... P.2000-364427

(51) Int. Cl.
*G06F 17/10* (2006.01)
*G06F 7/60* (2006.01)

(52) U.S. Cl. ............................................. 703/2; 703/7
(58) Field of Classification Search ................... 703/2, 703/7; 384/49–59, 91
See application file for complete search history.

(56) References Cited

U.S. PATENT DOCUMENTS

| | | | |
|---|---|---|---|
| 3,910,656 A * | 10/1975 | Price et al. .................. | 384/558 |
| 4,134,843 A * | 1/1979 | Rebuck et al. .............. | 508/136 |
| 4,326,953 A * | 4/1982 | Gibby et al. ................ | 210/168 |
| 4,438,203 A * | 3/1984 | Wohltjen et al. ............. | 436/60 |
| 4,991,442 A * | 2/1991 | Matsumoto ................... | 73/660 |
| 5,194,910 A * | 3/1993 | Kirkpatrick et al. .......... | 356/70 |
| 5,367,627 A | 11/1994 | Johnson | |
| 5,576,984 A * | 11/1996 | Cornejo .......................... | 703/7 |
| 5,920,491 A * | 7/1999 | Hibbitt et al. .................. | 703/7 |
| 6,023,574 A * | 2/2000 | Tangren .......................... | 703/7 |
| 6,072,481 A | 6/2000 | Matsushita et al. | |
| 6,080,199 A * | 6/2000 | Umeyama et al. .............. | 703/1 |
| 6,171,414 B1 * | 1/2001 | Mitamura et al. .......... | 148/333 |
| 6,208,953 B1 * | 3/2001 | Milek et al. .................... | 703/7 |
| 6,286,374 B1 * | 9/2001 | Kudo et al. ............... | 73/862.59 |
| 6,328,477 B1 * | 12/2001 | Tsujimoto et al. .......... | 384/450 |
| 6,342,109 B1 * | 1/2002 | Takemura et al. .......... | 148/319 |
| 6,375,593 B1 * | 4/2002 | Miyata et al. ................ | 476/40 |
| 6,378,382 B1 * | 4/2002 | Noguchi et al. ......... | 73/862.29 |

(Continued)

FOREIGN PATENT DOCUMENTS

WO   WO 99/45488 A1   9/1999

OTHER PUBLICATIONS

Mark M. Hodowanec, "Evaluation of Antifriction Bearing Lubrication Methods on Motor Life-Cycle Cost," IEEE Nov. 1999, pp. 1247-1251.*

(Continued)

*Primary Examiner*—Paul L. Rodriguez
*Assistant Examiner*—Dwin M. Craig
(74) *Attorney, Agent, or Firm*—Sughrue Mion, PLLC

(57) ABSTRACT

A dynamic equivalent load P is calculated from data information of a rolling bearing. Next, a reliability coefficient $a_1$ is determined, a lubrication parameter $a_L$ corresponding to a used lubricant is calculated, and a contamination degree coefficient $a_c$ is determined in consideration of a material coefficient. A fatigue limit load Pu is calculated on the basis of the data information. Thereafter, a load parameter $\{(P-Pu)/C\}\cdot 1/a_c$ is calculated. On the basis of the lubrication parameter $a_L$ and the load parameter $\{(P-Pu)/C\}\cdot 1/a_c$, a life correction coefficient $a_{NSK}$ is calculated with reference to a life correction coefficient calculation map. The bearing life $L_A$ is calculated by $L_A = a_1 \cdot a_{NSK} \cdot (C/P)^p$.

27 Claims, 33 Drawing Sheets

U.S. PATENT DOCUMENTS

| | | | |
|---|---|---|---|
| 6,401,058 B1 * | 6/2002 | Akalin et al. | 703/7 |
| 6,532,426 B1 * | 3/2003 | Hooks et al. | 702/81 |
| 6,571,632 B1 * | 6/2003 | Browner et al. | 73/593 |
| 6,763,285 B1 * | 7/2004 | Setiawan et al. | 700/279 |
| 6,763,312 B1 * | 7/2004 | Judd | 702/56 |

OTHER PUBLICATIONS

Mark M. Hodowanec, "Evaluation of Anti-Friction Bearing Lubrication Methods on Motor Life Cycle Cost" IEEE 1998, pp. 196-202.*

Raymond Ong, James Dymond, Raymond Findlay and Barna Szabados, Systematic Practicle Approach to the study of Bearing Damage in a Large Oil-Ring_Lubricated Induction Machine, IEEE Nov. 2000, pp. 1715-1724.*

Raymond Ong, J.H. Dymond, Raymond D. Findlay, "Bearing Damage Analysis in a Large Oil-Ring-Lubricated Induction Machine", IEEE Oct. 2000, pp. 1085-1091.*

Anonymous, "Selecting a better machine-tool bearing", Machine Design Aug. 21, 1997, pp. S52, S53, S58, S59, S62, S63, S68 and S69.*

Geoffrey H. Conroy, "Progress in Roller Press Design Technology", IEEE 1994, pp. 561-567.*

Anonymous, Wheel Bearings-from bicycles to supersonic cars, Industrial Lubrication and Tribology, Mar./Apr. 1995, pp. 12-20.*

Paul Dvorak, "Substituting springs for roller simply FEA bearing model" Machine Design, Apr. 8, 1999, p. 76.*

Joseph V. Poplawski, Erwin V. Zaretsky, Steven M. Peters, "Effect of Roller Profile on Cylindrical Roller Bearing Life Prediction", NASA/TM-2000-210368, Aug. 2000, pp. 1-26.*

T. E. Rook, R. Singh, "Structural Intensity Calculations for Compliant Plate-Beam Structures Connected Bearings", Journal of sound and vibration, 1998 Academic Press Limited, pp. 365-387.*

Tedric A. Harris, "Rolling Bearing Analysis" John Wiley & Sons, Inc. New York, 1966, Chapter 12 "Mechanics of Rolling Bearing Lubrication" pp. 298-330.*

H. Takemura, et al., "Development of a new life equation for ball and roller bearings", SAE Technical Paper Series, No. 2000-01-2601, Sep. 11, 2000, XP001202109.

H. Takata, et al., "Development of a new method for estimating the fatigue life of rolling bearings", ASME-STLE Tribology Conference, Oct. 1995, pp. 11-16, XP008034842.

E. Ionnides et al., "A New Fatigue Life Model For Rolling Bearings", Journal of Tribology, American Society Of Mechanical Engineers, New York, NY, vol. 107, Jul. 1985, pp. 367-378, XP002949481.

Jaideep Ahluwalia et al., "Computer-Aided Optimum Selection of Roller Bearings", Computer Aided Design, Elsevier Publishers BV., Barking, GB, vol. 25, No. 8, Aug. 1, 1993, pp. 493-499, XP000385103.

NSK Technical Journal; Y. Murakami, et al.; "Rolling Contact Fatigue Life Under Contaminated Lubrication With Several Foreign Paticles"; No. 655; pp. 17-24; (1993).

NSK Technical Journal; Y. Murakami, et al.; "Long Life Super TF & HI-TF Bearings Under Severe Lubrication Conditions"; No. 652; pp. 9-16; (1992).

ASTM STP 1195; Kyozaburo Furumura et al.; "The Development of Bearing Steels For Long Life Rolling Bearings Under Clean Lubrication and Contaminated Lubrication"; pp. 199-210; (1993).

Japan Tribology Conference; Nippon Seiko K.K. et al.; "Rolling Fatigue In a Low A Region"; (Osaka, Nov. 1997) pp. 324-326.

ASME transactions; Journal of Tribology; "A New Fatigue Life Model For Rolling Bearings"; vol. 107; Jul. 1985; pp. 367-378.

Beiblatt; DIN ISO 281; "Rolling Bearings"; Jan. 1993.

ActaPolytechnica, Mechanical Engineering; G. Lunberg et al.; "Dynamic Capacity Of Rolling Bearings"; 1947.

* cited by examiner

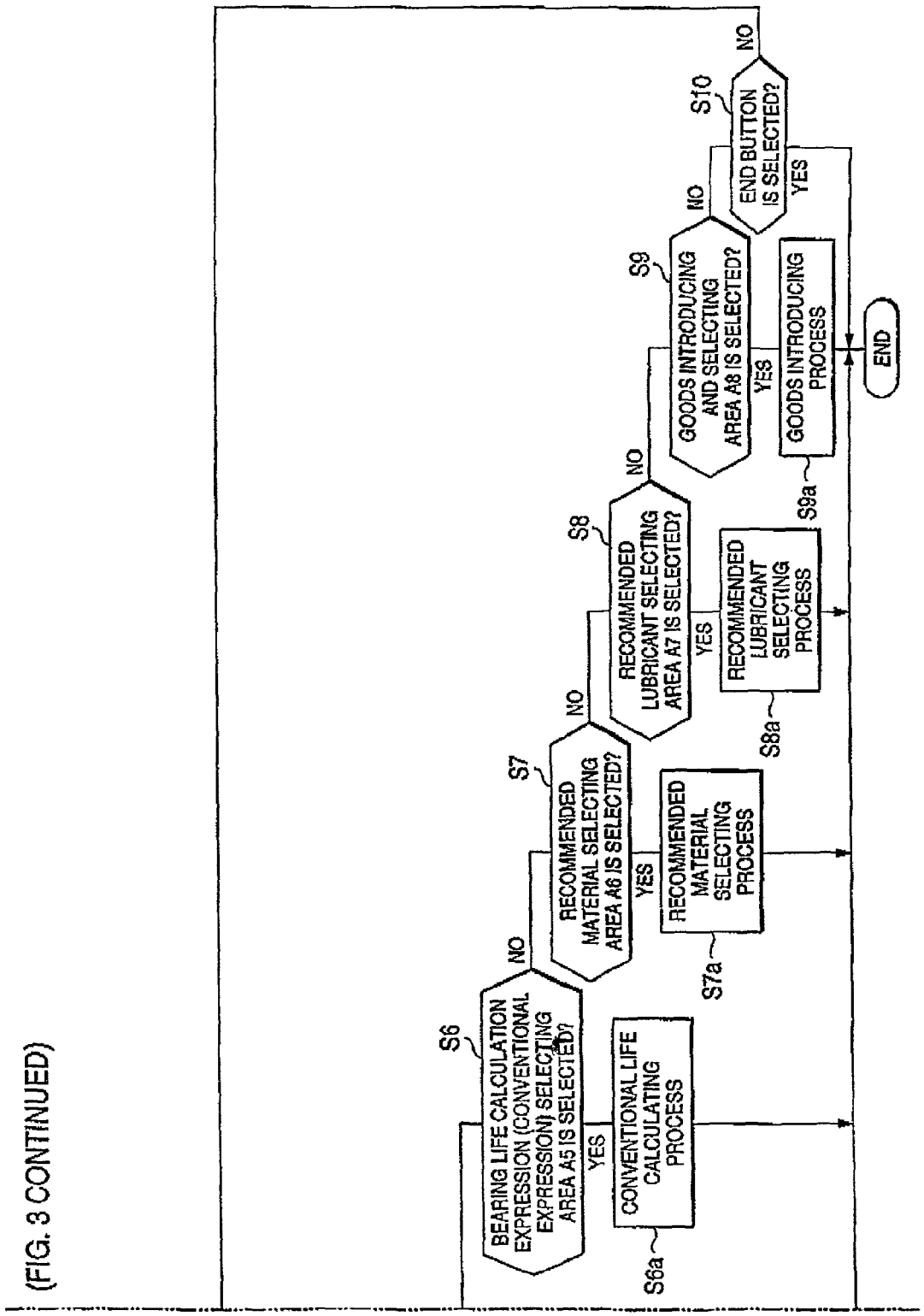
(FIG. 3 CONTINUED)

FIG. 7

BEARING TABLE

DEEP GROOVE BALL BEARING

DISPLAY AS DIAGRAM

| DESIGNATION NUMBER | PRINCIPAL DIMENSION (mm) | | | BASIC LOCAL RATING (N) | | FACTOR | ALLOWABLE ROTATION NUMBER (MIN⁻¹) | |
|---|---|---|---|---|---|---|---|---|
| | d | D | B | r | Cr | Cor | fo | GREASE | OIL |
| 6800 | 10 | 19 | 5 | 0.3 | 1720 | 840 | 14.8 | 34000 | 400 |
| 6800DD | 10 | 19 | 5 | 0.3 | 1720 | 840 | 14.8 | 24000 | |
| 6800VV | 10 | 19 | 5 | 0.3 | 1720 | 840 | 14.8 | 34000 | |
| 6800ZZ | 10 | 19 | 5 | 0.3 | 1720 | 840 | 14.8 | 34000 | 380 |
| 6900 | 10 | 22 | 6 | 0.3 | 2700 | 1270 | 14 | 32000 | |
| 6900DD | 10 | 22 | 6 | 0.3 | 2700 | 1270 | 14 | 22000 | 380 |
| 6900N | 10 | 22 | 6 | 0.3 | 2700 | 1270 | 14 | 32000 | |
| 6900NR | 10 | 22 | 6 | 0.3 | 2700 | 1270 | 14 | 32000 | 380 |
| 6900VV | 10 | 22 | 6 | 0.3 | 2700 | 1270 | 14 | 32000 | |
| 6900ZZ | 10 | 22 | 6 | 0.3 | 2700 | 1270 | 14 | 32000 | |
| 6000 | 10 | 26 | 8 | 0.3 | 4550 | 1970 | 12.4 | 30000 | 360 |
| 6000DDU | 10 | 26 | 8 | 0.3 | 4550 | 1970 | 12.4 | 22000 | |

- 31
- 32 CONVENTIONAL LIFE CALCULATION
- 33 NEW LIFE CALCULATION
- 34 DYNAMIC EQUIVALENT LOAD CALCULATION
- 35 RETURN
- 36 MENU
- 37 END

FIG. 10

DEFINITION OF LOAD FACTOR

USUALLY, A LOAD ACTING ON A BEARING IS CONFIGURED BY THE WEIGHT OF AN ARTICLE SUPPORTED BY THE BEARING, THE OWN WEIGHT OF A ROTATION MEMBER, AND LOADS WHICH ARE GENERATED BY TRANSMISSION FORCES OF GEARS AND BELTS, AND OPERATION OF A MACHINE. SUCH LOADS INCLUDE THOSE WHICH CAN BE THEORETICALLY CALCULATED, AND ALSO THOSE WHICH CAN BE HARDLY CALCULATED. IN MANY MACHINES, VIBRATIONS AND SHOCKS ARE CAUSED DURING OPERATION, AND HENCE IT IS DIFFICULT TO CORRECTLY OBTAIN ALL LOADS ACTING ON A BEARING. THEREFORE, AN ACTING LOAD MUST BE CONSIDERED WITH CORRECTING A CALCULATED LOAD BY A LOAD FACTOR (fw) WHICH IS EMPIRICALLY OBTAINED.

EVEN WHEN A RADIAL LOAD OR AN AXIAL LOAD IS OBTAINED BY CALCULATION, IT IS OFTEN THAT A LOAD WHICH IS ACTUALLY APPLIED TO A BEARING IS CAUSED TO BE LARGELY DIFFERENT FROM THE CALCULATED VALUE, BY VIBRATIONS AND SHOCKS OF A MACHINE.
THE LOADS ARE OBTAINED BY THE FOLLOWING EXPRESSIONS:

$$F_r = f_w \cdot F_{ro}$$
$$F_a = f_w \cdot F_{ao}$$

WHERE, $F_r, F_a$: LOAD (N) ACTING ON THE BEARING
$F_{ro}, F_{ao}$: THEORETICAL CALCULATED LOAD (N)
$f_w$: LOAD FACTOR

THE VALUE OF THE LOAD FACTOR fw IS SET IN CONSIDERATION OF THE TABLE BELOW.

| OPERATION CONDITION | OPERATION CONDITION | $f_w$ |
|---|---|---|
| SMOOTH SHOCKLESS OPERATION | ELECTRIC MOTOR, MACHINE TOOL, AIR CONDITIONER | 1～1.2 |
| ORDINARY OPERATION | AIR BLOWER, COMPRESSOR, ELEVATOR, CRANE, PAPER MACHINE | 1.2～1.5 |
| OPERATION INVOLVING SHOCKS AND VIBRATIONS | CONSTRUCTION MACHINE, CRUSHER, VIBRATING SIEVE, ROLLING MILL | 1.5～3 |

[CLOSE]

FIG. 19

DEFINITION OF CONTAMINATION DEGREE COEFFICIENT

WHEN A FOREIGN MATTER ENTERS A BEARING DURING OPERATION, AN IMPRESSION IS FORMED IN THE ROLLING FACE, AND STRESS CONCENTRATION IN AN IMPRESSED PORTION CAUSES FLAKING. IN THE NEW LIFE CALCULATION EXPRESSION, THE ENVIRONMENT STATE IS CLASSIFIED INTO FIVE STAGES OF APPLICATION EXAMPLES, AND THE CONTAMINATION DEGREE COEFFICIENT ($a_c$) IS DEFINED AS IN THE TABLE BELOW.

|  | VERY CLEAN | CLEAN | ORDINARY | CONTAMINATED | HEAVILY CONTAMINATED |
|---|---|---|---|---|---|
| $a_c$ | 1 | 0.8 | 0.5 | 0.4 – 0.1 | 0.05 |
| INDEX OF APPLICATION | FILTER MANAGEMENT OF 10μm OR SMALLER | FILTER MANAGEMENT OF 10 – 30μm | FILTER MANAGEMENT OF 30 – 100μm | FILTER LARGER THAN 100μm OR WITHOUT FILTER MANAGEMENT (DIP-FEED, CIRCULATING OIL FEED, ETC.) | WITHOUT FILTER, CONTAMINATED WITH LARGE AMOUNT OF DUST |
| EXAMPLE OF APPLICATION | •SEALED GREASED BEARING FOR ELECTRICAL APPLIANCE, INFORMATION, ETC. | •SEALED GREASED BEARING FOR MOTOR •SEALED GREASED BEARING FOR RAILCAR •SEALED GREASED BEARING FOR MACHINE TOOL, ETC. | •ORDINARY USE •OPEN TYPE GREASED BEARING, ETC. | •FOR TRANSMISSION OF AUTOMOBILE •FOR HUB OF AUTOMOBILE •FOR REDUCTION GEAR •FOR CONSTRUCTION MACHINERY, ETC. | |

CLOSE

FIG. 22

CALCULATION OF FATIGUE LIMIT LOAD (Pu)

IN THE CONVENTIONAL ROLLING BEARING CALCULATION EXPRESSION (ISO-281: 1990), THE CONCEPT OF A FATIGUE LIMIT IS NOT CONSIDERED. IN ENDURANCE TESTS CONDUCTED BY US, SOME BEARINGS UNDER A CLEAN AND LOW-LOAD SERVICE ENVIRONMENT HAVE A LIFE WHICH IS LONGER BY 50 OR MORE TIMES THAN THAT CALCULATED BY THE CONVENTIONAL LIFE CALCULATION EXPRESSION, AND CONTINUE TO OPERATE FOR 20 OR MORE YEARS WITHOUT CAUSING FLAKING. UNDER A SERVICE ENVIRONMENT IN WHICH THE TEMPERATURE RISE IS SUPPRESSED, THE CLEANNESS IS RELATIVELY HIGH, AND THE LOAD IS LOW, MOREOVER, SOME BEARINGS FOR A MACHINE TOOL HAVE ACTUALLY ATTAINED A LIFE WHICH IS LONGER BY 80 OR MORE TIMES THAN THAT CALCULATED BY THE LIFE CONVENTIONAL CALCULATION EXPRESSION.

THE ABOVE PHENOMENA SUGGEST THAT, AS SHOWN IN THE FIGURE BELOW, THE FATIGUE LIMIT LOAD (Pu) AFFECTS THE ROLLING FATIGUE LIFE. THE FATIGUE LIMIT LOAD IS DEFINED AS AN EQUIVALENT LOAD AT THE MAXIMUM CONTACT SURFACE PRESSURE $P_{max}$ =1.5GPa WHICH IS GENERATED WHEN A ROLLING ELEMENT AND THE BEARING RING ARE CONTACTED WITH EACH OTHER UNDER A CLEAN AND IDEAL STATE.

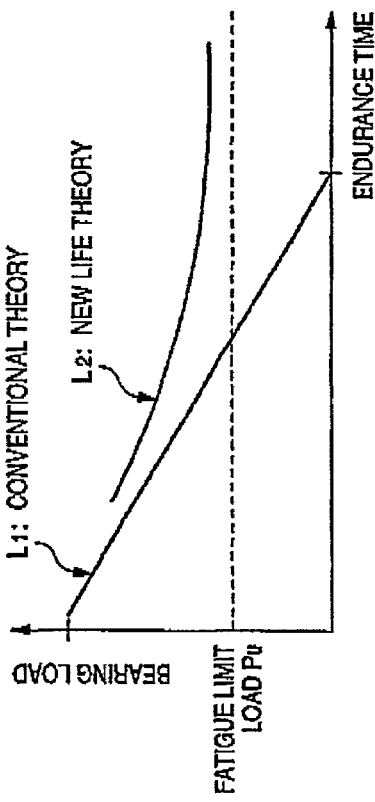

L1: CONVENTIONAL THEORY
L2: NEW LIFE THEORY

BEARING LOAD
FATIGUE LIMIT LOAD Pu
ENDURANCE TIME

CLOSE

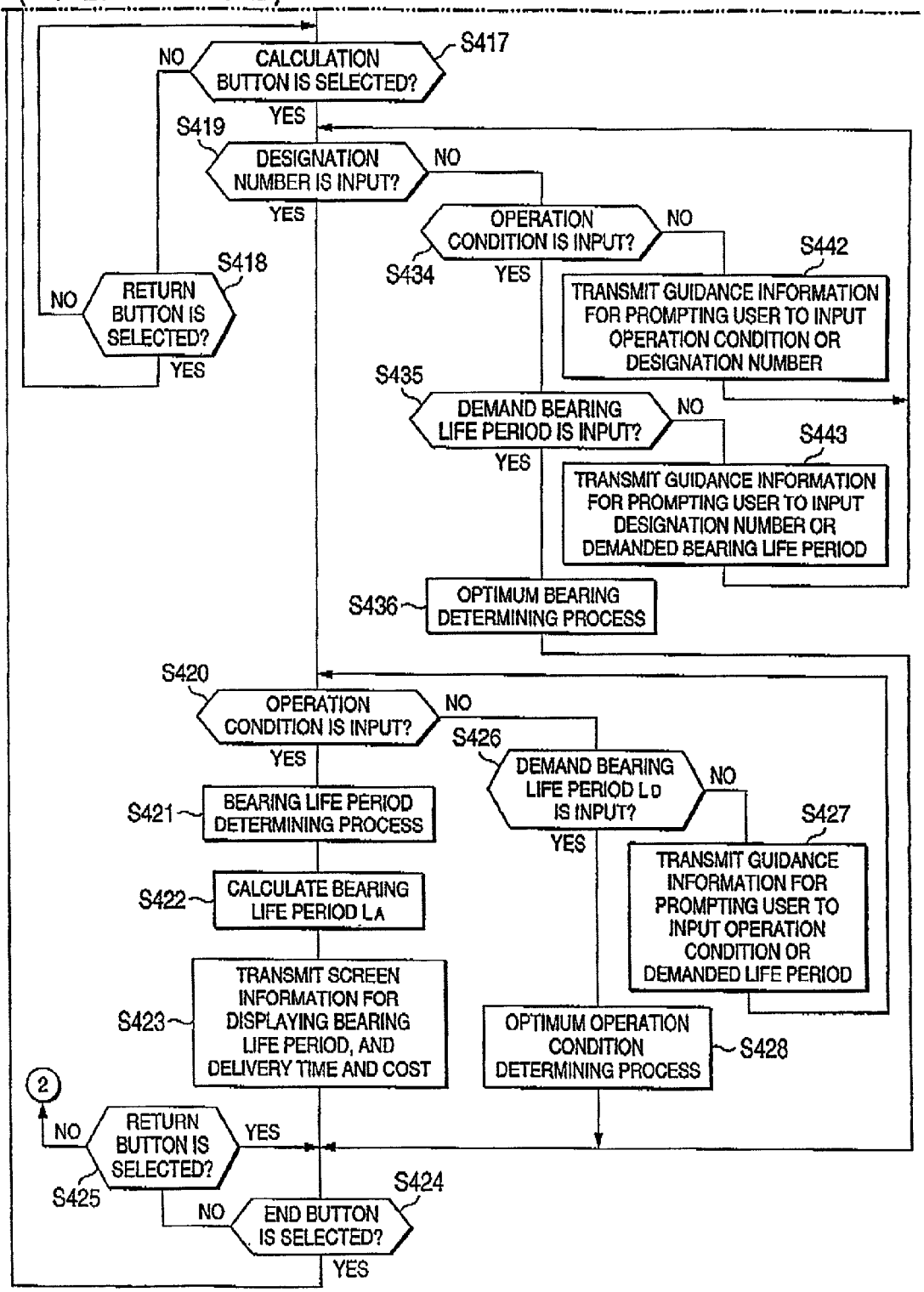

METHOD AND APPARATUS FOR PREDICTING THE LIFE OF A ROLLING BEARING, ROLLING BEARING SELECTION APPARATUS USING THE LIFE PREDICTION APPARATUS, AND STORAGE MEDIUM

BACKGROUND OF THE INVENTION

1. Field of the Invention

The present invention relates to a method and an apparatus which can correctly predict the life of a rolling bearing having a specification that enables the basic dynamic load rating and the basic static load rating to being calculable, a rolling bearing selection apparatus using the life prediction apparatus, and a storage medium storing a program for life prediction.

2. Description of the Related Art

The basic rating life $L_{10}$ of a rolling bearing is defined in JIS B1518: 1992, and usually calculated by the following expression:

$$L_{10} = (C/P)^p \tag{1}$$

where C is a basic dynamic load rating of the rolling bearing, P is a dynamic equivalent load which acts on the bearing, and p indicates a load index that is set to p=3 in the case of a ball bearing, and to p=10/3 in the case of a roller bearing. The basic rating life $L_{10}$ indicates the life in the case where the reliability is 90%, usual materials are used, and the bearing is produced with a usual production quality and used under normal service condition.

By contrast, a corrected rating life $L_{na}$ with respect to a reliability (100−n)% in the case where the failure probability is n%, special bearing characteristics, and specific service condition is given by the following expression:

$$L_{na} = a_1 \cdot a_2 \cdot a_3 \cdot L_{10} \tag{2}$$

where $a_1$ is a reliability coefficient which is listed in Table 1 below, and which has a smaller value as the reliability is higher.

TABLE 1

| Reliability % | $L_{na}$ | $a_1$ |
|---|---|---|
| 90 | $L_{10a}$ | 1 |
| 95 | $L_{5a}$ | 0.62 |
| 96 | $L_{4a}$ | 0.53 |
| 97 | $L_{3a}$ | 0.44 |
| 98 | $L_{2a}$ | 0.33 |
| 99 | $L_{1a}$ | 0.21 |

Moreover, $a_2$ is a bearing characteristic coefficient which is used for correcting extension of the fatigue life due to improvement of materials. The coefficient is usually set to 1.0. When vacuum degassed bearing steel is used, the coefficient is set to 1.0 or more, and, when high cleanness steel is used, the coefficient has a larger value. The coefficient $a_3$ is a service condition coefficient which is used for correcting influence on the lubrication condition, and, when a sufficient oil film thickness is expected, $a_3 \geq 1$ is set. By contrast, $a_3 < 1$ is set when the viscosity of the lubricating oil in an oil contacting portion is excessively low, when the peripheral speed of a rolling element is very low, when the bearing temperature is high, or when a foreign material or water enters a lubricant.

In the related art example, correction to which the reliability, the bearing characteristics, and the service condition are added is performed on the basic rating life $L_{10}$ of expression (1), whereby the accuracy of the prediction of the life of a rolling bearing can be improved. In the corrected rating life $L_{na}$, however, it is difficult to quantify the bearing characteristic coefficient $a_2$ and the service condition coefficient $a_3$, and particularly the degree of determining the service condition coefficient $a_3$ is insufficient. Consequently, there arises a problem in that the basic dynamic rating life is dispersed. Therefore, it may be contemplated to handle $a_2 \times a_3$ as a single value. In this case, under usual lubrication condition, $a_2 \times a_3 = 1$ is set, and, when the viscosity of the lubricant is excessively low, the value is so small as that $a_2 \times a_3 =$ about 0.2. When the bearing is not inclined and the film thickness of the lubricating oil is sufficient at the operating temperature, $a_2 \times a_3 = 2$ may be employed. In this way, the product of the bearing characteristic coefficient $a_2$ and the service condition coefficient $a_3$ is varied in the range of 0.2 to 2.0, so that the life is changed ten times simply by the product of the coefficients. As a result, there is an unsolved problem in which the life prediction cannot be correctly performed.

As described in NSK Technical Journal (No. 655 (1993), pp. 17–24, FIG. 9), it is reported that dispersion of the actual bearing life $L_{10}$ is very large. Namely, the actual bearing life is about twenty times the calculated life according to JIS in the case of super clean (using a two-stage filter), is substantially equal to the calculated life according to JIS in the case of mild contamination, and is about 1/7 to 1/25 of the calculated life according to JIS in the case of severe contamination. Therefore, it is very difficult to predict the life of an actual rolling bearing, and life prediction cannot be correctly performed.

As described in a report by Furumura, Murakami, Abe, et al. (ASTM STP 1195, J, JC. Hoo, Ed., 1993, pp. 199–210), depending on the cleanness of a material, the butterfly occurrence limit serving as an index indicating the rolling fatigue limit is varied, and, as compared with the occurrence limit of a material S (NSK standard material) which is at a contact surface pressure=1,850 MPa, the butterfly occurrence limit of a material L of lower cleanness is 1,100 MPa. With respect to a usual bearing material, when the contact surface pressure is 1,500 MPa or lower on the safe side in the case where a bearing is used under clean lubrication and ideal condition, the dynamic equivalent load at which peeling does not occur even after the number of repeated stresses reaches $10^{11}$ cycles can be considered as a fatigue limit load Pu.

As described in Proceedings of Japan Tribology Conference (Osaka, 1997-11, pp. 324–326), when an oil film parameter $\Lambda [= h_{min}/\sqrt{(h_{r1}^2 - h_{r2}^2)}$ where $h_{r1}$ and $h_{r2}$: mean square roughnesses of two contacting faces, and $h_{min}$: the minimum thickness of EHL oil film] serving as an index indicating lubrication condition is small (for example, $\Lambda < 3$), the life is sometimes shortened to about 1/10 of that in the case where the oil film is sufficient, and sometimes not shortened. Therefore, an index indicating lubrication condition must be expressed not by the oil film parameter $\Lambda$, but by another parameter.

SUMMARY OF THE INVENTION

The invention has been conducted in view of the unsolved problems of the related art example. It is an object of the invention to provide a method and apparatus for predicting the life of a rolling bearing in which the life of the rolling bearing can be accurately predicted while input condition is simplified.

In order to attain the object, the method of predicting a life of a rolling bearing according to a first aspect of the invention is a method of predicting a life of a rolling bearing in which a life of a rolling bearing having a specification which enables a basic dynamic load rating C and a basic static load rating $C_0$ to being calculable is predicted, wherein, when an equivalent load is P, a load index is p, a viscosity ratio of a lubricant is $\kappa$, a contamination degree coefficient is $a_c$, a fatigue limit load is Pu, and a life correction coefficient is $a_{NSK}$, a corrected rating life $L_A$ of the rolling bearing at a certain reliability coefficient $a_1$ is calculated by:

$$L_A = a_1 \cdot a_{NSK} \cdot (C/P)^p$$

$$a_{NSK} \propto f[F(\kappa), \{(P-Pu)/C\} \cdot 1/a_c].$$

The corrected rating life $L_A$ is calculated by the above expression because of the following reason.

The expression of calculating the life of a rolling bearing originates in the basic concept indicated in expression (3) below, as made public by Lundberg, G and Palmgren, A in 1947 in Acta Polytechnica, Mechanical Engineering of Basic Engineering, 82, pp. 309–320 as "Dynamic Capacity of Rolling Bearings."

[Ex. 1]

$$\ln\frac{1}{S} \propto \frac{\tau_0^c \cdot N^e \cdot V}{z_0^h} \quad (3)$$

In the above expression, S is the residual ratio, $\tau_0$ is the maximum shearing stress, $z_0$ is the depth where $\tau_0$ occurs, N is the number of repeated stresses at which peeling is caused, V is the stress volume (the volume under a contacting face on which stress acts), and c, h, and e are constants.

As a concept developed from expression (3) above, Ioannieds, E, Harris, T, et al. introduced the concept of a fatigue limit load into an expression of calculating the life of a rolling bearing, and reported expression (4) below in ASME transactions, Journal of Tribology, Vol. 107, pp. 367–378 as "A New fatigue life model for rolling bearings."

[Ex. 2]

$$\ln\frac{1}{S} \propto N^e \int_v \frac{(\tau - \tau_u)^c}{z_0^h} V \quad (4)$$

where $\tau_u$ indicates the fatigue limit shearing stress which relates to the cleanness of a material of the bearing and heat treatment.

With respect to the concept of the peeling life of a bearing, expression (4) above follows the concept of internal origins, and hence has a problem in that the expression is insufficient as compared with an expression in which the mode of surface origin peeling is considered. In the invention, therefore, expression (5) below into which the contamination degree coefficient $a_c$ and the lubrication parameter $a_L$ are newly incorporated as lubrication environment is considered as an expression indicating the mode of surface origin peeling.

[Ex. 3]

$$\ln\frac{1}{S} \propto N^e \int_v \frac{(\tau - \tau_u)^c}{z_0^h} V \times \left(\frac{1}{f(a_c, a_L)} - 1\right) \quad (5)$$

In the invention, in order to correctly predict the life of a rolling bearing, therefore, the following expression (6) is considered in which expression (4) above indicating the internal origin peeling, and expression (5) above indicating the surface origin peeling are combined with each other.

[Ex. 4]

$$\ln\frac{1}{S} \propto N^e \int_v \frac{(\tau - \tau_u)^c}{z_0^h} V \times \left(\frac{1}{f(a_c, a_L)}\right) \quad (6)$$

When expression (6) above is expanded, an expression which can correctly predict the life of a bearing is obtained as follows:

$$L_A = a_1 \cdot a_{NSK} \cdot (C/P)^p \quad (7)$$

$$a_{NSK} \propto f[F(\kappa), \{(P-Pu)/C\} \cdot 1/a_c] \quad (8)$$

In this way, it has been found that the life correction coefficient $a_{NSK}$ is a function of the lubrication parameter $a_L$ and the load parameter $\{(P-Pu)/C\} \cdot 1/a_c$.

The method of predicting a life of a rolling bearing according to a second aspect of the invention is characterized in that, in the first aspect of the invention, a material coefficient $a_m$ is applied to the contamination degree coefficient $a_c$ as a degree of influence of steel at which the life can be prolonged by a component of the steel and a heat treatment, and the contamination degree coefficient $a_c$ is calculated by:

$$a_c = g(a_m, a_c).$$

In the second aspect of the invention, the material coefficient $a_m$ is applied to the contamination degree coefficient $a_c$ as a degree of influence of steel at which the life can be prolonged by a component of the steel and a heat treatment, and the contamination degree coefficient is calculated in consideration of the material coefficient $a_m$, whereby a more correct contamination degree coefficient $a_c$ can be obtained.

The method of predicting a life of a rolling bearing according to a third aspect of the invention is characterized in that, in the first or second aspect of the invention, a function $F(\kappa)$ of the viscosity ratio $\kappa$ is set as a lubrication parameter $a_L$, and the life correction coefficient $a_{NSK}$ is calculated on the basis of the lubrication parameter $a_L$ and a load parameter $\{(P-Pu)/C\} \cdot 1/a_c$.

In the third aspect of the invention, since the life correction coefficient $a_{NSK}$ is calculated on the basis of the lubrication parameter $a_L$ and the load parameter, it is possible to calculate the life correction coefficient $a_{NSK}$ in which the mode of surface origin peeling is considered.

The apparatus for predicting a life of a rolling bearing according to a fourth aspect of the invention is an apparatus for predicting a life of a rolling bearing in which a life of a rolling bearing having a specification which enables a basic dynamic load rating C and a basic static load rating $C_0$ to being calculable is predicted, wherein the apparatus comprises: data information inputting means for inputting data information including the basic dynamic load rating C and the basic static load rating $C_0$ of the rolling bearing; dynamic equivalent load calculating means for calculating a dynamic equivalent load on the basis of the data information input by the data information inputting means; reliability setting means for setting a reliability coefficient; lubrication parameter calculating means for calculating a lubrication parameter on the basis of the data information; contamination degree setting means for setting a contamination degree; fatigue limit load calculating means for calculating a fatigue limit load; load parameter determining means for determining a load parameter on the basis of the basic dynamic load, the dynamic equivalent load, the fatigue limit load, and the degree of contamination; life correction coefficient setting means for setting a life correction coefficient on the basis of the lubrication parameter and the load parameter; and bearing life calculating means for calculating the life of the bearing on the basis of the reliability coefficient, the life correction coefficient, the basic dynamic load rating, the dynamic equivalent load, and a load index.

In the fourth aspect of the invention, the data information inputting means inputs data information, the reliability setting means sets the reliability coefficient $a_1$, and the contamination degree setting means sets the contamination degree, thereby enabling the lubrication parameter calculating means to calculate the lubrication parameter $a_L$ (=F($\kappa$)); the fatigue limit load calculating means calculates the fatigue limit load, and the load parameter determining means calculates the load parameter $\{(P-Pu)/C\} \cdot 1/a_c$, thereby enabling the life correction coefficient setting means to perform the calculation of expression (8) above to set the life correction coefficient $a_{NSK}$; and the calculation of expression (7) above is performed to calculate the bearing life $L_A$, on the basis of the life correction coefficient $a_{NSK}$, the reliability coefficient $a_1$, the basic dynamic load rating C, the dynamic equivalent load P, the fatigue limit load Pu, and the load index p.

The apparatus for predicting a life of a rolling bearing according to a fifth aspect of the invention is an apparatus for predicting a life of a rolling bearing in which a life of a rolling bearing having a specification which enables a basic dynamic load rating C and a basic static load rating $C_0$ to being calculable is predicted, wherein the apparatus comprises: data information inputting means for inputting data information including the basic dynamic load rating C and the basic static load rating $C_0$ of the rolling bearing; dynamic equivalent load calculating means for calculating a dynamic equivalent load on the basis of the data information input by the data information inputting means; reliability setting means for setting a reliability coefficient; lubrication parameter calculating means for calculating a lubrication parameter on the basis of the data information; contamination degree setting means for setting a contamination degree; fatigue limit load calculating means for calculating a fatigue limit load; load parameter determining means for determining a load parameter on the basis of the basic dynamic load, the dynamic equivalent load, the fatigue limit load, and the degree of contamination; life correction coefficient setting means for setting a life correction coefficient on the basis of the lubrication parameter and the load parameter; bearing life calculating means for calculating the life of the bearing on the basis of the reliability coefficient, the life correction coefficient, the basic dynamic load rating, the dynamic equivalent load, and a load index; and recalculation judging means for judging whether, when a calculation result of the bearing life calculating means fails to coincide with a desired life, a recalculation for making the calculation result coincident with the desired life is required or not.

In the fifth aspect of the invention, in addition to the functions of the above-mentioned fourth aspect of the invention, the followings are attained. When a calculation result of the bearing life calculating means fails to coincide with a desired life, the recalculation judging means judges whether a recalculation for satisfying the desired life is required or not. If the recalculation is required, one of the followings is selected, namely, the rolling bearing is changed to one of a larger rating number, the material is changed to one of a lower contamination degree, or the viscosity of the lubricant is set to be higher, and then the recalculation is performed to determine a rolling bearing which satisfies the desired life.

The apparatus for predicting a life of a rolling bearing according to a sixth aspect of the invention is characterized in that, in the fourth or fifth aspect of the invention, the contamination degree setting means sets a contamination degree coefficient in which a material coefficient serving as a degree of influence of steel at which the life can be prolonged by a component of the steel and a heat treatment.

In the sixth aspect of the invention, in the same manner as the above-mentioned second aspect of the invention, the contamination degree coefficient is calculated in consideration of the material coefficient $a_m$ serving as a degree of influence of steel at which the life can be prolonged by a component of the steel and a heat treatment, whereby a more correct contamination degree coefficient $a_c$ can be obtained.

The apparatus for predicting a life of a rolling bearing according to a seventh aspect of the invention is characterized in that, in one of the fourth to sixth aspects of the invention, the lubrication parameter calculating means calculates a viscosity ratio $\kappa$ which is a ratio of a kinematic viscosity $\nu$ of a used lubricant at an operating temperature to a required viscosity $\nu_1$ at the operating temperature, from an operating kinematic viscosity $\nu$ of the used lubricant, a mean diameter dm of the bearing, and a rotation number N of the bearing.

In the seventh aspect of the invention, the viscosity ratio $\kappa$ which is a ratio of the kinematic viscosity $\nu$ of a used lubricant to the required viscosity $\nu_1$ at the operating temperature is applied as the lubrication parameter, whereby the oil film thickness in an operating state of the rolling bearing can be considered. As the viscosity ratio $\kappa$ is larger, the lubrication state is more excellent, and the bearing life is further improved, and, as the viscosity ratio $\kappa$ is smaller, the lubrication state is worse, and the bearing life is further impaired.

The apparatus for predicting a life of a rolling bearing according to an eighth aspect of the invention is characterized in that, in one of the fourth to seventh aspects of the invention, the life correction coefficient calculating means calculates the life correction coefficient on the basis of the load parameter and the lubrication parameter and with reference to a life correction coefficient calculation map which indicates relationships among values of the parameters and the life correction coefficient with using the lubrication parameter as a parameter.

In the eighth aspect of the invention, the life correction coefficient calculation map which is previously stored is referred on the basis of the load parameter and the lubrication parameter, so that the life correction coefficient can be easily calculated.

The apparatus for predicting a life of a rolling bearing according to a ninth aspect of the invention is characterized in that, in one of the fourth to eighth aspects of the invention, the apparatus further comprises exhibiting means for exhibiting the life of the bearing which is calculated by the bearing life calculating means.

In the ninth aspect of the invention, the life prediction of a rolling bearing according to the user specification which is calculated by the bearing life calculating means is exhibited, whereby the user is enabled to easily know it. For example, a parametric indication may be performed in which, as the abscissa parameter, the bearing size, the bearing load, the rotation number, the kind of the lubricant, the contamination degree, the service temperature, the material kind, and the reliability coefficient may be set, and the value of the bearing life may be set as the ordinate. On the basis of these data, the bearing designation number which is seemed to be optimum, and the service condition which is optimum for the user may be exhibited in the form of a diagram or a table in a parametric manner.

The rolling bearing selection apparatus using an apparatus for predicting a life of a rolling bearing apparatus according to a tenth aspect of the invention comprises: bearing kind inputting means for inputting a bearing kind which is desired by a user; data information inputting means for inputting necessary data information other than required data information required by the user, from necessary data information including the basic dynamic load rating C and the basic static load rating $C_0$ of the rolling bearing; data information assuming means for comparing the required data information which is input by the data information inputting means with the necessary data information to assume data information which is not input; the apparatus for predicting a life of a rolling bearing according to the fourth aspect which performs calculation of predicting the bearing life on the basis of the data information which is input by the data information inputting means and the data information which is assumed by the data information assuming means; judging means for judging whether a calculation result of the apparatus for predicting a life of a rolling bearing satisfies the data information which is input by the data information inputting means or not; data information exhibiting means for, when a judgement result of the judging means indicates that the calculation result satisfies the data information, exhibiting the data information which is set by the data information assuming means; and recalculating means for, when the judgement result of the judging means indicates that the calculation result does not satisfy the data information, changing the data information which is assumed by the data information assuming means, and causing the apparatus for predicting a life of a rolling bearing to again perform the calculation.

In the tenth aspect of the invention, the type of a bearing such as a ball bearing, a roller bearing, a radial bearing, or a thrust bearing is input in the bearing kind inputting means, and, when the user wishes to know one of the optimum bearing, the optimum operation condition, and the predicted life period, the other two of the required data information are input in the data information inputting means. The data information assuming means assumes the one of the optimum bearing, the optimum operation condition, and the predicted life period which is to be known. Then, the life predicting calculation according to the fifth aspect of the invention is performed on the basis of the data information and the assumed information. When the optimum operation condition is to be known, for example, the name of a bearing to be used, and a required life period are input. As operation condition, the load acting on the bearing, the rotation number of the bearing, the operating temperature, the kind of the lubricant, the contamination degree of the bearing, and the kind of the bearing material are assumed, and the life predicting calculation is then performed. When the predicted life period does not satisfy the required life period, the life predicting calculation is further performed while changing the data information which is assumed by the data information assuming means. When the life predicting calculation satisfying the required life period is performed, the operation condition at this time is exhibited as the optimum operation condition by the data information exhibiting means.

The rolling bearing selection apparatus according to an eleventh aspect of the invention is characterized in that, in the tenth aspect of the invention, the data information inputting means, the data information assuming means, the apparatus for predicting a life of a rolling bearing, the judging means, the data information exhibiting means, and the recalculating means are accessible through an Internet.

In the eleventh aspect of the invention, the user accesses through the Internet the data information inputting means, the data information assuming means, the apparatus for predicting a life of a rolling bearing, the judging means, the data information exhibiting means, and the recalculating means, so that one of the optimum bearing, the optimum operation condition, and the predicted life period can be easily selected through an information terminal owned by the user.

The rolling bearing selection apparatus according to a twelfth aspect of the invention is characterized in that, in the eleventh aspect of the invention, the rolling bearing selection apparatus further comprises user registration accepting means for accepting user registration through the Internet, and only a user who is registered in the user registration accepting means is allowed to access the data information inputting means, the data information assuming means, the apparatus for predicting a life of a rolling bearing, the judging means, the data information exhibiting means, and the recalculating means, through the Internet.

In the twelfth aspect of the invention, only a user who is registered as a user in the user registration accepting means is allowed to select one of the optimum bearing, the optimum operation condition, and the predicted life period through the Internet. Therefore, the user information can be obtained by the user registration accepting means.

The rolling bearing selection apparatus according to a thirteenth aspect of the invention is characterized in that, in the tenth or eleventh aspect of the invention, a language which is handled in the data information inputting means, the data information assuming means, the apparatus for predicting a life of a rolling bearing, the judging means, the data information exhibiting means, and the recalculating means is selectable.

In the thirteenth aspect of the invention, since the language which is handled in the data information inputting means, the data information assuming means, the apparatus for predicting a life of a rolling bearing, the judging means, the data information exhibiting means, the recalculating means is selectable, any language such as Japanese, English, German, or French can be selected, so that a rolling bearing can be selected with using a language desired by the user.

The rolling bearing selection apparatus according to a fourteen aspect of the invention is characterized in that, in one of the tenth to thirteenth aspects of the invention, the data information exhibiting means performs one of exhibition of prediction of the life of the rolling bearing, exhibition of an optimum bearing, and exhibition of optimum service condition.

In the fourteenth aspect of the invention, one of prediction of the life of the rolling bearing, an optimum bearing, and optimum service condition which one is desired by the user can be properly exhibited.

The rolling bearing selection apparatus according to a fifteenth aspect of the invention is characterized in that, in one of the tenth to thirteenth aspects of the invention, the data information exhibiting means exhibits one of prediction of the life of the rolling bearing, an optimum bearing, and optimum service condition, as image information in which a parameter is changeable.

In the fifteenth aspect of the invention, when the service condition of the bearing is to be exhibited, for example, it is possible to display a predicted value of the life in the case where the contamination degree serving as a parameter is changed, in the form of a graph or a table in which the abscissa indicates the contamination degree coefficient, and the ordinate indicates the predicted value of the life. Therefore, the limit values of the optimum bearing, the optimum operation condition, and the predicted life period can be visually recognized in an easy manner.

The rolling bearing selection apparatus according to a sixteenth aspect of the invention is characterized in that, in the fifteenth aspect of the invention, the image information is displayed as a characteristic diagram in which one axis indicates a predicted value of the life, and another axis indicates one selected from a bearing size, a bearing load, a rotation speed, a kind of a lubricant, a degree of contamination, a service temperature, a material kind, a reliability coefficient, and the like.

In the sixteenth aspect of the invention, since the predicted value of the life and other condition which are indicated as the ordinate and the abscissa are shown in the form of a graph, the limit values can be visually recognized in an easier manner.

The rolling bearing selection apparatus according to a seventeenth aspect of the invention is characterized in that, in one of the tenth to sixteenth aspects of the invention, the apparatus further comprises delivery information exhibiting means for exhibiting at least one of a delivery time and an estimated amount of the rolling bearing based on the data information exhibited by the data information exhibiting means.

In the seventeenth aspect of the invention, when the optimum bearing, the optimum operation condition, and the predicted life period are exhibited by the data information exhibiting means, it is possible to exhibit the delivery time and the estimated amount of the corresponding bearing. Therefore, the user is not required to again request the exhibition of the delivery time and the estimated amount.

The storage medium according to an eighteenth aspect of the invention is a storage medium storing a life prediction program for predicting a life of a rolling bearing, the rolling bearing having a specification which enables a basic dynamic load rating C and a basic static load rating $C_0$ to being calculable, wherein the program executes steps of: inputting data information including the basic dynamic load rating C and the basic static load rating $C_0$ of the rolling bearing; calculating a dynamic equivalent load on the basis of the data information which is input in the data information inputting step; setting a reliability coefficient; calculating a lubrication parameter on the basis of the data information; setting a contamination degree; calculating a fatigue limit load; determining a load parameter on the basis of the basic dynamic load, the dynamic equivalent load, the fatigue limit load, and the contamination degree; setting a life correction coefficient on the basis of the lubrication parameter and the load parameter; and calculating the life of the bearing on the basis of the reliability coefficient, the life correction coefficient, the basic dynamic load rating, the dynamic equivalent load, and a load index.

The storage medium according to a nineteenth aspect of the invention is a storage medium storing a life prediction program for predicting a life of a rolling bearing, the rolling bearing having a specification which enables a basic dynamic load rating C and a basic static load rating $C_0$ to being calculable, wherein the program executes steps of: inputting data information including the basic dynamic load rating C and the basic static load rating $C_0$ of the rolling bearing; calculating a dynamic equivalent load on the basis of the data information which is input in the data information inputting step; setting a reliability coefficient; calculating a lubrication parameter on the basis of the data information; setting a contamination degree; calculating a fatigue limit load; determining a load parameter on the basis of the basic dynamic load, the dynamic equivalent load, the fatigue limit load, and the contamination degree; setting a life correction coefficient on the basis of the lubrication parameter and the load parameter; calculating the life of the bearing on the basis of the reliability coefficient, the life correction coefficient, the basic dynamic load rating, the dynamic equivalent load, and a load index; and judging whether, when a calculation result of the bearing life fails to coincide with a desired life, a recalculation for making the calculation result coincident with the desired life is required or not.

The storage medium according to a twentieth aspect of the invention is a storage medium storing a bearing selection program for selecting a rolling bearing according to a specification required by a user, wherein the program executes steps of: inputting a bearing kind which is desired by the user; inputting necessary data information other than required data information required by the user, from necessary data information including the basic dynamic load rating C and the basic static load rating $C_0$ of the rolling bearing; comparing the required data information with the necessary data information to assume data information which is not input; predicting a life by using the life prediction program according to the eighteenth aspect of the invention on the basis of the required data information and assumed data information other than the required data information; judging whether a result of the life prediction satisfies the required data information or not; when the life prediction result satisfies the required data information, exhibiting the assumed data information as bearing selection information; and, when the life prediction result does not satisfy the required data information, changing the assumed data information, and causing the life prediction program to again perform the calculation.

BRIEF DESCRIPTION OF THE DRAWINGS

FIG. 7 is a view showing a bearing table screen;

FIG. 10 is a view showing a load factor definition screen;

FIG. 19 is a view showing a contamination degree coefficient definition screen;

FIG. 22 is a view showing a description screen;

DETAILED DESCRIPTION OF THE PREFERRED EMBODIMENTS

Hereinafter, an example of an embodiment of the invention will be described with reference to the accompanying drawings.

Figure 1:
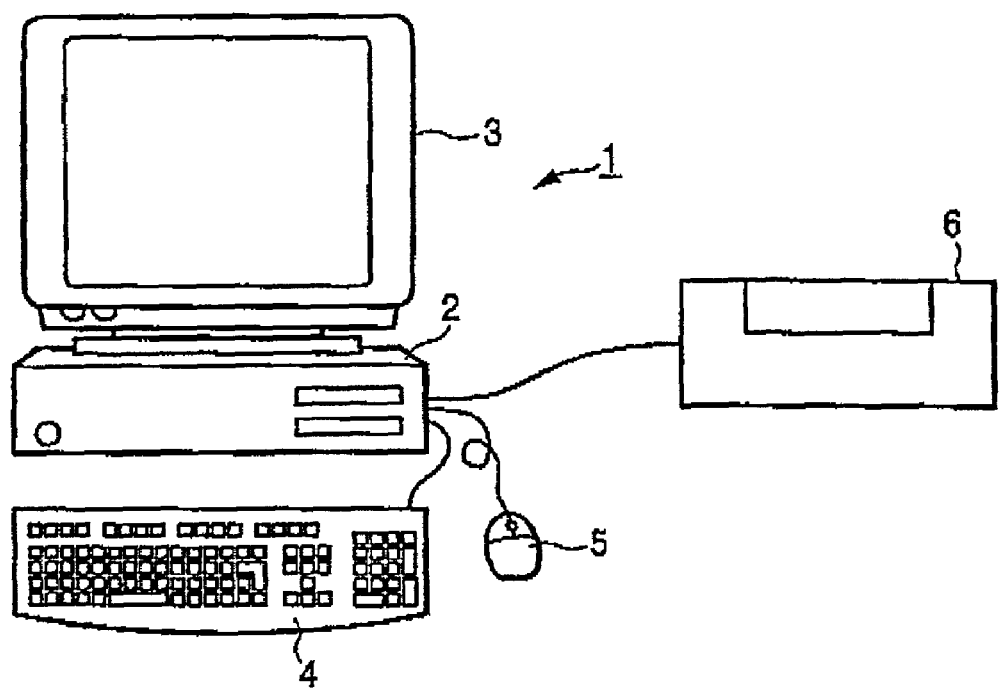
FIG. 1 is a schematic view showing the configuration of a first embodiment of the invention.

FIG. 1 is a schematic view showing the configuration of a first embodiment of the invention. In the figure, 1 denotes a personal computer. The personal computer 1 includes a computer main unit 2, a display device 3 which is connected to the main unit 2 and configured by a liquid crystal display device or a CRT, a keyboard 4, a mouse 5, and a printer 6 which is connected to the computer main unit 2.

Figure 2:
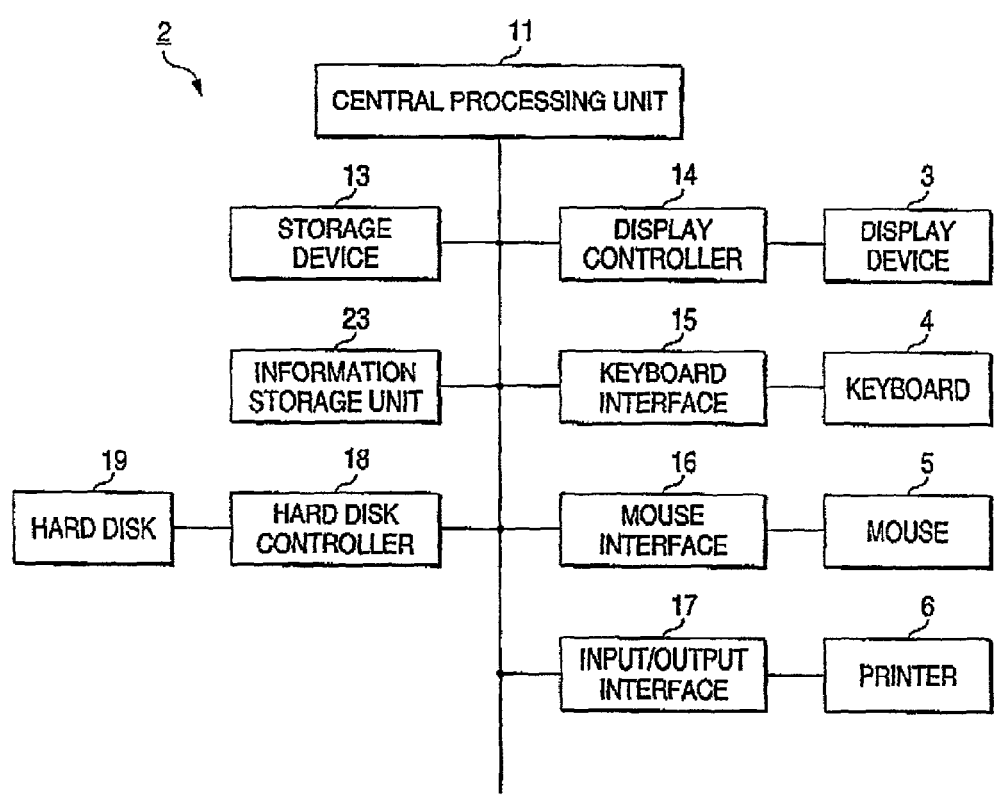
FIG. 2 is a block diagram showing electrical connection relationships of FIG. 1.

As shown in FIG. 2, the internal circuit of the computer main unit 2 includes: a central processing unit 11; a storage device 13 configured by as a ROM, a RAM, and the like which are connected to the central processing unit 11 through a system bus 12; a display controller 14 through which the display device 3 is connected to the system bus 12; a keyboard interface 15 through which the keyboard 4 is connected to the system bus 12; a mouse interface 16 through which the mouse 5 is connected to the system bus 12; an input/output interface 17 through which the printer 6 is connected to the system bus 12; and a hard disk 19 which is connected to the system bus 12 through a hard disk controller 18.

The hard disk 19 stores an operating system, life prediction application software for predicting the life of a rolling bearing, and an electronic catalog which stores data information of rolling bearings.

As shown in FIG. 7, the electronic catalog stores data information including the bearing kind, the designation number, principal dimensions, the basic dynamic load rating C, the basic static load rating $C_0$, a factor $f_0$, the allowable rotation number, the radial load factor X, and the thrust load factor Y.

The life prediction application software performs predetermined calculations on the basis of input data information with using spreadsheet application software, to conduct a process of predicting the life of a rolling bearing.

Figure 3:
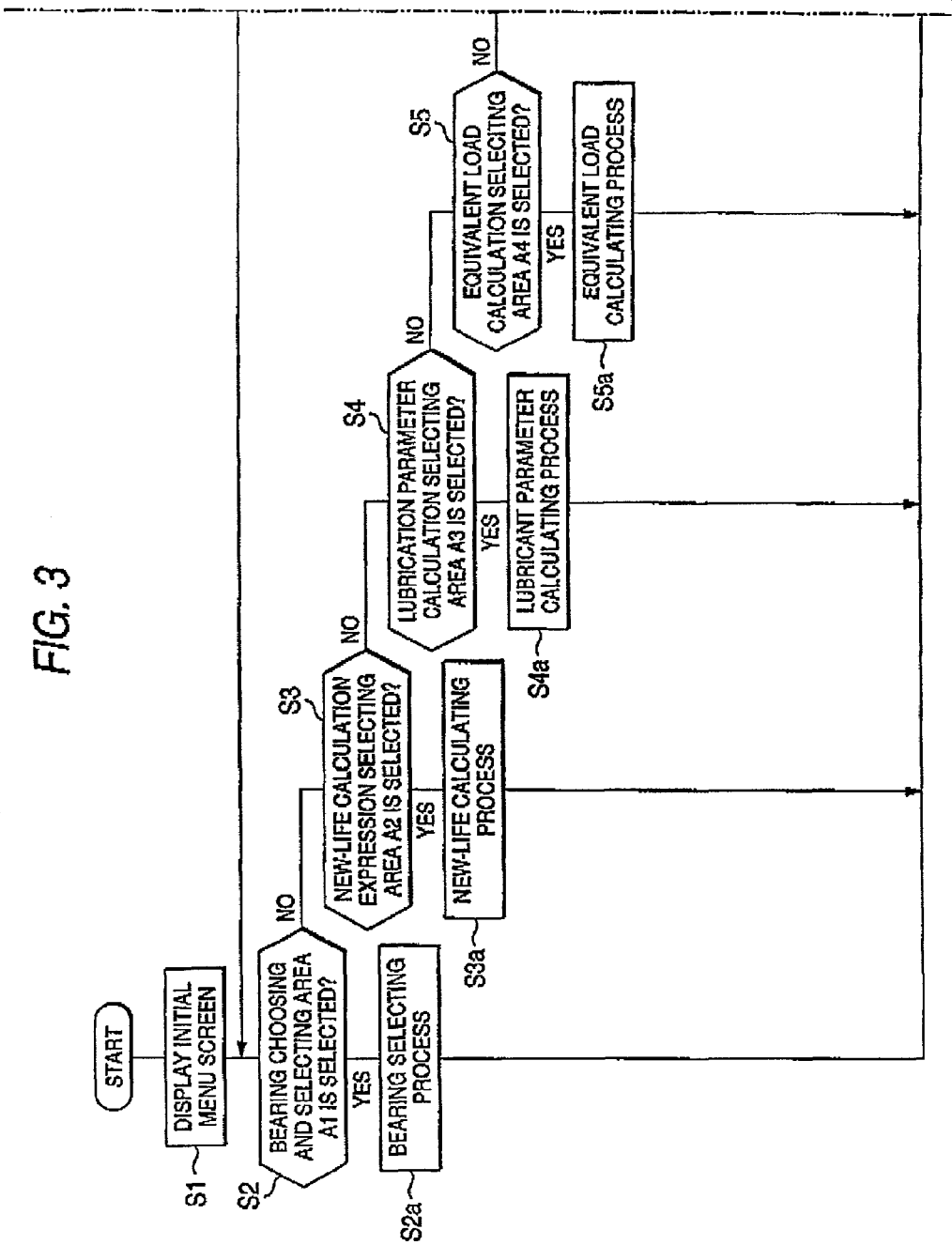
FIG. 3 is a flowchart showing an example of a procedure of a life predicting process.

In the life predicting process, as shown in FIG. 3, an initial menu screen is first displayed in step S1.

Figure 4:
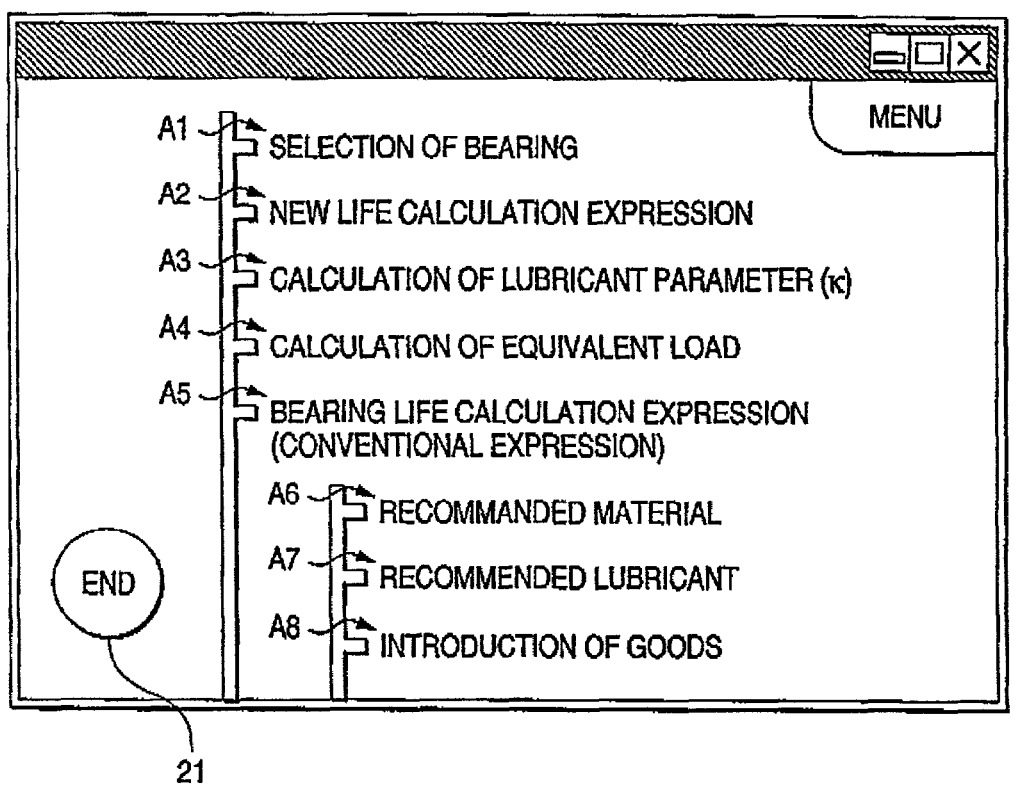
FIG. 4 is a view showing an initial menu screen.

In the initial menu screen, as shown in FIG. 4, functions stored in the application software are displayed in a selectable manner. Namely, an area A1 for choosing and selecting a bearing, an area A2 for selecting a new life calculation expression, an area A3 for calculating and selecting a lubrication parameter $\kappa$, an area A4 for calculating and selecting an equivalent load, an area A5 for selecting a bearing life calculation expression (conventional expression), an area A6 for selecting a recommended material, an area A7 for selecting a recommended lubricant, an area A8 for introducing and selecting goods, and an end button 21 are displayed.

Next, the control proceeds to step S2 to judge whether the bearing choosing and selecting area A1 is selected by the mouse 5 or the keyboard 4 or not. If the area is selected, the control proceeds to step S2a in which a bearing selecting process that will be described later is implemented, and the process is then ended. If the bearing choosing and selecting area A1 is not selected, the control proceeds to step S3.

In step S3, it is judged whether the new-life calculation expression selecting area A2 is selected or not. If the area is selected, the control proceeds to step S3a in which a new life calculating process that will be described later is implemented, and the process is then ended. If the new-life calculation expression selecting area A2 is not selected, the control proceeds to step S4.

In step S4, it is judged whether the lubrication parameter calculation selecting area A3 is selected by the mouse 5 or the keyboard 4 or not. If the area is selected, the control proceeds to step S4a in which a lubrication parameter calculating process that will be described later is implemented, and the process is then ended. If the lubrication parameter calculation selecting area A3 is not selected, the control proceeds to step S5.

In step S5, it is judged whether the equivalent load calculation selecting area A4 is selected by the mouse 5 or the keyboard 4 or not. If the area is selected, the control proceeds to step S5a in which an equivalent load calculating process that will be described later is implemented, and the process is then ended. If the equivalent load calculation selecting area A4 is not selected, the control proceeds to step S6.

In step S6, it is judged whether the bearing life calculation expression (conventional expression) selecting area A5 is selected by the mouse 5 or the keyboard 4 or not. If the area is selected, the control proceeds to step S6a in which the bearing life $L_{10}$ of the conventional expression is calculated in accordance with the above-mentioned expression (1), and the process is then ended. If the bearing life calculation expression (conventional expression) selecting area A5 is not selected, the control proceeds to step S7.

In step S7, it is judged whether the recommended material selecting area A6 is selected by the mouse 5 or the keyboard 4 or not. If the area is selected, the control proceeds to step S7a in which a recommended material selecting list that is previously stored in the hard disk 19 is displayed on the display device 3, and a recommended material selecting process of selecting a recommended material of the bearing from the selecting list is implemented, and the process is then ended. If the recommended material selecting area A6 is not selected, the control proceeds to step S8.

In step S8, it is judged whether the recommended lubricant selecting area A7 is selected by the mouse 5 or the keyboard 4 or not. If the area is selected, the control proceeds to step S8a in which a recommended lubricant selecting list that is previously stored in the hard disk 19 is displayed on the display device 3, and a lubricant selecting process of selecting a lubricant to be used in the bearing from the selecting list is implemented, and the process is then ended. If the recommended lubricant selecting area A7 is not selected, the control proceeds to step S9.

In step S9, it is judged whether the goods introducing and selecting area A8 is selected by the mouse 5 or the keyboard 4 or not. If the area is selected, the control proceeds to step S9a in which a goods introducing process of displaying goods introducing information that is previously stored in the hard disk 19, on the display device 3a, and the process is then ended. If the goods introducing and selecting area A8 is not selected, the control proceeds to step S10.

In step S10, it is judged whether the end button 21 is selected by the mouse 5 or the keyboard 4 or not. If the end button 21 is selected, the life predicting process is ended without conducting any further operation. If the end button 21 is not selected, the control returns to step S2.

Figure 5:
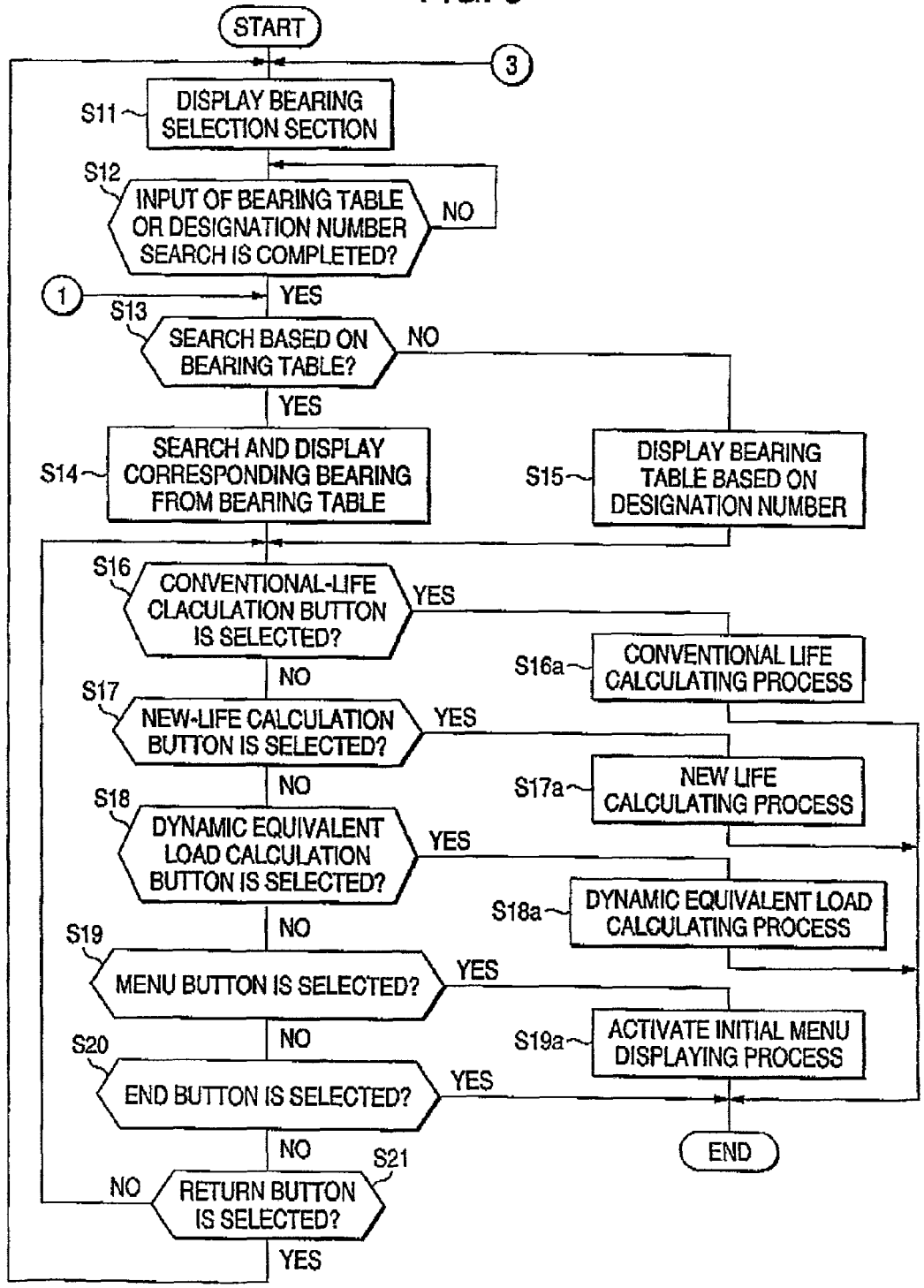
FIG. 5 is a flowchart showing an example of a procedure of a bearing selecting process.
Figure 6:
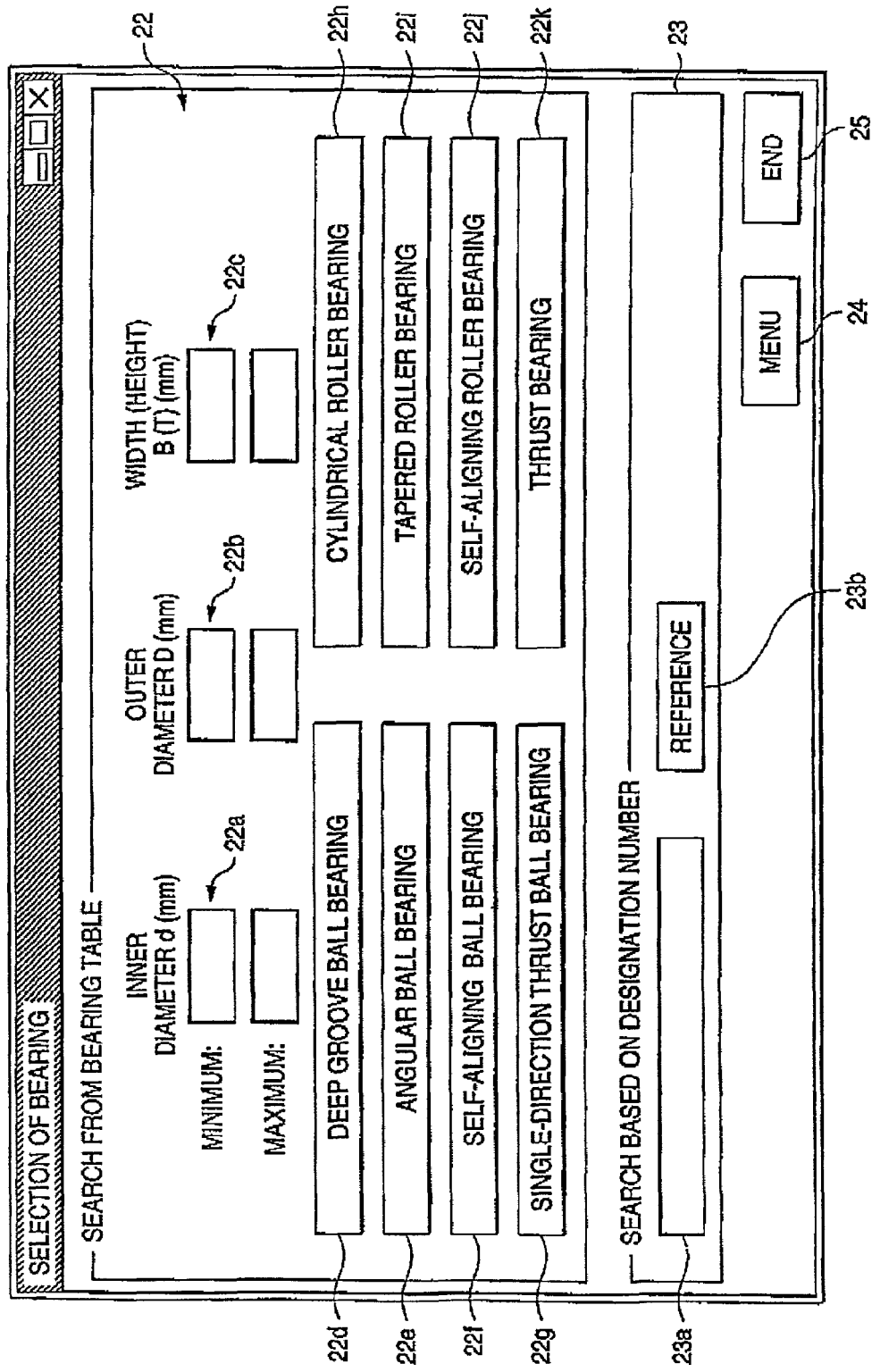
FIG. 6 is a view showing a bearing selection screen.

In the bearing selecting process of step S2a, as shown in FIG. 5, a bearing selection screen shown in FIG. 6 is first displayed in step S11 on the display device 3.

In the selection screen, as shown in FIG. 6, displayed are a search area 22 for performing a search based on a bearing table, a search area 23 for performing a search based on the designation number, a menu button 24 for displaying input data information of a rolling bearing, and an end button 25. In the search area 22, displayed are text input areas 22a to 22c in which the minimum and maximum values of the inner diameter d, the outer diameter D, and the width (height) B (T) are to be input, and buttons for selecting the bearing kind, or a deep groove ball bearing selection button 22d, an angular ball bearing selection button 22e, a self-aligning ball bearing selection button 22f, a single-direction thrust ball bearing selection button 22g, a cylindrical roller bearing selection button 22h, a tapered roller bearing selection button 22i, a self-aligning roller bearing selection button 22j, and a thrust roller bearing selection button 22k. In the search area 23, a text input box 23a for inputting a designation number, and a reference button 23b for displaying a designation number list are displayed.

Then, the control proceeds to step S12 to judge whether, in the case of the search based on the bearing table, the input of the inner diameter d, the outer diameter D, and the width (height) B (T) is ended and the selection of the bearing type is completed or not, or, in the case of the search based on the designation number, the input of the designation number is ended or not. If either of the inputs is not ended, the control waits until the input is ended. If the input is ended, the control proceeds to step S13 to judge whether the search based on the bearing table is to be performed or not. If the search based on the bearing table is to be performed, the control proceeds to step S14 in which the electronic catalog is retrieved on the basis of the inner diameter d, the outer diameter D, and the width (height) B (T) and the bearing type, and a bearing table screen shown in FIG. 7 is displayed to indicate corresponding data information. The control then proceeds to step S16. If the search based on the designation number is selected, the control proceeds to step S15 in which the electronic catalog is retrieved on the basis of the designation number that is input into the text input box 23a, and the bearing table screen shown in FIG. 7 is displayed to indicate corresponding data information. The control then proceeds to step S16.

In the bearing table screen, as shown in FIG. 7, a data information display area 31 for displaying corresponding data information in the electronic catalog, a conventional-life calculation button 32, a new-life calculation (according to the invention) button 33, a dynamic equivalent load calculation button 34, a return button 35, a menu button 36, and an end button 37 are displayed.

In step S16, it is judged whether, after the desired designation number is selected, the conventional-life calculation button 32 is selected or not. If the conventional-life calculation button 32 is selected, the control proceeds to step S16a in which a conventional life calculating process of performing the calculation of expression (1) above is conducted to calculate the basic rating life $L_{10}$, and the process is then ended. If the conventional-life calculation button 32 is not selected, the control proceeds to step S17.

In step S17, it is judged whether, after the desired designation number is selected, the new-life calculation button 33 is selected or not. If the new-life calculation button 33 is selected, the control proceeds to step S17a in which a new life calculating process that will be described later is conducted, and the process is then ended. If the new-life calculation button 33 is not selected, the control proceeds to step S18.

In step S18, it is judged whether, after the desired designation number is selected, the dynamic equivalent load calculation button 34 is selected or not. If the dynamic equivalent load calculation button 34 is selected, the control proceeds to step S18a in which a dynamic equivalent load calculating process that will be described later is conducted, and the process is then ended. If the dynamic equivalent load calculation button 34 is not selected, the control proceeds to step S19.

In step S19, it is judged whether the menu button 36 is selected or not. If the menu button 36 is selected, the control proceeds to step S19a in which the initial menu displaying process of FIG. 3 is activated, and the process is then ended. If the menu button 36 is not selected, the control proceeds to step S20.

In step S20, it is judged whether the end button 37 is selected or not. If the end button is selected, the life calculating process is ended without conducting any further operation. If the end button 37 is not selected, the control proceeds to step S21 to judge whether the return button 35 is selected or not. If the return button is selected, the control returns to step S11, and, if the return button 35 is not selected, the control returns to step S16.

Figure 8:
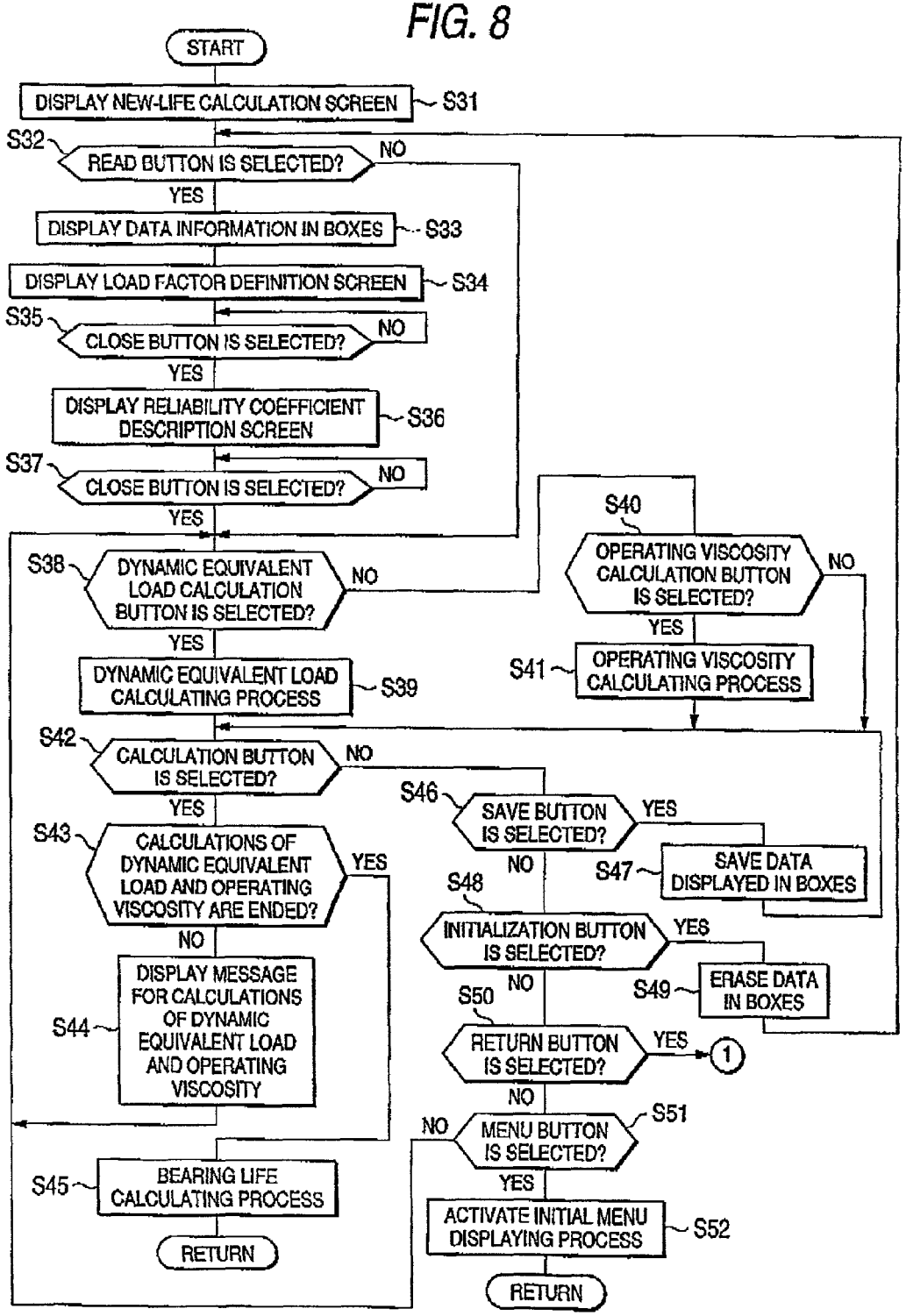
FIG. 8 is a flowchart showing an example of a procedure of a new life calculating process.
Figure 9:
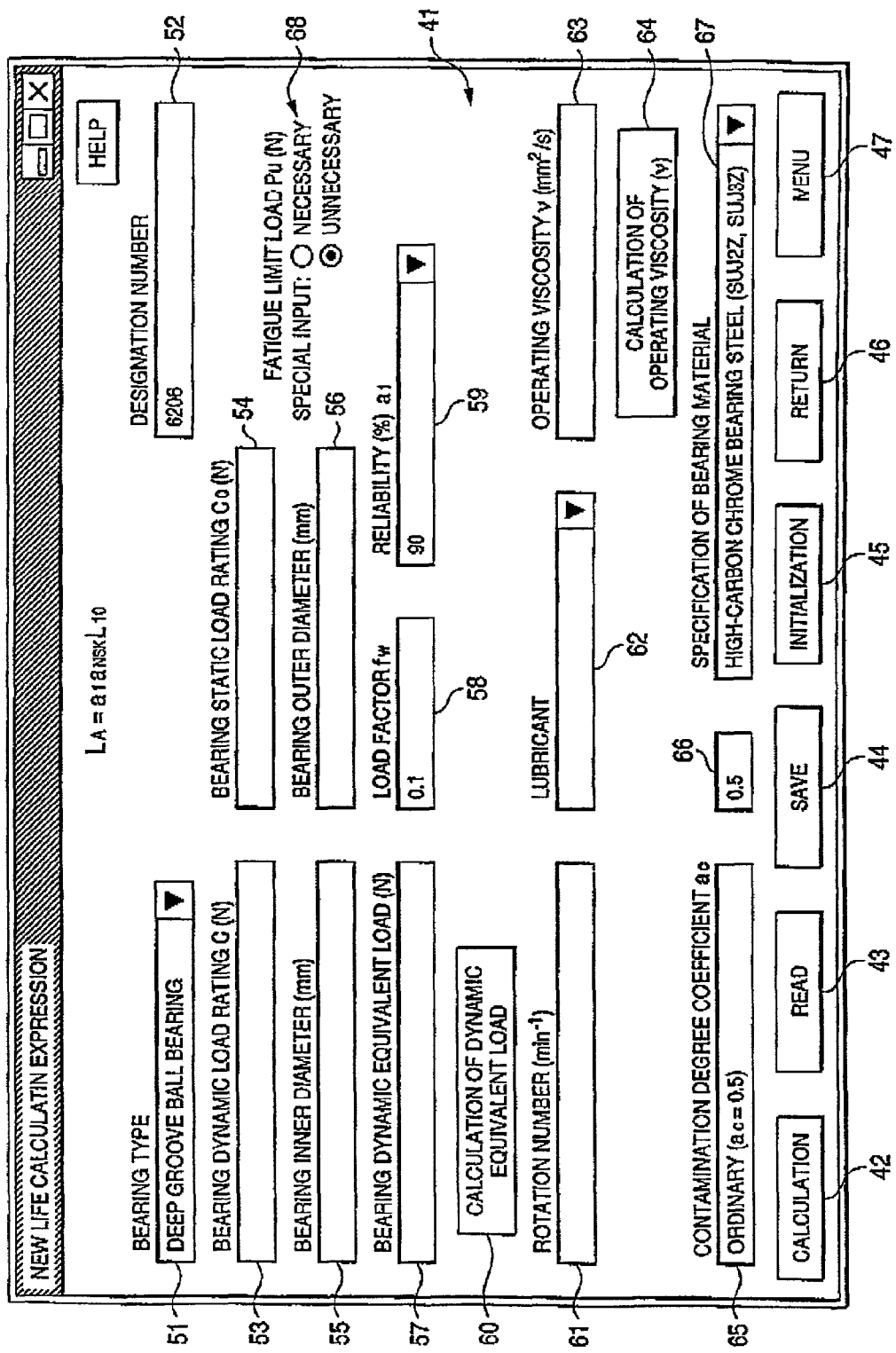
FIG. 9 is a view showing a new-life calculation screen.

In the new life calculating process of steps S3a and S17a, as shown in FIG. 8, a new-life calculation screen shown in FIG. 9 is first displayed in step S31.

In the new-life calculation screen, disposed are a display area 41 in which predetermined items are displayed, and buttons which are arranged below the display area 41, or a calculation button 42, a read button 43, a save button 44, an initialization button 45, a return button 46, and a menu button 47.

The display area 41 comprises: a combo box 51 in which the life calculation expression of expression (7) above is displayed in a title portion and the bearing type is to be selected; a text box 52 for inputting the designation number; a text box 53 for inputting the dynamic load rating C of the bearing; a text box 54 for inputting the static load rating $C_0$ of the bearing; a text box 55 for inputting the inner diameter d of the bearing; a text box 56 for inputting the outer diameter D of the bearing; a text box 57 for displaying the bearing dynamic equivalent load P; a text box 58 for inputting a load factor $f_w$; a combo box 59 for selecting the reliability coefficient $a_1$; a dynamic equivalent load calculation button 60 for instructing a calculation of the dynamic equivalent load; a text box 61 for inputting the rotation number; a combo box 62 for selecting the lubricant; a text box 63 for displaying the operating viscosity v; an operating viscosity calculation button 64 for instructing a calculation of the operating viscosity; a combo box 65 for selecting the contamination degree coefficient $a_c$; a text box 66 for displaying the contamination degree coefficient $a_c$; a combo box 67 for selecting the specification of the bearing material; and a select button 68 for selecting necessity/unnecessity of a special input of the fatigue limit load Pu. As default values, "1.0" is displayed in the text box 58 for the load factor $f_w$, "90" is displayed in the combo box 59 for the reliability coefficient $a_1$, "Ordinary ($a_c$=0.5)" is displayed in the combo box 65 for the contamination degree coefficient $a_c$, "0.5" is displayed in the text box 66 for the contamination degree coefficient $a_c$, and "High-carbon chrome bearing steel (SUJ2Z, SUJ3Z)" is displayed in the combo box 67 for the specification of the bearing material.

Then, the control proceeds to step S32 to judge whether the read button 43 is selected or not. If the button is not selected, the control proceeds directly to step S38. If the read button 43 is selected, the control proceeds to step S33 in which the data information of the rolling bearing of the designation number that is selected in the bearing table of FIG. 7 is sequentially displayed in the sequence of the combo box 51 and the text box 52. When the bearing outer diameter D is displayed in the text box 56, the control proceeds to step S34 to display a load factor definition screen having a display area 261 in which a definition statement of a load factor shown in FIG. 10 is displayed, and a close button 262. Thereafter, the control proceeds to step S35 to judge whether the close button 262 is selected or not. If the button is not selected, the control waits until the button is selected. If the button is selected, the control proceeds to step S36.

Figure 11:
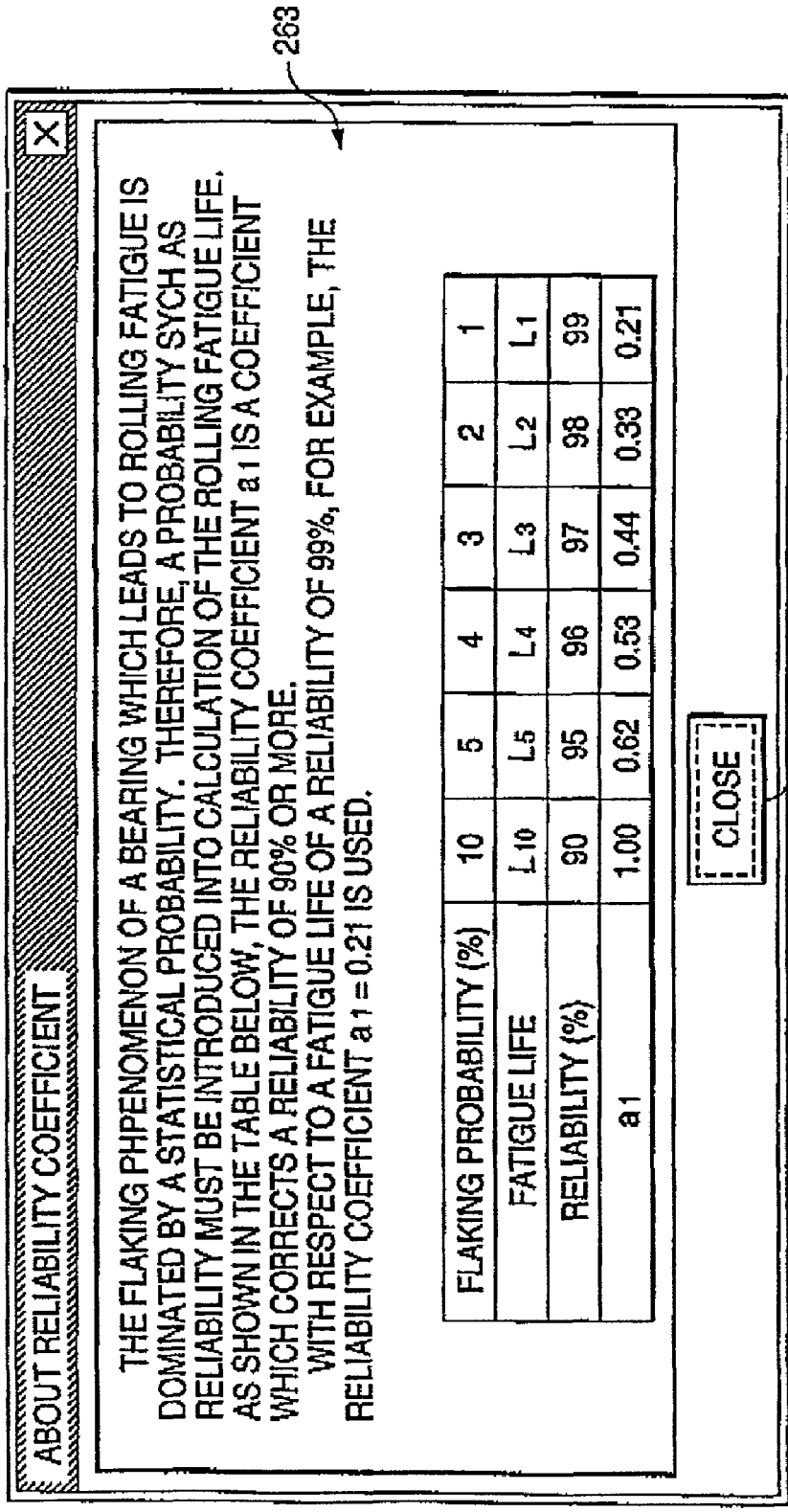
FIG. 11 is a view showing a reliability coefficient description screen.

In step S36, a reliability coefficient description screen having a display area 263 in which a statement relating to the reliability coefficient shown in FIG. 11 is displayed, and a close button 264 is displayed, and the control then proceeds to step S37 to judge whether the close button 264 is selected or not. If the button is not selected, the control waits until the button is selected. If the close button 264 is selected, the control proceeds to step S38.

In step S38, it is judged whether the dynamic equivalent load calculation button 60 is selected or not. If the button 60 is selected, the control proceeds to step S39 in which a dynamic equivalent load calculating process that will be described later is conducted, and the control then proceeds to step S42. If the dynamic equivalent load calculation button 60 is not selected, the control proceeds to step S40 to judge whether the operating viscosity calculation button 64 is selected or not. If the operating viscosity calculation button 64 is selected, the control proceeds to step S41 in which an operating viscosity calculating process that will be described later is conducted, and the control then proceeds to step S42.

In step S42, it is judged whether the calculation button 42 is selected or not. If the calculation button 42 is selected, the control then proceeds to step S43 to judge whether the calculations of the dynamic equivalent load P and the necessary operating viscosity v are ended or not. If the calculations are not ended, the control proceeds to step S44 to display message information for prompting the calculations of the dynamic equivalent load P and the necessary operating viscosity v to be first completed, and the control then returns to step S38. If the calculations of the dynamic equivalent load P and the necessary operating viscosity v are ended, the control proceeds to step S45 in which the life calculating process wherein the calculation of expression (7) above is conducted to calculate the bearing life $L_A$ is performed, and the process is then ended. If a result of the judgement in step S42 shows that the calculation button 42 is not selected, the control proceeds to step S46 to judge whether the save button 44 is selected or not. If the save button 44 is selected, the control proceeds to step S47 in which the data that are displayed at this time in the boxes 51 to 59, 61 to 63, and 65 to 67 are saved, and the control then returns to step S42. If the save button 44 is not selected, the control proceeds to step S48.

In step S48, it is judged whether the initialization button 45 is selected or not. If the initialization button 45 is selected, the control proceeds to step S49 to erase the displayed data, and the control then returns to step S32. If the initialization button 45 is not selected, the control proceeds to step S50 to judge whether the return button 46 is selected or not. If the return button 46 is selected, the control returns to step S13 in the bearing selecting process of FIG. 5. If the return button 46 is not selected, the control proceeds to step S51 to judge whether the menu button 47 is selected or not. If the menu button 47 is selected, the control proceeds to step S52 in which the initial menu displaying process of FIG. 3 is activated, and the process is then ended. If the menu button 47 is not selected, the control proceeds to step S38.

Figure 12:
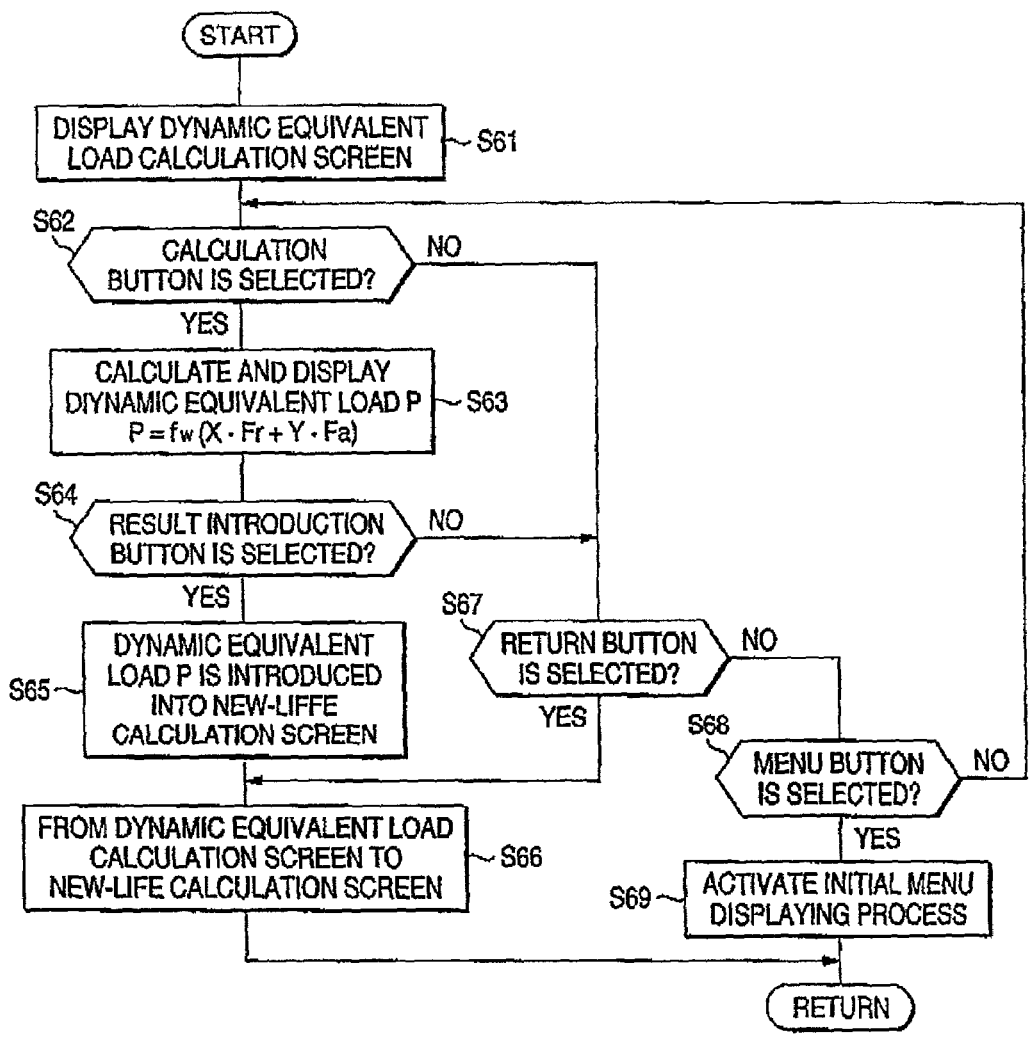
FIG. 12 is a flowchart showing an example of a procedure of a dynamic equivalent load calculating process.
Figure 13:
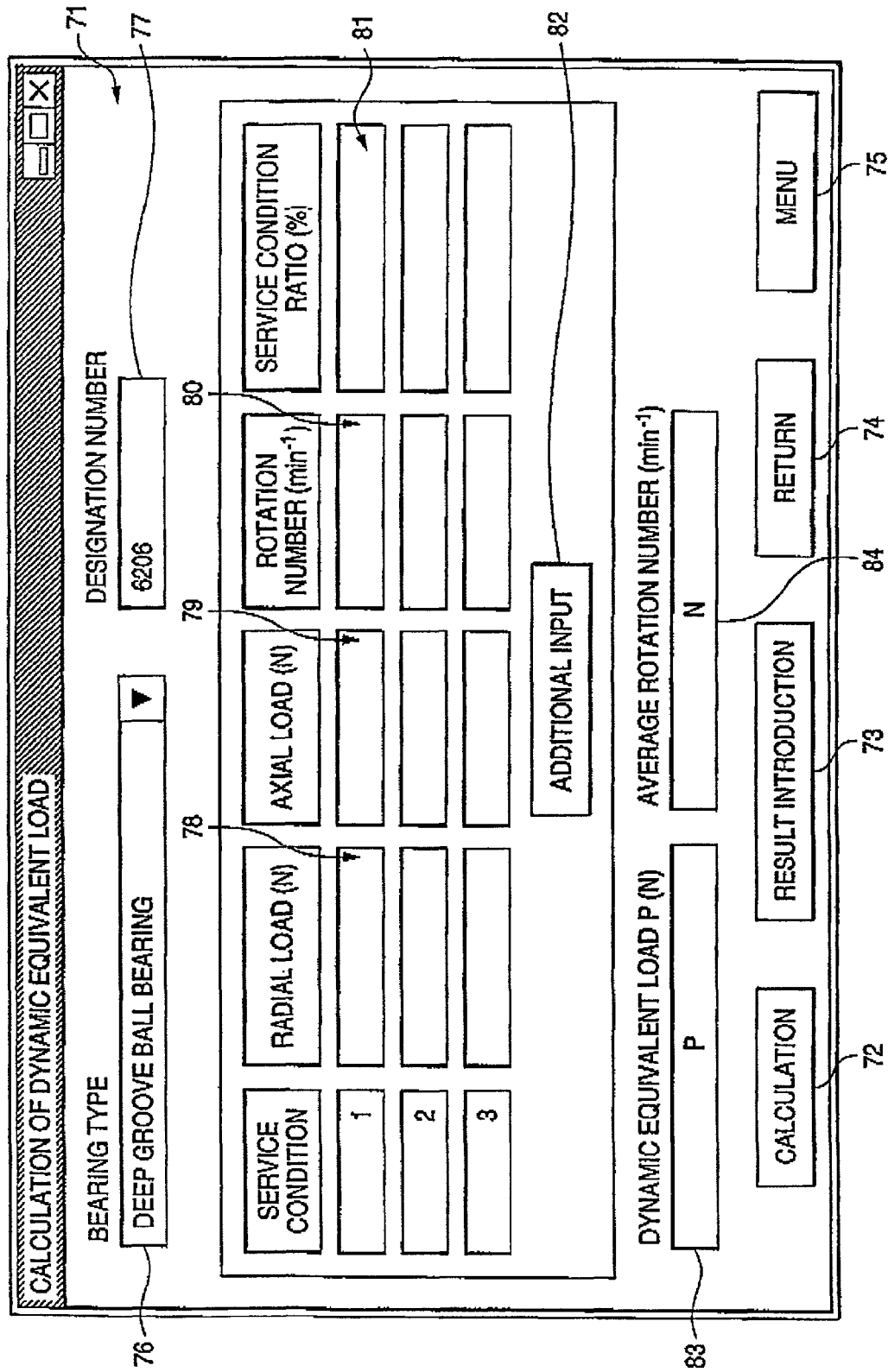
FIG. 13 is a view showing a dynamic equivalent load calculation screen.

In the dynamic equivalent load calculating process of steps S5a and S18a, as shown in FIG. 12, a dynamic equivalent load calculation screen shown in FIG. 13 is first displayed in step S51.

The dynamic equivalent load calculation screen comprises a display area 71 in which predetermined items are displayed, and buttons which are arranged below the display area 71, or a calculation button 72, a result introduction button 73, a return button 74, and a menu button 75.

The display area 71 includes: a combo box 76 for selectively displaying the bearing type; a text box 77 for displaying the designation number; a text box 78 for inputting a radial load Fr of service condition; a text box 79 for inputting an axial load Fa; a text box 80 for inputting the rotation number; a text box 81 for inputting a service condition ratio; an additional input button 82; a text box 83 for displaying the dynamic equivalent load P; and a text box 84 for displaying the average rotation number N.

Then, the control proceeds to step S62 to judge whether the calculation button 72 is selected or not. If the calculation button 72 is selected, the control proceeds to step S63 in which the dynamic equivalent load P is calculated by performing a calculation of expression (9) below on the basis of the radial load Fr and the axial load Fa that are input into the text boxes 78 and 79, a radial factor X and an axial factor Y that are set in data information, and the load factor $f_w$ that is set in the new-life calculation screen of FIG. 9. The calculated dynamic equivalent load P is displayed in the text box 83, and the control then proceeds to step S64.

$$P = f_w (X \cdot Fr + Y \cdot Fa) \tag{9}$$

In step S64, it is judged whether the result introduction button 73 is selected or not. If the result introduction button 73 is selected, the control proceeds to step S65 in which the calculated dynamic equivalent load P is introduced into the dynamic equivalent load text box 57 of the new-life calculation screen of FIG. 9. The control then proceeds to step S66 in which the dynamic equivalent load calculation screen of FIG. 13 is closed and the new-life calculation screen of FIG. 9 is made active. Thereafter, the process is ended.

If the calculation button 72 is not selected in step S62, or if the result introduction button 73 is not selected in step S64, the control proceeds to step S67 to judge whether the return button 74 is selected or not. If the return button 74 is selected, the control proceeds to step S66 in which the new-life calculation screen of FIG. 9 is again displayed. Thereafter, the process is ended. If the return button 74 is not selected, the control proceeds to step S68 to judge whether the menu button 75 is selected or not. If the menu button 75 is selected, the control proceeds to step S69 in which the initial menu displaying process of FIG. 3 is activated, and the process is then ended. If the menu button 75 is not selected, the control returns to step S62.

Figure 14:
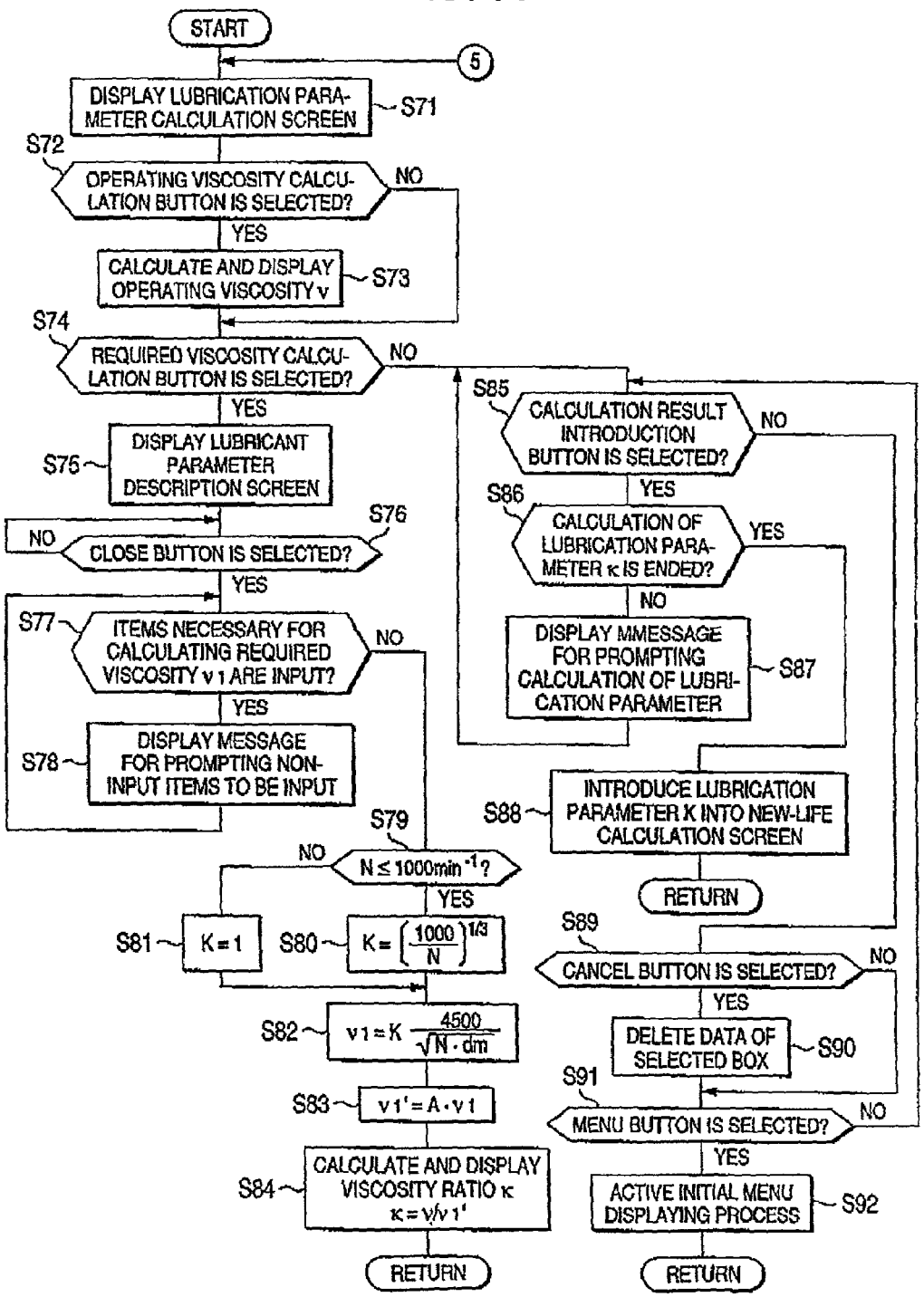
FIG. 14 is a flowchart showing an example of a procedure of an operating viscosity calculating process.
Figure 15:
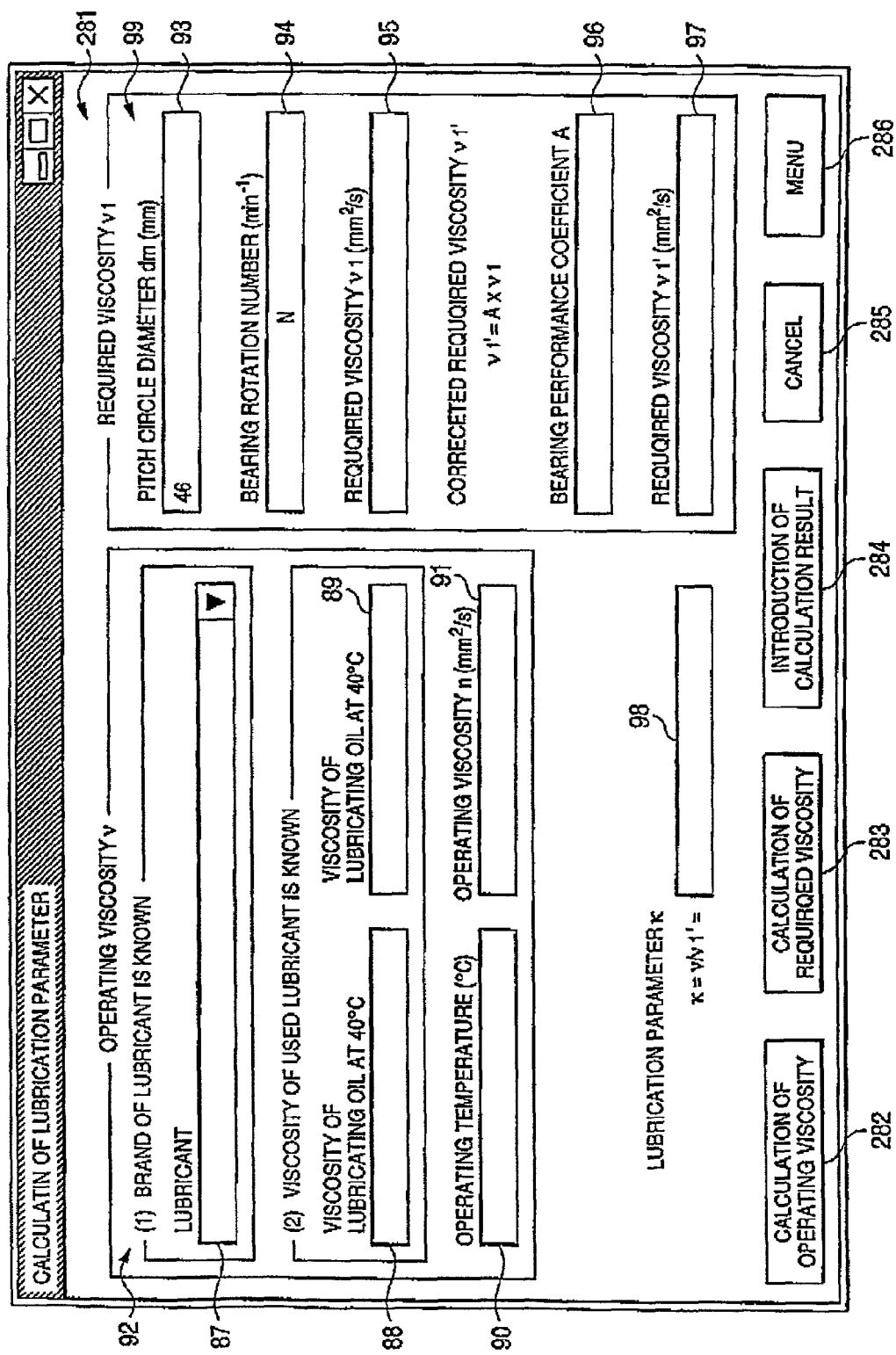
FIG. 15 is a view showing a lubrication parameter calculation screen.

In the operating viscosity calculating process of step S41, as shown in FIG. 14, a lubrication parameter calculation screen shown in FIG. 15 is first displayed in step S71.

In the lubrication parameter calculation screen, displayed are a display area 281 in which predetermined items are displayed, and buttons which are arranged below the display area 281, or an operating viscosity calculation button 282, a required viscosity calculation button 283, a calculation result introduction button 284, a cancel button 285, and a menu button 286.

The display area 281 includes an operating viscosity setting area 92 and a required viscosity setting area 99. The operating viscosity setting area 92 having a combo box 87 for selectively displaying the lubricant, a text box 88 for displaying the viscosity of the lubricating oil at 40° C., a text box 89 for displaying the viscosity of the lubricating oil at 100° C., a text box 90 for inputting the operating temperature, and a text box 91 for inputting the operating viscosity v. The required viscosity setting area 99 having a text box 93 for displaying the diameter dm of the pitch circle, a text box 94 for inputting the bearing rotation number N, a text box 95 for displaying a required viscosity $v_1$, a text box 96 for inputting a bearing performance coefficient A, a text box 97 for displaying a required viscosity $v_1'$, and a text box 98 for displaying the lubrication parameter κ.

Next, the control proceeds to step S72 to judge whether the operating viscosity calculation button 82 is selected or not. If the operating viscosity calculation button 82 is selected, the control proceeds to step S73 in which the operating viscosity v is calculated from the input operating temperature, the viscosity of the lubricating oil at 40° C., and the viscosity of the lubricating oil at 100° C., and the calculated operating viscosity v is displayed in the text box 91. Thereafter, the control proceeds to step S74. If the operating viscosity calculation button 82 is not selected, the control proceeds directly to step S74.

In step S74, it is judged whether the required viscosity calculation button 83 is selected or not. If the required viscosity calculation button 83 is selected, the control proceeds to step S75 to display a lubrication parameter description screen shown in FIG. 16.

In the lubrication parameter description screen, a calculation in which the viscosity ratio $\kappa(=v/v_1')$ is calculated as the lubrication parameter, and that in which a corrected required viscosity $v_1'$ is calculated by multiplying the required viscosity $v_1$ at the operating temperature by the bearing performance coefficient A are described in a display area 110. A close button 111 is displayed below the display area 110. Usually, the bearing performance coefficient A is set to A=1.0. In the case where the bearing performance (the roundness, the roughness, and the like) is excellent, the coefficient is set to A<1.0.

Then, the control proceeds to step S76 to judge whether the close button 111 is selected or not. If the close button 111 is not selected, the control waits until the button is selected. If the close button 111 is selected, the control proceeds to step S77.

In step S77, it is judged whether the diameter dm of the pitch circle, the bearing rotation number N, the bearing performance coefficient A, and the operating viscosity v which are necessary for calculating the required viscosity $v_1$ are input or not. If these data are not input, the control proceeds to step S78 to display message information for prompting the diameter dm of the pitch circle, the bearing rotation number, the bearing performance coefficient A, and/or the operating viscosity v which are not input, to be input, and the control then returns to step S77. If the diameter dm of the pitch circle, the bearing rotation number N, the bearing performance coefficient A, and the operating viscosity v are input, the control proceeds directly to step S79.

In step S79, it is judged whether the bearing rotation number N is equal to or smaller than 1,000 min$^{-1}$ or not. If N≦1,000 min$^{-1}$, the control proceeds to step S80 to calculate a coefficient K in accordance with expression (10) below, and then proceeds to step S82.

$$K = (1,000/N)^{1/3} \tag{10}$$

If a result of the judgment of step S79 shows that N>1,000 min$^{-1}$, the control proceeds to step S81 to set the coefficient K to "1", and then proceeds to step S82.

In step S82, a calculation of expression (11) below is performed to calculate the required viscosity $v_1$, and the calculated required viscosity $v_1$ is displayed in the text box 95.

$$v_1 = K \cdot 4,500/\sqrt{(N \cdot dm)} \tag{11}$$

Thereafter, the control proceeds to step S83 in which the corrected required viscosity $v_1'$ is calculated in accordance with expression (12) below and the calculated corrected required viscosity $v_1'$ is displayed in the text box 97, and then proceeds to step S84.

$$v_1' = A \cdot v_1 \tag{12}$$

Thereafter, the control proceeds to step S84 in which the lubrication parameter κ indicated by a viscosity ratio is calculated in accordance with expression (13) below and the calculated lubrication parameter κ is displayed in the text box 98, and the process is then ended.

$$\kappa = \nu/\nu_1' \quad (13)$$

If a result of the judgment of step S74 shows that the required viscosity calculation button 83 is not selected, the control proceeds to step S85 to judge whether the calculation result introduction button 84 is selected or not. If the calculation result introduction button 84 is selected, the control proceeds to step S86 to judge whether the calculation of the lubrication parameter κ is ended or not. If the calculation of the lubrication parameter κ is not ended, the control proceeds to step S87 to display message information for prompting the calculation of the lubrication parameter κ to be performed, and then returns to step S85. If the calculation of the lubrication parameter κ is ended, the control proceeds to step S88 to introduce the lubrication parameter κ into the new-life calculation screen, and the process is then ended.

If a result of the judgment of step S85 shows that the calculation result introduction button 84 is not selected, the control proceeds to step S89 to judge whether a cancel button 89 is selected or not. If the cancel button 89 is selected, the control proceeds to step S90 in which the data of selected one(s) of the text boxes 88 to 98 are deleted, and then proceeds to step S91. If the cancel button 89 is not selected, the control proceeds directly to step S91.

In step S91, it is judged whether a menu button 90 is selected or not. If the menu button 90 is selected, the control proceeds to step S92 in which the initial menu displaying process of FIG. 3 is activated, and the process is then ended.

Figure 17:
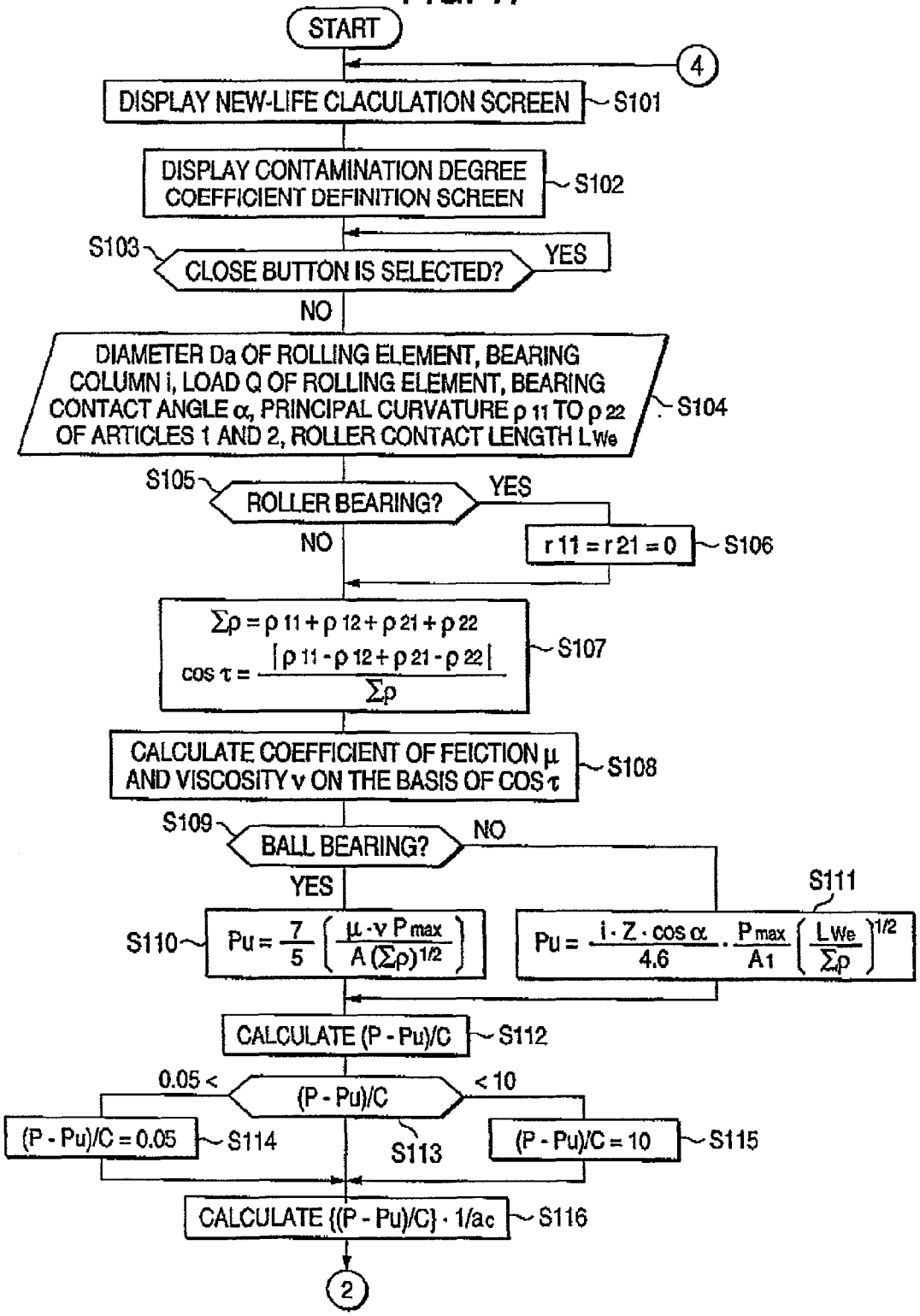
FIG. 17 is a flowchart showing the first half of a process of a life calculating process.
Figure 18:
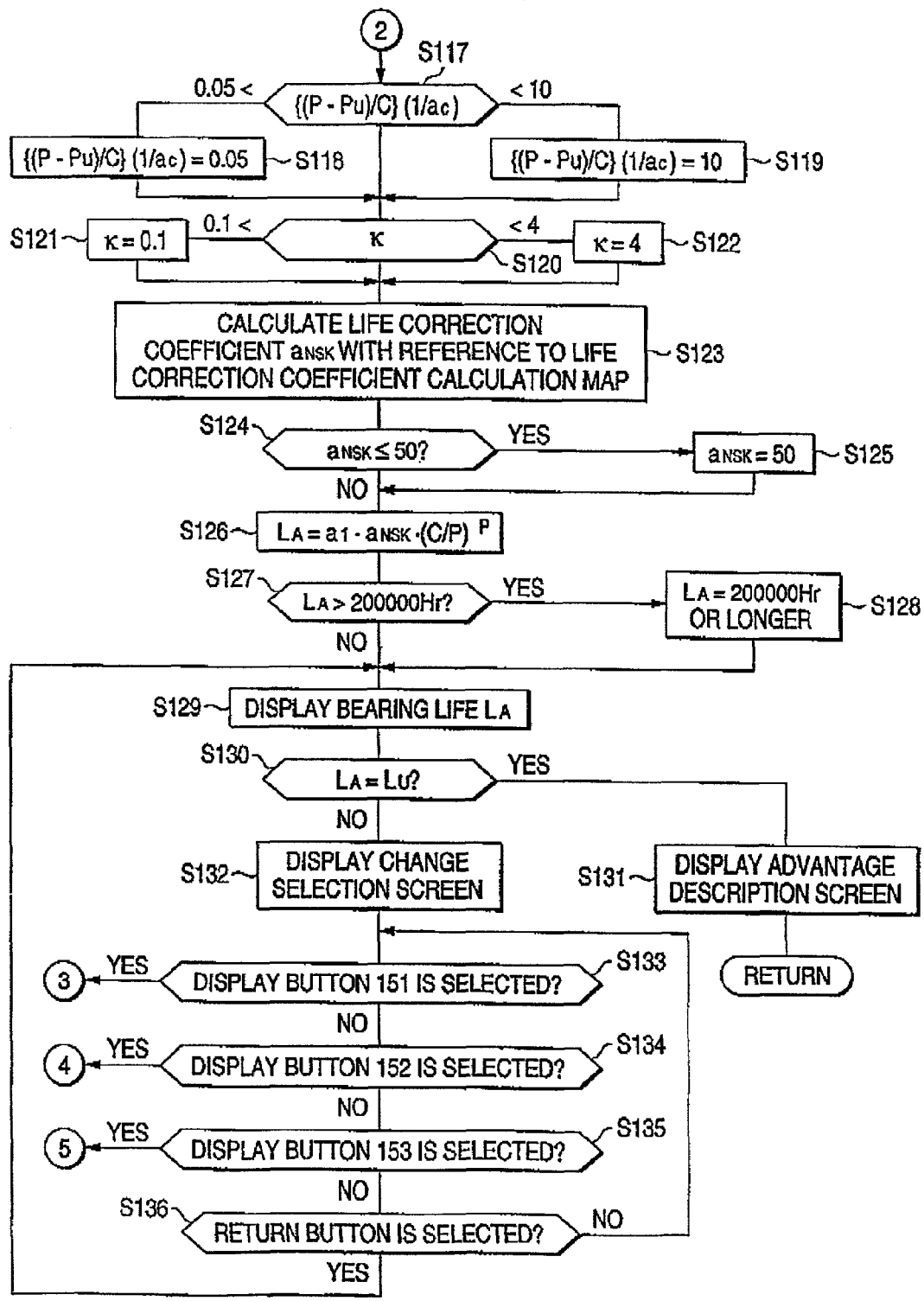
FIG. 18 is a flowchart showing the second half of the process of the life calculating process.

In the bearing life calculating process of step S45 in the new life calculating process of FIG. 7, as shown in FIGS. 17 and 18, the new-life calculation screen shown in FIG. 9 is first displayed in step S101, and the control then proceeds to step S92 to display a contamination degree coefficient definition screen shown in FIG. 19. In the contamination degree coefficient definition screen, a display area 121, and a close button 122 which is disposed below the display area 121 are displayed. In the display area, displayed is a table for determining the contamination degree coefficient $a_c$ in consideration of the material coefficient according to the service environment shown in Table 2 below.

TABLE 2

| $a_c$ | Very clean 1 | Clean 0.8 | Ordinary 0.5 | Contaminated 0.4–0.1 | Heavily contaminated 0.05 |
|---|---|---|---|---|---|
| Index of application | Filter management of 10 μm or smaller | Filter management of 10–30 μm | Filter management of 30–100 μm | Filter larger than 100 μm or without filter management (dip-feed, circulating oil feed, etc.) | Without filter, contaminated with large amount of dust |
| Example of application | Sealed greased bearing for electrical appliance, information, etc. | Sealed greased bearing for motor Sealed greased bearing for railcar Sealed greased bearing for machine tool, etc. | Ordinary use Open type greased bearing, etc. | For transmission of automobile For hub automobile For reduction gear For construction machinery, etc. | |

Then, the control proceeds to step S103 to judge whether the close button 122 is selected or not. If the close button 122 is not selected, the control waits until the button is selected. If the close button 122 is selected, the control proceeds to step S104 to read the diameter Da of the rolling element, the bearing column number i, the load Q of the rolling element, the bearing contact angle α, the principal curvatures $\rho_{11}$ and $\rho_{12}$ of an article 1, the roller contact length $L_{We}$, and the principal curvatures $\rho_{21}$ and $\rho_{22}$ of an article 2. Thereafter, the control proceeds to step S105 to judge whether the type of the bearing is a ball bearing or a roller bearing. If the bearing is a roller bearing, the control proceeds to step S106 in which the principal curvatures $\rho_{11}$ and $\rho_{12}$ of the article 1 are set to $\rho_{11}=\rho_{21}=0$, and then proceeds to step S107. If the bearing is a ball bearing, the control proceeds directly to step S107.

In step S107, a sum Σρ of the principal curvatures is calculated by following expression (14), and cost is calculated by following expression (15):

$$\Sigma\rho = \rho_{11} + \rho_{12} + \rho_{21} + \rho_{22} \quad (14)$$

$$\cos\tau = (|\rho_{11} - \rho_{12} + \rho_{21} - \rho_{22}|)/\Sigma\rho \quad (15)$$

Then, the control proceeds to step S108 in which the coefficient of friction μ and the viscosity ν are calculated on the basis of the calculated cos τ and with reference to a storage table that is previously stored. Thereafter, the control proceeds to step S109 to judge whether the type of the bearing is a ball bearing or a roller bearing. If the bearing is a ball bearing, the control proceeds to step S110 in which a calculation of expression (16) below is performed to calculate the fatigue limit load Pu, and then proceeds to step S112.

$$Pu = (Z/5)\{\mu \cdot \nu \cdot P_{max}/A \cdot (\Sigma\rho)^{2/3}\} \tag{16}$$

where $P_{max}$=1.5 GPa and A=858 N.

If a result of the judgment of step S109 shows that the bearing is a roller bearing, the control proceeds to step S111 in which a calculation of expression (17) below is performed to calculate the fatigue limit load Pu, and then proceeds to step S112.

$$Pu = (i \cdot Z \cos \alpha/4.6)(P_{max}/A_1)(L_{we}/\Sigma\rho)^{1/2} \tag{17}$$

where $P_{max}$=1.5 GPa and $A_1$=191 N.

In step S112, the value of (P−Pu)/C is calculated. Then, the control proceeds to step S113 to judge whether (P−Pu)/C is 0.05≦(P−Pu)/C≦10 or not. If (P−Pu)/C<0.05, the control proceeds to step S114 to set (P−Pu)/C=0.05, and then proceeds to step S116. If (P−Pu)/C is 0.05≦(P−Pu)/C≦10, the control proceeds directly to step S116. If (P−Pu)/C>10, the control proceeds to step S115 to set (P−Pu)/C=10, and then proceeds to step S116.

In step S116, (P−Pu)/C is multiplied by $1/a_c$ to calculate the load parameter $\{(P-Pu)/C\} \cdot 1/a_c$. Thereafter, the control proceeds to step S117 of FIG. 18 to judge whether the calculated load parameter $\{(P-Pu)/C\} \cdot 1/a_c$ is 0.05≦{(P−Pu)/C}·$1/a_c$≦10 or not. If {(P−Pu)/C}·$1/a_c$<0.05, the control proceeds to step S118 to set the load parameter {(P−Pu)/C}·$1/a_c$=0.05, and then proceeds to step S120. If 0.05≦{(P−Pu)/C}·$1/a_c$≦10, the control proceeds directly to step S120. If {(P−Pu)/C}·$1/a_c$>10, the control proceeds to step S119 to set the load parameter {(P−Pu)/C}·$1/a_c$=10, and then proceeds to step S120.

In step S120, the lubrication parameter κ is 0.1≦κ≦4 or not. If κ<0.1, the control proceeds to step S121 to set κ=0.1, and then proceeds to step S123. If κ>4, the control proceeds to step S122 to set κ=4, and then proceeds to step S123. If 0.1≦κ≦4, the control proceeds directly to step S123.

In the case where the contamination degree coefficient $a_c$=0.05 is set, the life correction coefficient $a_{NSK}$ is set to 0.1 irrespective of the load parameter {(P−Pu)/C}·$1/a_c$.

Figure 20:
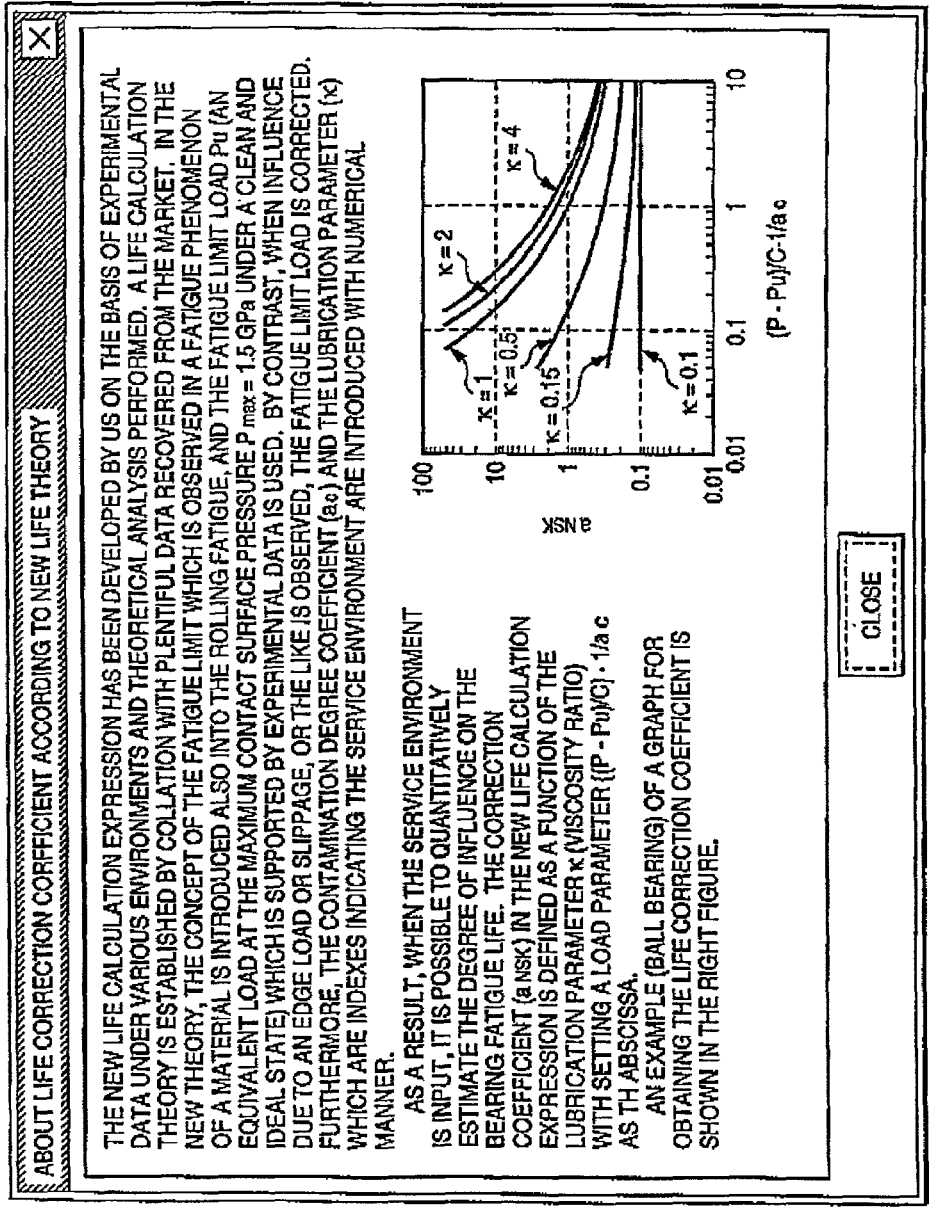
FIG. 20 is a view showing a life correction coefficient description screen including a life correction coefficient calculation map.

In step S123, the life correction coefficient $a_{NSK}$ is calculated on the basis of the lubrication parameter κ and the load parameter {(P−Pu)/C}·$1/a_c$ and with reference to a life correction coefficient calculation map shown in FIG. 20.

In the life correction coefficient calculation map of FIG. 20, the abscissa indicates the load parameter {(P−Pu)/C}·$1/a_c$, the ordinate indicates the life correction coefficient $a_{NSK}$, and a plurality of characteristic curves in which the lubrication parameter κ is used as a parameter are shown. When the lubrication parameter κ is 0.1, the life correction coefficient $a_{NSK}$ is set to "0.1" irrespective of the value of the load parameter {(P−Pu)/C}·$1/a_c$. When the value of the lubrication parameter κ becomes larger from this state, the characteristic curves are curved in such a manner that, as the value of the load parameter {(P−Pu)/C}·$1/a_c$ is smaller, the rate of change of the life correction coefficient $a_{NSK}$ is gradually increased. The curvatures of the characteristic curves are set so as to be smaller as the lubrication parameter κ becomes larger.

Thereafter, the control proceeds to step S124 to judge whether the calculated life correction coefficient $a_{NSK}$ is equal to or smaller than 50 or not. If $a_{NSK}$>50, the control proceeds to step S125 to set $a_{NSK}$=50, and then proceeds to step S126. If $a_{NSK}$≦50, the control proceeds directly to step S126.

In step S126, the above-mentioned calculation of expression (7) is conducted to calculate the rolling bearing life $L_A$, and the control then proceeds to step S127 to judge whether the calculated rolling bearing life $L_A$ is equal to or shorter than 200,000 hours or not. If $L_A$>200,000 Hr, the control proceeds to step S128 to set $L_A$=200,000 Hr or longer, and then proceeds to step S129. If $L_A$≦200,000 Hr, the control proceeds directly to step S129.

Figure 21:
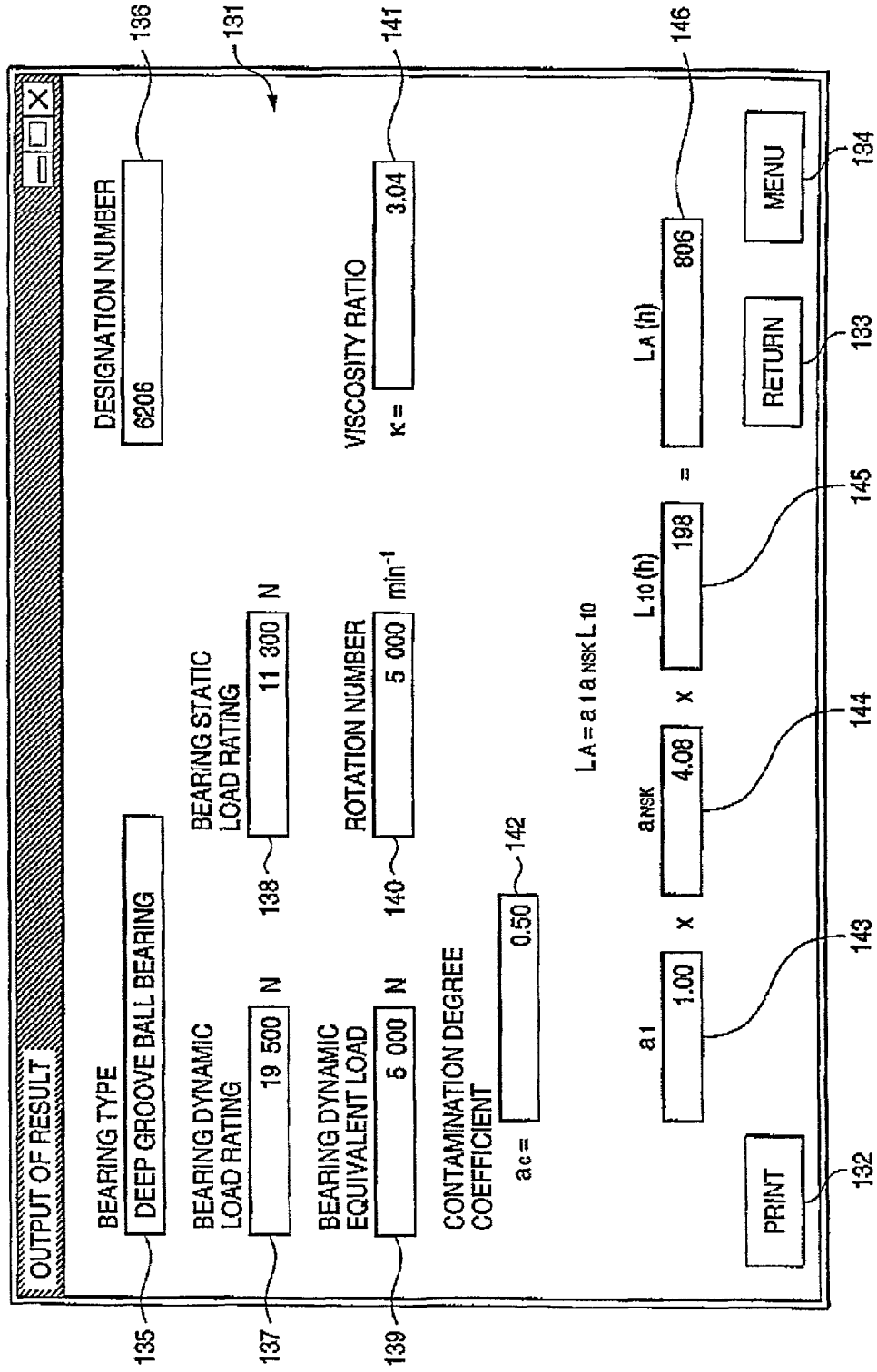
FIG. 21 is a view showing a result output screen.

In step S129, the determined bearing life $L_A$ is displayed in a result output screen shown in FIG. 21.

The result output screen comprises a display area 131 in which predetermined items are displayed, and buttons which are arranged below the display area 131, or a print button 132, a return button 133, and a menu button 134. The display area 131 comprises: a text box 135 for displaying the bearing type; a text box 136 for displaying the designation number; a text box 137 for displaying the bearing dynamic load rating; a text box 138 for displaying the bearing static load rating; a text box 139 for displaying the bearing dynamic equivalent load; a text box 140 for displaying the rotation number; a text box 141 for displaying the viscosity ratio κ; a text box 142 for displaying the contamination degree coefficient $a_c$; a text box 143 for displaying the reliability coefficient $a_1$; a text box 144 for displaying the life correction coefficient $a_{NSK}$; a text box 145 for displaying the conventional life $L_{10}$; and a text box 146 for displaying the rolling bearing life $L_A$.

Thereafter, the control proceeds to step S130 to judge whether the set rolling bearing life $L_A$ is equal to or shorter than the desired life $L_U$ which is set by the user or not. If $L_A$≧$L_U$, it is judged that the life satisfies the desired life $L_U$ which is requested by the user, and the control then proceeds to step S131 to display the description screen which is shown in FIG. 22, and in which advantages due to the consideration of the fatigue limit load are described.

In the description screen, displayed are a display area 351 in which the advantages due to the consideration of the fatigue limit load are displayed, and a close button 352 which is disposed below the area.

In the display area 351, "In the rolling bearing calculation expression which has been described in the conventional art paragraph, the concept of a fatigue limit is not considered. In endurance tests conducted by the assignee of the present invention, some bearings under a clean and low-load service environment have a life which is longer by 50 or more times than that calculated by the conventional life calculation expression, and continue to operate for 20 or more years without causing flaking. Under a service environment in which the temperature rise is suppressed, the cleanness is relatively high, and the load is low, moreover, some bearings for a machine tool have actually attained a life which is longer by 80 or more times than that calculated by the life conventional calculation expression. The above phenomena suggest that, as shown in the figure below, the fatigue limit load Pu affects the rolling fatigue life. The fatigue limit load Pu is defined as an equivalent load at the maximum contact surface pressure $P_{max}$=1.5 GPa which is generated when a rolling element and the bearing ring are contacted with each other under a clean and ideal state.", and a characteristic curve diagram in which the abscissa indicates the endurance time, and the ordinate indicates the bearing load are displayed. As shown in the characteristic curve diagram, in the conventional theory, the bearing load is linearly decreased as the endurance time is increased, as indicated by the characteristic curve $L_1$. By contrast, in the new life theory according to the present invention, the rate of change of the bearing load is gradually decreased as the endurance time is increased, so that the bearing load is indicated as an asymptotic line approaching to the fatigue limit load Pu as indicated by the characteristic curve $L_2$.

Figure 23:
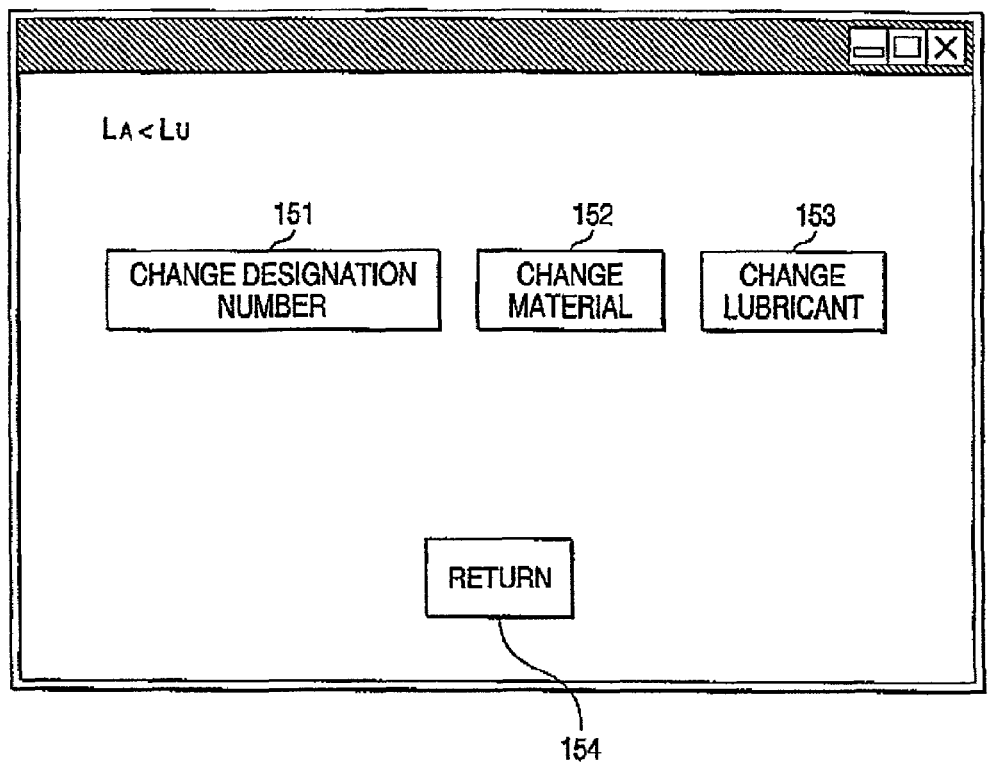
FIG. 23 is a view showing a change selection screen.

If a result of the judgement in step S130 shows that $L_{A<LU}$, the control proceeds to step S132 to display a change selection screen shown in FIG. 23.

In the change selection screen, disposed are a selection button 151 for selecting an increased size of the rolling bearing by changing the designation number, a selection button 152 for selecting the contamination degree coefficient $a_c$ to be changed to a larger value, a selection button 153 for selecting the viscosity ratio κ of the lubricant to be increased, and a return button 154.

Thereafter, the control proceeds to step S133 to judge whether the selection button 151 is selected or not. If the selection button 151 is selected, the control returns to step S11 in the above-mentioned bearing selecting process of FIG. 5, and, if the selection button 151 is not selected, the control proceeds to step S134 to judge whether the selection button 152 is selected or not. If the selection button 152 is selected, the control returns to step S101 in the above-mentioned new life calculating process of FIG. 17, and, if the selection button 152 is not selected, the control proceeds to step S135 to judge whether the selection button 153 is selected or not. If the selection button 153 is selected, the control returns to step S71 in the above-mentioned lubrication parameter calculating process of FIG. 14, and, if the selection button 153 is not selected, it is judged whether the return button 154 is selected or not. If the return button 154 is selected, the control returns to step S129, and, if the return button 154 is not selected, the control returns to step S133.

In the above processes, the process of FIG. 5 corresponds to the data information inputting means. The process of steps S36 and S37 in FIG. 8 and the reliability description screen of FIG. 11 correspond to the reliability setting means. The process of FIG. 12 corresponds to the dynamic equivalent load calculating means. The process of FIG. 14 corresponds to the lubrication parameter calculating means. The process of steps S102 and S103 in FIG. 17 and the contamination degree coefficient definition screen of FIG. 19 correspond to the contamination degree setting means. The process of steps S104 to S111 in FIG. 17 corresponds to the fatigue limit load calculating means. The process of steps S112 to S119 in FIGS. 17 and 18 corresponds to the load parameter calculating means. The process of steps S123 to S125 in FIG. 18 and the life correction coefficient calculation map of FIG. 20 correspond to the life correction coefficient setting means. The process of steps S126 to S129 in FIG. 18 corresponds to the bearing life calculating means. The process of steps S130, and S132 to S135 corresponds to the recalculation judging means.

It is assumed that the life of a deep groove ball bearing of a designation number of "6206" is to be predicted. First, the computer main unit 2 is powered on to activate the operating system and then the life prediction application software.

As a result, the rolling bearing life predicting process shown in FIG. 3 is started, and the initial menu screen shown in FIG. 4 is first displayed. In the initial menu screen, for example, the bearing choosing and selecting area A1 is clicked on with the mouse 5, whereby the bearing selection screen shown in FIG. 6 is displayed. In the bearing selection screen, when a bearing is to be searched from the bearing table, at least the text boxes 22a, 22b, and 22c for the inner diameter, the shape, and the width are sequentially selected with the mouse 5, the desired dimensions in mm, "30", "62", and "16" of the rolling bearing are input through the keyboard 4, and the deep groove ball bearing selection button 22d is selected.

As a result, the electronic catalog is retrieved, and data information of the corresponding designation number "6206", such as the principal dimensions d, D, B, and r, the basic dynamic load rating C, the basic static load rating $C_0$, the coefficient $f_0$, the allowable rotation number, the radial load factor X, and the thrust load factor Y are displayed in the form of hollow characters on the bearing table screen of FIG. 7.

Also when the designation number "6206" is directly input, the bearing table screen of FIG. 7 is similarly displayed.

When, in the bearing table screen, the new-life calculation button 33 is selected by clicking with the mouse 5, the new-life calculation screen of FIG. 9 is displayed. When, in the new-life calculation screen, the read button 43 is clicked on, data information of the designation number which is selected in the bearing table of FIG. 7 is sequentially input. Namely, "Deep groove ball bearing" is displayed in the combo box 51 as the bearing type, "6206" is displayed in the text box 52 for the designation number, "19500" is displayed in the text box 53 for the basic dynamic load rating C, "1130" is displayed in the text box 54 for the basic static load rating $C_0$, "30" is displayed in the text box 55 for the bearing inner diameter d, and "62" is displayed in the text box 56 for the bearing outer diameter D.

Thereafter, the load factor definition screen shown in FIG. 10 is displayed on the new-life calculation screen. Referring to the definition screen, the load factor $f_w$ is determined from the operation condition and the installation place. In this example, the load factor $f_w$ is determined to "1.0" which is the default value, so as to be used in an electric motor, a machine tool, an air conditioner, or the like to provide smooth shockless operation.

When the close button 262 is then selected, the load factor definition screen is closed, and instead the reliability coefficient description screen shown in FIG. 11 is displayed. Referring to the reliability coefficient description screen, the reliability coefficient $a_1$ is determined. In this example, the reliability is determined to 90% which is the default value, and hence "1.00" is determined as the reliability coefficient $a_1$.

Thereafter, the close button 264 is selected with the mouse 5 to close the reliability coefficient description screen, thereby setting the new-life calculation screen shown in FIG. 9 to the active state. At this time, the determined load factor $f_w$ and reliability coefficient $a_1$ are input into the text boxes 58 and 59 with using the keyboard 4, respectively. In this example, the default values are used, and hence the inputting operation is omitted.

When the dynamic equivalent load calculation button 60 is selected with the mouse 5 under this state, the dynamic equivalent load calculation screen shown in FIG. 13 is displayed. In the dynamic equivalent load calculation screen, an ideal radial load Fr and an ideal axial load Fa which are obtained from the service condition are input into the text boxes 78 and 79 with using the keyboard 4, and the rotation number, for example, "5000" $min^{-1}$ is input into the text box 80 with using the keyboard 4. At this time, in the case where there are plural service conditions, the additional input button 82 is selected with the mouse 5, and the ideal radial load Fr, the ideal axial load Fa, the rotation number N, and a service condition ratio in another service condition are then input with using the keyboard 4.

When operations of inputting the data are completed and the calculation button 72 is then selected with the mouse 5, the calculation of expression (9) above is performed to calculate the dynamic equivalent load P. In the case of plural service conditions, the average rotation number N is calculated, and, in the case of a single service condition, the rotation number which is input into the text box 80 is calculated as the average rotation number N. The calculated dynamic equivalent load P and average rotation number N are displayed in the text boxes 83 and 84, respectively.

Thereafter, the result introduction button 73 is selected with the mouse 5 to close the dynamic equivalent load calculation screen, and activate the new-life calculation screen of FIG. 9, so that the calculated dynamic equivalent load P and average rotation number N are displayed in the text boxes 57 and 61, respectively.

When the calculated dynamic equivalent load P is larger than 50% of the basic dynamic load rating C, or when it exceeds the basic static load rating $C_0$, a warning message is displayed.

With respect to the average rotation number also, when it exceeds the allowable rotation number in grease lubrication or oil lubrication, a warning message is displayed.

When, in the displayed new-life calculation screen, the operating viscosity calculation button 64 is selected with the mouse 5, the lubrication parameter calculation screen shown in FIG. 15 is displayed on the new-life calculation screen. In the lubrication parameter calculation screen, the diameter dm of the pitch circle is displayed in the text box 93 in accordance with the data information of the electronic catalog, the average rotation number N which is calculated in the dynamic equivalent load calculation screen is displayed in the text box 94 as the bearing rotation number, and the default value "1.00" is displayed as the bearing performance coefficient A. Under this state, a lubricant to be used, for example, "ISO VG68" is selected from the lubricant list in the combo box 87 to be displayed. In response to this selection, the viscosity of the lubricating oil at 40° C., and that at 100° C. are displayed in the text boxes 88 and 89, respectively. When, under this state, the operating temperature is input into the text box 90 with using the keyboard 4 and the operating viscosity calculation button 82 is then selected with the mouse 5, the operating viscosity ν at the operating temperature is calculated by a proportional calculation on the basis of a straight line connecting the lubricant viscosities at 40° C. and 100° C. The calculated operating viscosity is displayed in the text box 91.

Next, the required viscosity calculation button 83 is selected and clicked on with the mouse 5. Since the bearing rotation number N is 5,000 min$^{-1}$ or higher than 1,000 min$^{-1}$, the coefficient K is set to "1", and the calculation of expression (11) above is performed to calculate the required viscosity $\nu_1$, on the basis of the coefficient K, the bearing rotation number N, and the diameter dm of the pitch circle. The calculated viscosity is displayed in the text box 95.

Figure 16:
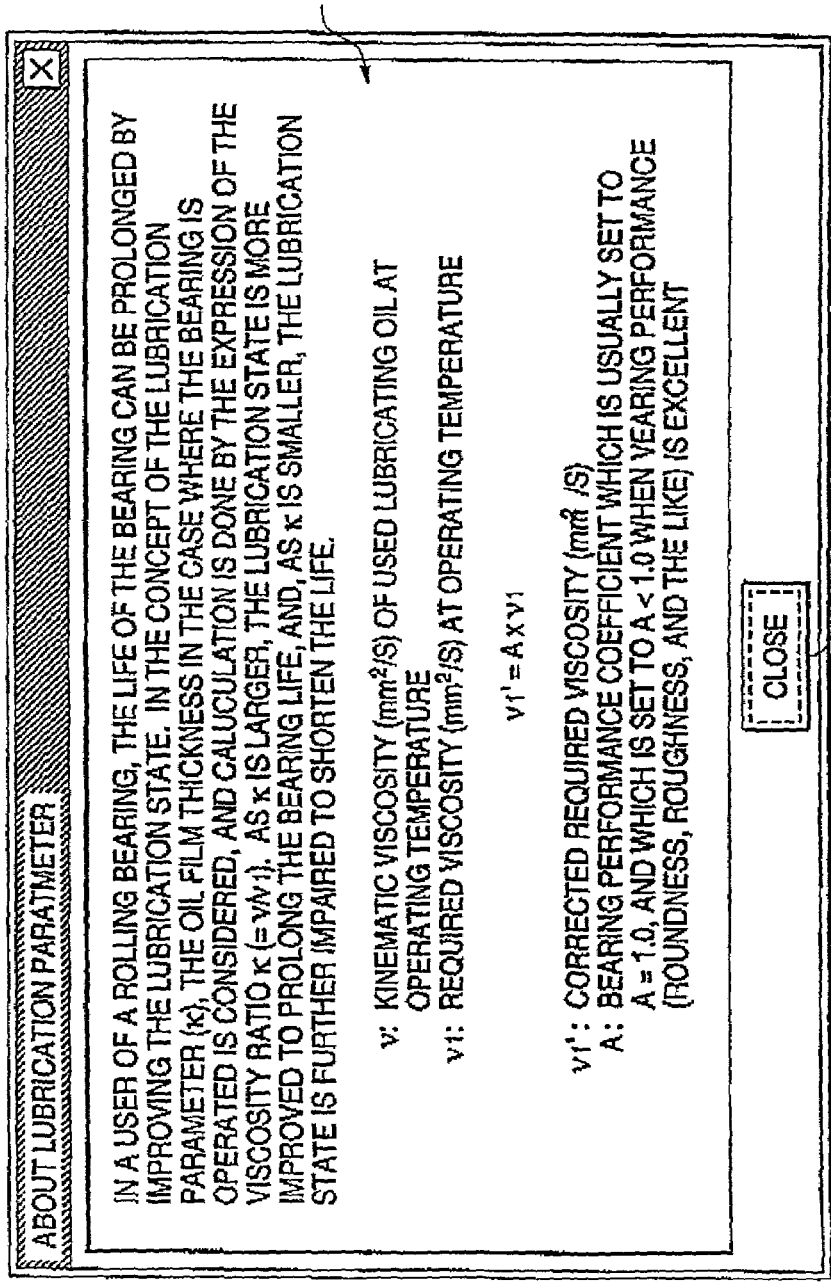
FIG. 16 is a view showing a lubrication parameter description screen.

Next, the lubrication parameter description screen of FIG. 16 is displayed on the lubrication parameter calculation screen, and it is judged from the description of the bearing performance coefficient A in the description statement whether the bearing performance coefficient A remains to be "1.00" or not. Thereafter, the close button 111 is selected and clicked on with the mouse 5, whereby the lubrication parameter description screen shown in FIG. 15 is closed and the lubrication parameter calculation screen shown in FIG. 15 is set to the active state. When the bearing performance coefficient A is to be changed as a result of the judgement in the lubrication parameter description screen, a new bearing performance coefficient A is input with using the keyboard 4, and the calculation of expression (12) is then performed to calculate the corrected required viscosity $\nu_1'$. The calculated viscosity is displayed in the text box 97. Then, the calculation of expression (13) above is performed to calculate the lubrication parameter κ indicated by a viscosity ratio, and the calculated parameter is displayed in the text box 98.

When, under this state, the calculation result introduction button 284 is selected and clicked on with the mouse 5, the lubrication parameter calculation screen is closed and the new-life calculation screen shown in FIG. 9 is set to the active state. The lubricant "ISO VG68" is displayed in the text box 62 of the screen, and "28.5" is displayed as the operating viscosity ν in the text box 63.

Thereafter, the contamination degree coefficient definition screen shown in FIG. 19 is displayed on the new-life calculation screen, and it is judged whether the contamination degree coefficient $a_c$ remains to be the default value "Ordinary ($a_c$=0.5)" or not. When the service condition is the ordinary one, the default value is used as it is. When a sealed greased bearing for an electrical appliance or information in which a filter management of 10 μm or smaller is conducted is used, very high cleanness is attained and hence the contamination degree coefficient $a_c$ is set to "1". When the required cleanness is lower, the contamination degree coefficient $a_c$ has a smaller value in accordance with the level. When the bearing is to be used in a heavily contaminated state, the contamination degree coefficient $a_c$ is set to "0.05".

Next, a sum Σρ of the principal curvatures is calculated in accordance with expression (14) above on the basis of the principal curvatures $\rho_{11}$ and $\rho_{12}$ of the article 1 and the principal curvatures $\rho_{21}$ and $\rho_{22}$ of the article 2, and cos τ is calculated on the basis of the calculated sum Σρ and the principal curvatures $\rho_{11}$, $\rho_{12}$, $\rho_{21}$, and $\rho_{22}$. On the basis of these values, the storage table, or a map indicating relationships between cost and the viscosity ν and the coefficient of friction μ is referred, and the viscosity ν and the coefficient of friction μ are calculated. Since the bearing type is a ball bearing, the calculation of expression (16) above is performed to calculate the fatigue limit load Pu, and the load parameter $\{(P-Pu)/C\}\cdot 1/a_c$ is then calculated on the basis of the calculated values, or the fatigue limit load Pu, the dynamic equivalent load P, the bearing dynamic load rating C, and the contamination degree coefficient $a_c$. On the basis of the calculated load parameter $\{(P-Pu)/C\}\cdot 1/a_c$ and the lubrication parameter κ, the life correction coefficient calculation map of FIG. 20 is referred to calculate the life correction coefficient $a_{NSK}$. Then, the calculation of expression (7) above is performed to calculate the bearing life $L_A$, and the result output screen shown in FIG. 21 is displayed so as to display the reliability coefficient $a_1$, the life correction coefficient $a_{NSK}$, the conventional life $L_{10}$, and the bearing life $L_A$ in the text boxes 143, 144, 145, and 146, respectively.

In the result output screen, the print button 132 may be selected and clicked on with the mouse 5, so that all the data displayed on the result output screen are printed by the printer 6.

Thereafter, it is judged whether the calculated bearing life satisfies the bearing life desired by the user or not. If yes, the process is ended. If the calculated bearing life fails to satisfy the bearing life desired by the user, one of the followings: that the designation number is changed so as to increase the size of the bearing to be used; that the filter management of the lubricant is enhanced to increase the contamination degree coefficient $a_c$: and that the viscosity ratio κ of the lubricant is increased is determined by selecting either of the selection buttons 151 to 153 in the change selection screen shown in FIG. 23. On the basis of the determination, the bearing life $L_A$ is recalculated, so that it is possible to select a rolling bearing which satisfies the bearing life desired by the user.

As described above, according to the embodiment, the dynamic equivalent load P and the fatigue limit load Pu are calculated, the contamination degree coefficient $a_c$ is determined in consideration of the material coefficient, and the basic dynamic load rating C is input from the data information, thereby calculating the load parameter $\{(P-Pu)/C\} \cdot 1/a_c$. The lubrication parameter κ is calculated on the basis of the lubricant information. Referring to the life correction coefficient calculation map shown in FIG. 20, the life correction coefficient $a_{NSK}$ is calculated. On the basis of the life correction coefficient $a_{NSK}$, the reliability coefficient $a_1$, the basic dynamic load rating C, the dynamic equivalent load P, and the load index p, the calculation of expression (7) above is performed to calculate the bearing life $L_A$. In the conventional theory, as the endurance time is increased, the bearing load is linearly decreased as indicated by the characteristic curve $L_1$ of FIG. 22. By contrast, in the new life theory according to the present invention, the rate of change of the bearing load is gradually decreased as the endurance time is increased, and the bearing load is indicated as an asymptotic line approaching to the fatigue limit load Pu as indicated by the characteristic curve $L_2$. Therefore, correct life prediction conforming to the actual life of the rolling bearing can be conducted.

EXAMPLE

In Table 3 below, shown are conditions and results of tests and experiments which were conducted with using a deep groove ball bearing of a designation number of "6206", and calculation results of the conventional life calculation expression $L_{CA}$ which is calculated by $(C/P)^p$ while setting $a_1=a_2=a_3=1.0$ and the new-life calculation expression $L_A$ of the invention. The tests were conducted at the revolution number N=5,000 rpm, and the test temperature was 40 to 145° C.

TABLE 3

|   | P/C | κ | $a_c$ | $\{(P-Pu)/C\} \cdot 1/a_c$ | Experiment $L_{10}$ hr | Conventional expression $L_{CA}$ hr | New expression $L_A$ hr |
|---|-----|---|-------|--------|--------|--------|--------|
| 1 | 0.1 | 0.1 | 1.0 | 0.1 | 580 | 5,556 | 560 |
| 2 | 0.1 | 0.8 | 0.8 | 0.1 | 44,400 |  | 43,340 |
| 3 | 0.1 | 1.5 | 0.5 | 0.2 | 91,040 |  | 90,010 |
| 4 | 0.3 | 0.3 | 1.0 | 0.3 | 45 | 206 | 41 |
| 5 | 0.3 | 1 | 0.5 | 0.6 | 390 |  | 371 |
| 6 | 0.3 | 2 | 0.3 | 0.9 | 355 |  | 330 |
| 7 | 0.5 | 0.5 | 1.0 | 0.5 | 28 | 44 | 22 |
| 8 | 0.5 | 1.5 | 0.4 | 1.2 | 49 |  | 48 |
| 9 | 0.5 | 3 | 0.2 | 2.4 | 43 |  | 40 |
| 10 | 0.7 | 1 | 1.0 | 0.8 | 26 | 16 | 24 |
| 11 | 0.7 | 2 | 1.0 | 0.8 | 37 |  | 35 |
| 12 | 0.7 | 4 | 0.5 | 1.3 | 23 |  | 22 |

In Table 4 below, shown are conditions and results of tests and experiments which were conducted with using a tapered roller bearing of a designation number of "L4649/610", and calculation results of the conventional life calculation expression $L_{CA}$ which is calculated by $(C/P)^p$ while setting $a_1=a_2=a_3=1.0$ and the new-life calculation expression $L_A$ of the invention. The tests were conducted at the revolution number N=1,000 rpm, and the test temperature was 40 to 145° C.

In each of the tests, an N=10 number of bearings were used, and the peeling life $L_{10}$ (hr) at a 90%-reliability in a peeled visual line was obtained. Mineral oil of VG 15 to 150 was used as the lubricating oil.

TABLE 4

|   | P/C | κ | $a_c$ | $\{(P-Pu)/C\} \cdot 1/a_c$ | Experiment $L_{10}$ hr | Conventional expression $L_{CA}$ hr | New expression $L_A$ hr |
|---|-----|---|-------|--------|--------|--------|--------|
| 1 | 0.1 | 0.1 | 1.0 | 0.1 | 3,650 | 35,907 | 3,591 |
| 2 | 0.1 | 0.8 | 0.8 | 0.1 | 161,000 |  | 150,400 |
| 3 | 0.1 | 1.5 | 0.5 | 0.1 | 200,000 un-peeled |  | 200,000 or longer |
| 4 | 0.3 | 0.3 | 1.0 | 0.2 | 285 | 922 | 265 |
| 5 | 0.3 | 1 | 0.5 | 0.4 | 1,690 |  | 1,650 |
| 6 | 0.3 | 2 | 0.3 | 0.6 | 1,624 |  | 1,600 |
| 7 | 0.5 | 0.5 | 1.0 | 0.4 | 73 | 168 | 69 |
| 8 | 0.5 | 1.5 | 0.4 | 1.0 | 195 |  | 180 |
| 9 | 0.5 | 3 | 0.2 | 1.9 | 160 |  | 151 |
| 10 | 0.7 | 1 | 1.0 | 0.6 | 85 | 55 | 70 |
| 11 | 0.7 | 2 | 1.0 | 0.6 | 121 |  | 100 |
| 12 | 0.7 | 4 | 0.5 | 1.2 | 79 |  | 77 |

Figure 24:
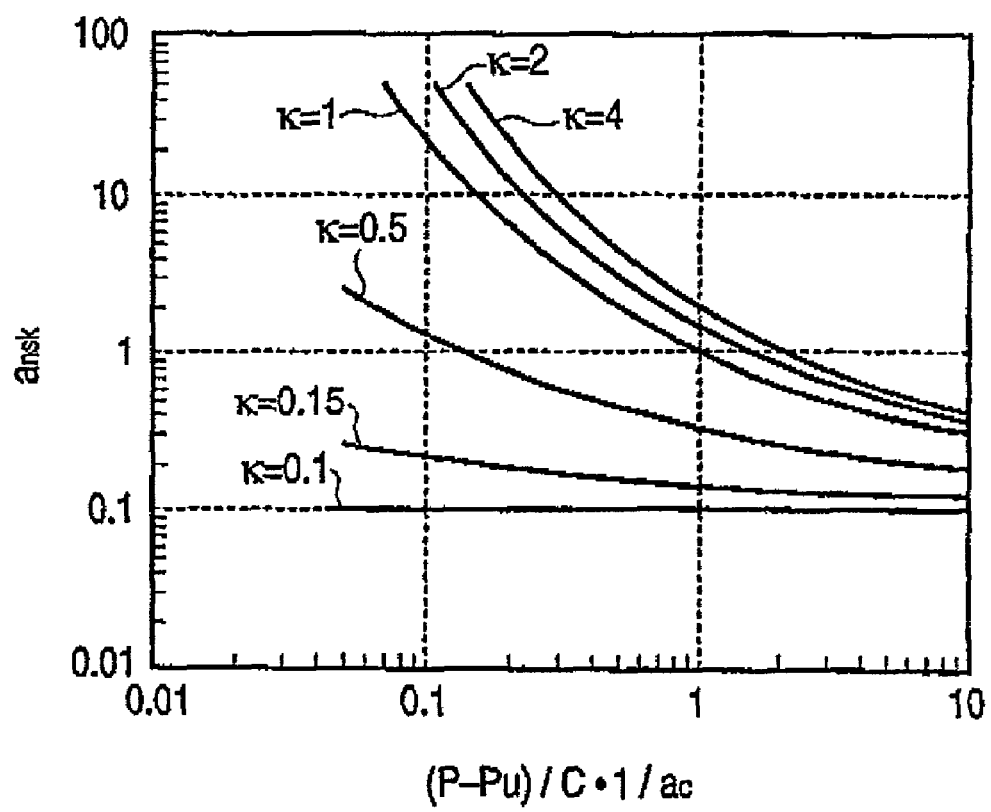
FIG. 24 is a characteristic diagram showing relationships between a load parameter $(P-Pu)/C \cdot (1/a_c)$ and a life correction coefficient $a_{NSK}$ with using a viscosity ratio $\kappa$ as a parameter in the case where the rolling bearing is a ball bearing.
Figure 25:
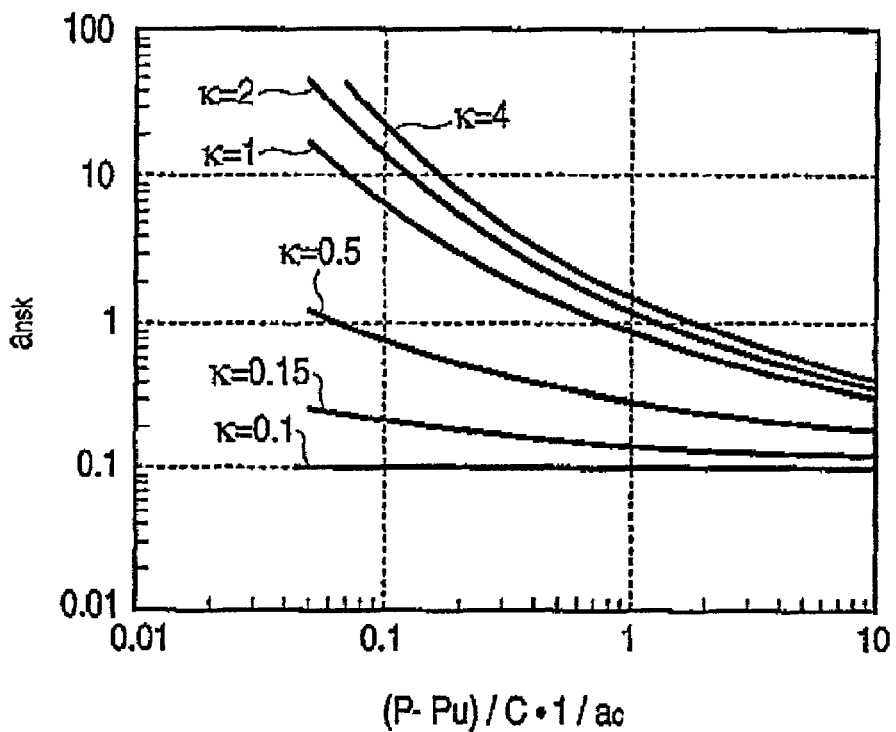
FIG. 25 is a characteristic diagram showing relationships between the load parameter $(P-Pu)/C \cdot (1/a_c)$ and the life correction coefficient $a_{NSK}$ with using the viscosity ratio $\kappa$ as a parameter in the case where the rolling bearing is a roller bearing.
Figure 26:
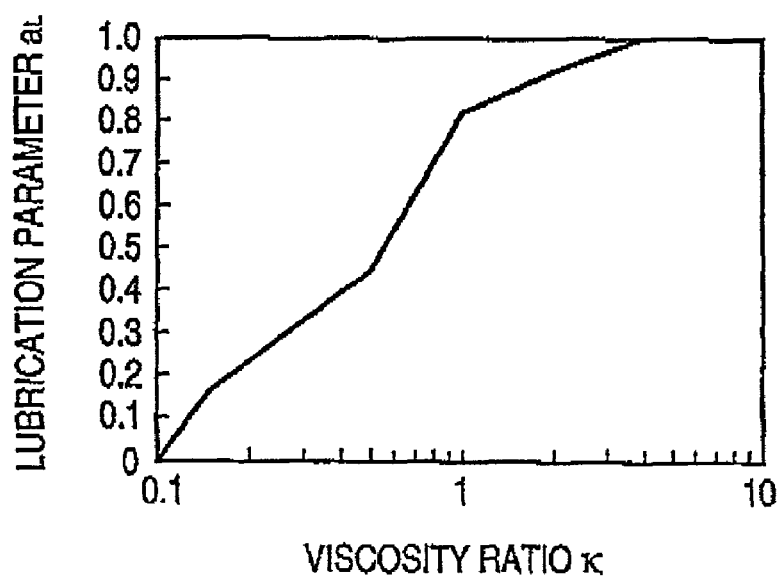
FIG. 26 is a characteristic diagram showing relationships between the viscosity ratio $\kappa$ and a lubrication parameter $a_L$.

The life correction coefficient calculation map which was used in the new life prediction according to the invention in the case of a ball bearing is shown in FIG. 24, and that in the case of a roller bearing is shown in FIG. 25.

Calculations were performed by using the life correction coefficient calculation map and substituting conditions into the test results of Tables 3 and 4, and the conventional life calculation expression (JIS B 1518) and the life calculation expression $L_A$ of the invention were compared with each other. In all the test results, the values of the life calculation expression of the invention satisfactorily coincide with the actual values $L_{10}$ within an error range of about 10%. It was proved that the accuracy of the life prediction according to the invention is improved as compared with that of the conventional art.

In the experiments, SUJ2 was used as the material. In the case where steel of higher cleanness is used, the fatigue limit load Pu may be set to be higher than the current maximum contact surface pressure $P_{max}$=1,500 MPa.

A bearing which is to be used in an environment where a foreign material may enter the bearing is preferably configured in the following manner. With respect to a special bearing such as that in which the amount of retained austenite is 20 to 50% and the hardness Hv is 700 to 850 as described in NSK Technical Journal No. 652 (1992, pp. 9–16), it seems effective to incorporating the contamination degree coefficient $a_c$ into the calculation expressions (7) and (8) with setting the coefficient as a function of the value of SUJ2 as indicated by following expression (18):

$$a_c = g(a_m, a_c) \qquad (18)$$

In order to schematize the relationship between the viscosity ratio κ and the life ratio so as to be reflected into the calculation expressions, the relationship between the viscosity ratio κ and the life may be defined as the lubrication parameter $a_L$ as shown in FIG. 25, in consideration of the relational diagram between the viscosity ratio κ and the service condition coefficient $a_3$ appearing in Beiblatt 1993 DIN ISO281, and the relational diagram between Λ and $a_{23}$ which has already been reported by the inventor (Proceedings of Japan Tribology Conference (Osaka, 1997-11, pp.

324–326)). In this case, a life calculation expression of higher accuracy can be obtained.

In the first embodiment described above, the contamination degree coefficient definition screen, the reliability coefficient description screen, the lubrication parameter description screen, the contamination degree coefficient definition screen, and the life correction coefficient description screen are automatically displayed. The invention is not restricted to this. Alternatively, display buttons for displaying such definition and description screens may be disposed in the new-life calculation screen, the lubrication parameter calculation screen, and the like which use such screens, and the buttons may be selected and clicked on with the mouse 5 so as to display a selected one of the screens. Alternatively, a pull-down menu for items such as help may be disposed in the tool bar, and a menu for displaying such screens may be registered in the pull-down menu.

In the first embodiment described above, the life prediction application program is installed into the personal computer 1. The invention is not restricted to this. In the case where a plurality of computers are interconnected as a LAN, the life prediction application program may be installed into one of the computers, and the program may be commonly used by the other computers. Alternatively, a life prediction application program may be stored in a Web site of an Internet, and a client may access the program with or without charge.

The life prediction application program may be stored into a storage medium other than a hard disk, such as a compact disk (CD) or a magnetooptical disk (MO), and carried or installed into another information processing apparatus.

In the first embodiment described above, the life correction coefficient $a_{NSK}$ is calculated on the basis of the lubrication parameter κ and the load parameter $\{(P-Pu)/C\} \cdot 1/a_c$ and with reference to the life correction coefficient calculation map shown in FIG. 20. The invention is not restricted to this. Alternatively, approximate equations of the characteristic curves of the life correction coefficient calculation map of FIG. 20 may be obtained, and the life correction coefficient $a_{NSK}$ may be calculated by a calculation using the equations.

Figure 27:
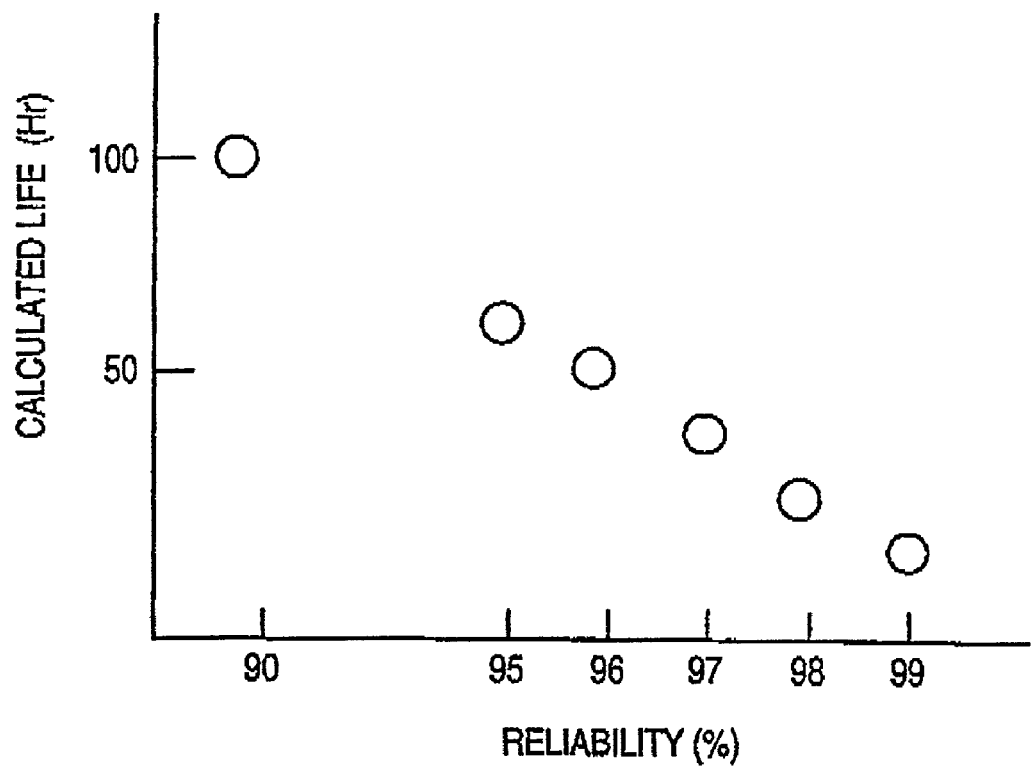
FIG. 27 shows an example of a parametric display.

In the first embodiment described above, the predicted life period is output as a single value as shown in FIG. 21. The invention is not restricted to this. Alternatively, the life predicting calculation may be performed for each of the reliabilities $a_1$ shown FIG. 11 and Table 1, and results of the calculations may be used as parametric indication information which is displayed in the form of a graph such as shown in FIG. 27 wherein the abscissa indicates the predicted life period and the ordinate indicates the reliabilities $a_1$ used in the calculations. The information may be supplied to exhibiting means such as the display device 3 or the printer 6. In the alternative, relationships between the reliabilities $a_1$ and the predicted life periods can be accurately visually recognized for each parameter, so that more preferable customer service information can be provided. The parameter is not restricted to the reliability $a_1$, and any parameter(s) such as the bearing size, the contamination degree, the dynamic bearing load P, the bearing rotation speed, the lubricant kind, the service temperature, and the material kind may be employed.

Next, a second embodiment of the invention will be described with reference to FIG. 28 and following figures.

Figure 28:
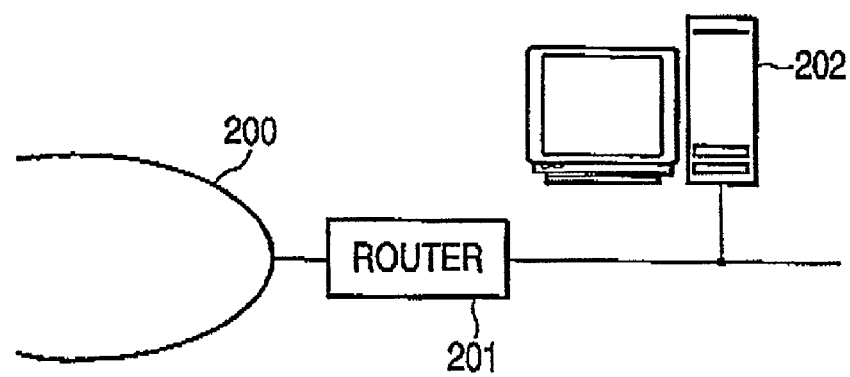
FIG. 28 is a schematic view showing the configuration of a second embodiment of the invention.

In the second embodiment, as shown in FIG. 28, an electronic catalog which stores bearing selection application software including life prediction application software is installed into a hard disk of a WWW (World Wide Web) server 202 connected to the Internet 200 via a router 201.

The bearing selection application software performs a rolling bearing selecting process including the above-mentioned process of predicting the life of a rolling bearing in the first embodiment, on the basis of the input data information with using spreadsheet application software or the like, thereby exhibiting the optimum bearing, the optimum service condition, and the predicted life period which are desired by the user.

Figure 29:
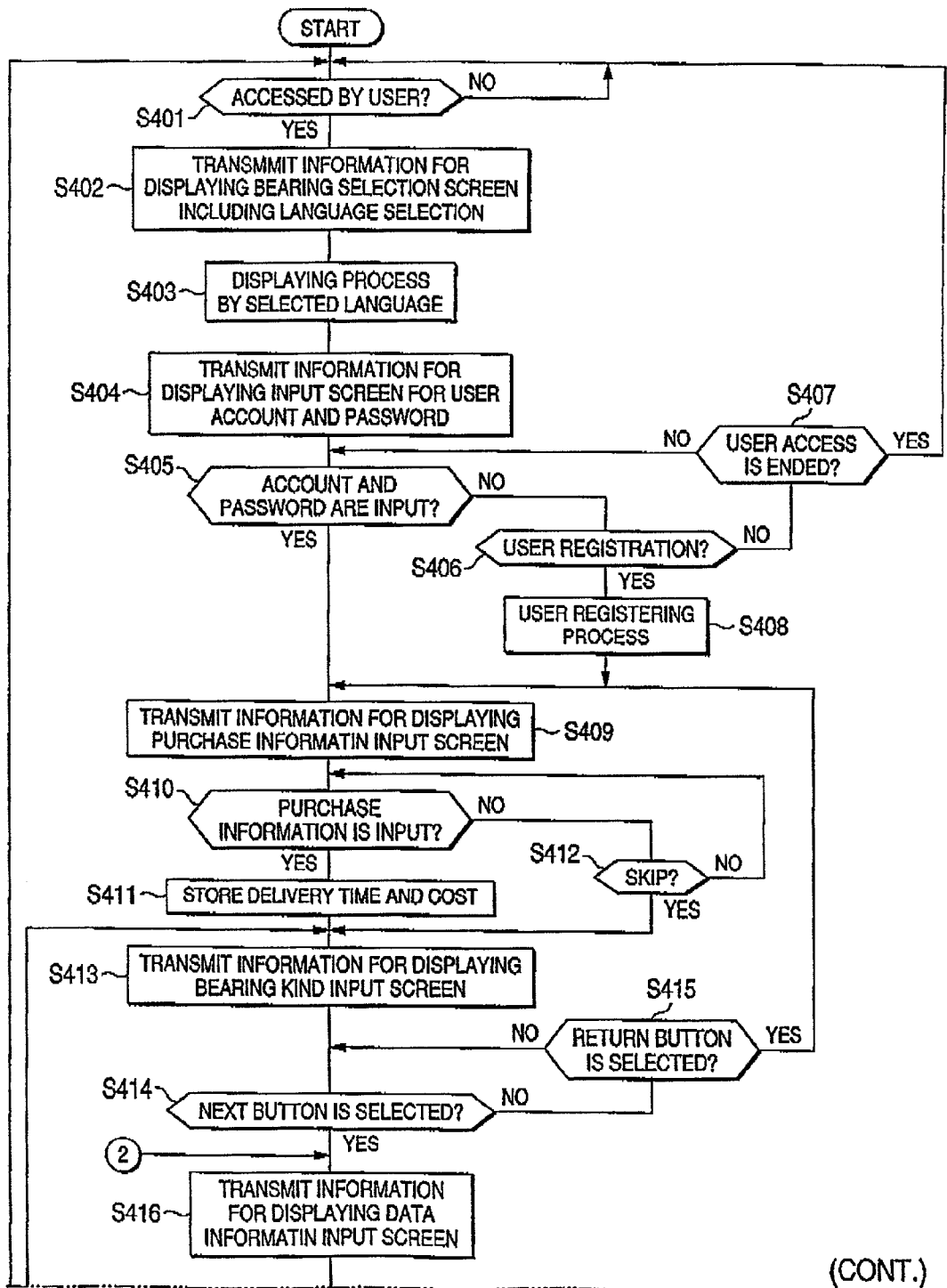
FIG. 29 is a flowchart showing an example of a procedure of a bearing selecting process which is implemented in a WWW server.

In the rolling bearing selecting process, as shown in FIG. 29, it is first judged in step S401 whether the server is accessed through the Internet 200 by an information processing apparatus such as a personal computer of the user or not. If not accessed by the user, the control waits until the server is accessed by the user. If accessed by the user, the control proceeds to step S402 in which display information for displaying a bearing selection screen is transmitted to the information processing apparatus of the user. The bearing selection screen has a language selecting portion for selecting one of languages such as Japanese, English, German, French and the like. Thereafter, the control proceeds to step S403 in which the selected language is judged and a displaying process in the selected language is implemented, and then proceeds to step S404.

In step S404, input screen information for requesting the user to input user account information and a password, and, in the case where user registration has not been conducted, prompting the user to conduct user registration is transmitted to the information processing apparatus of the user. Then, the control proceeds to step S405 to judge whether user account information and a password are input or not. If they are input, the control proceeds to step S409 which will be described later. If user account information and a password are not input, the control proceeds to step S406 to judge whether user registration is selected or not. If it is not selected, the control proceeds to step S407 to judge whether the user access is ended or not. If the user access is ended, the control returns to step S4010, and, if the user access is not ended, the control returns to step S405.

If a result of the judgement in step S406 shows that user registration is selected, the control proceeds to step S408 to implement a process of registering the user, and then proceeds to step S409. In the user registering process, input screen information for displaying an input screen for inputting the name, the name of the company, the name of the post, and the E-mail address or a telephone number is transmitted to the information processing apparatus of the user, and, when predetermined items are input into the input screen information, user account information and a password are issued. Thereafter, the process is ended, and the control proceeds to step S409.

In step S409, information of a purchase information input screen into which a desired delivery time and a desired cost of a bearing are to be input is transmitted to the information processing apparatus of the user. The control then proceeds to step S410 to judge whether, on the basis of the purchase information input screen information, a desired delivery time of a bearing and a desired cost are input or not. If one or both of them are input, the control proceeds to step S411 to store the input desired delivery time and/or desired cost are stored in a predetermined storage area, and then proceeds to step S413. If the desired delivery time and the desired cost are not input, the control proceeds to step S412 to judge whether a skip button is selected or not. If the skip button is not selected, the control returns to step S412, and, if the skip button is selected, the control proceeds to step S413.

Figure 32:
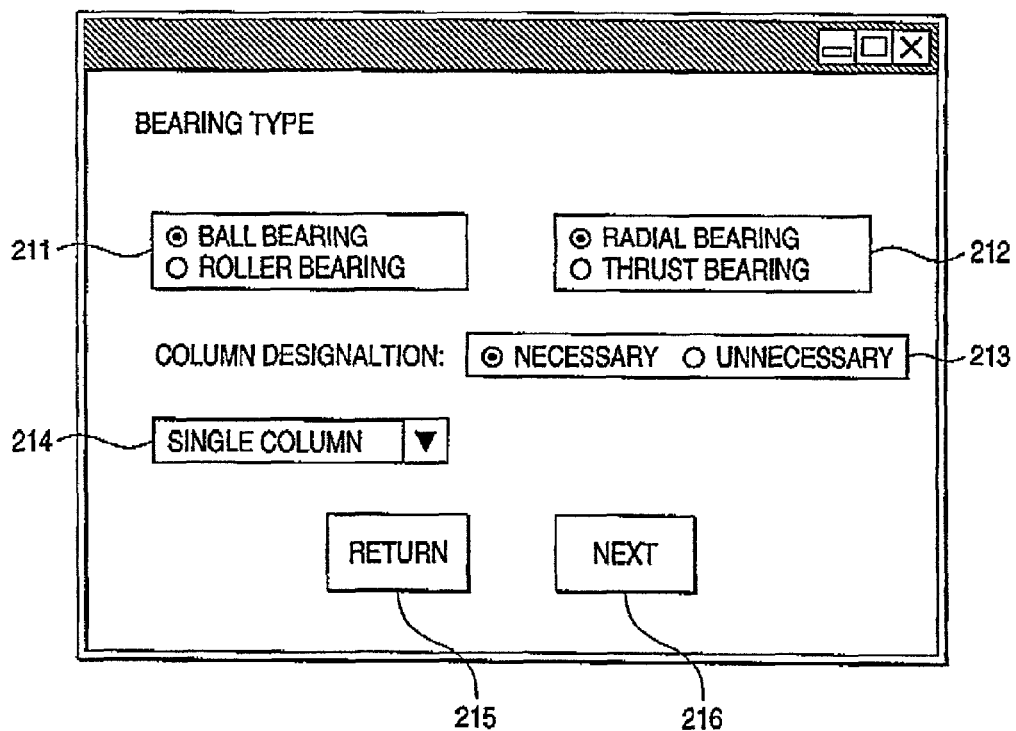
FIG. 32 is a view showing a bearing kind input screen.

In step S413, display information for displaying a bearing kind display screen which is shown in FIG. 32 and into which the bearing kind is to be input is transmitted to the information processing apparatus of the user. In the bearing kind display screen, a check box 211 for selecting one of a ball bearing and a roller bearing, a check box 212 for selecting one of a radial bearing and a thrust bearing, a check box 213 for selecting necessity/unnecessity of column designation, a drop-down box 214 for selecting one of a single column, double columns, and multiple columns, a return button 215, and a next button 216 are displayed, and the check boxes 211 and 212 are set as essential input items.

Next, the control proceeds to step S414 to judge whether the next button 216 is selected or not. If the button is not selected, the control proceeds to step S415 to judge whether the return button 215 is selected or not. If the button is not selected, the control returns to step S414, and, if the button is selected, the control returns to step S409.

Figure 33:
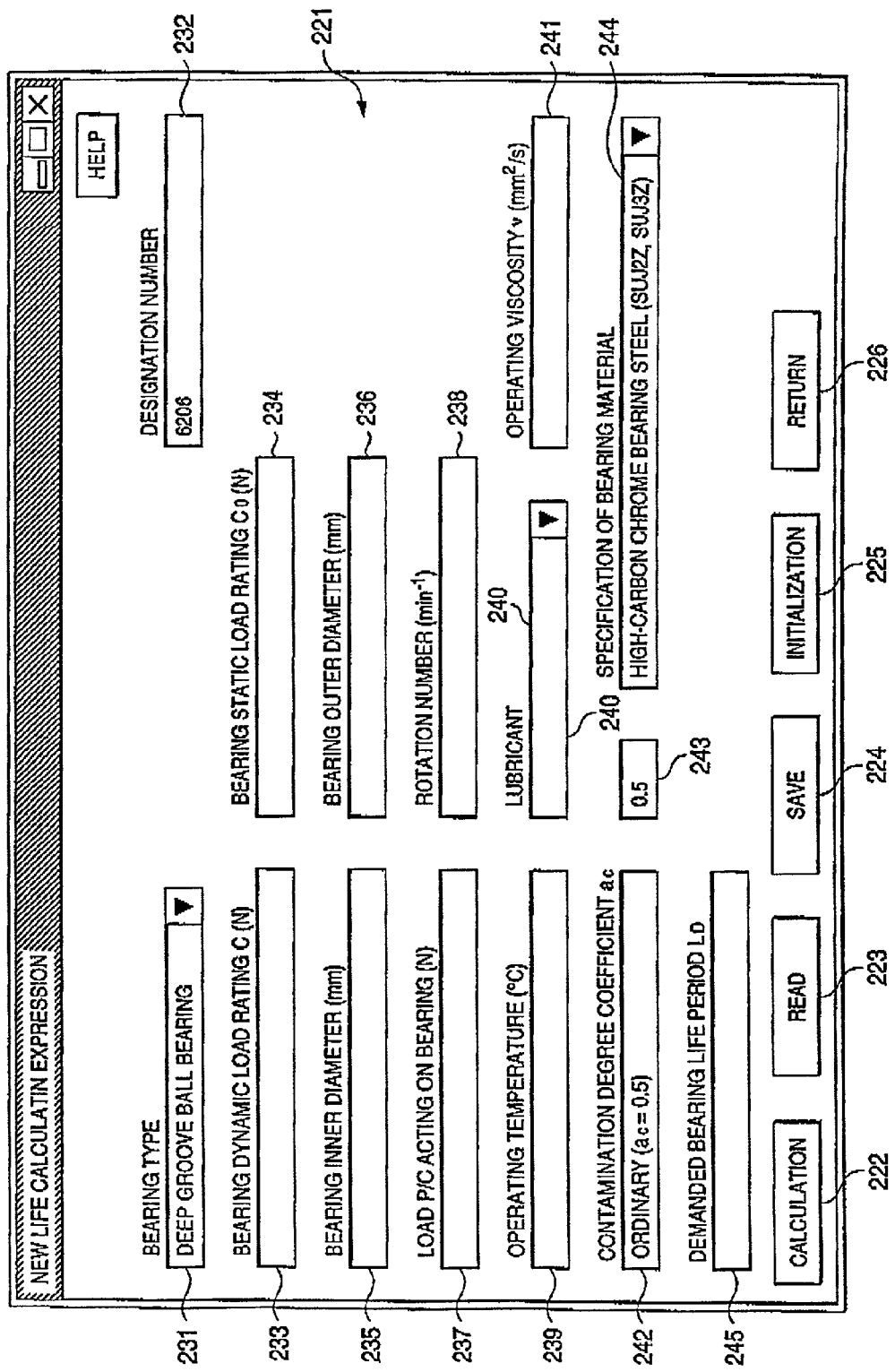
FIG. 33 is a view showing a data information input screen.

If a result of the judgement in step S414 shows that the next button 216 is selected, the control proceeds to step S416 in which display information for displaying a data information input screen shown in FIG. 33 is transmitted to the information processing apparatus of the user. In the data information input screen, disposed are a display area 221 in which predetermined items are displayed, and buttons which are arranged below the display area 221, or a calculation button 222, a read button 223, a save button 224, an initialization button 225, and a return button 226.

The display area 221 includes: a combo box 231 for selecting the bearing type; a text box 232 for inputting the designation number, a text box 233 for inputting the dynamic load rating C of the bearing, a text box 234 for inputting the static load rating $C_0$ of the bearing; a text box 235 for inputting the inner diameter d of the bearing; a text box 236 for inputting the outer diameter D of the bearing; a text box 237 for displaying the load P/C acting on the bearing; a text box 238 for inputting the rotation number; a text box 239 for inputting an operating temperature; a combo box 240 for selecting a lubricant; a text box 241 for displaying the operating viscosity v; a combo box 242 for selecting the contamination degree coefficient $a_c$; a text box 243 for displaying the contamination degree coefficient $a_c$; a combo box 244 for selecting the specification of the bearing material; and a text box 245 for inputting the bearing life period. As default values, "Ordinary ($a_c$=0.5)" is displayed in the combo box 242 for the contamination degree coefficient $a_c$, "0.5" is displayed in the text box 243 for the contamination degree coefficient $a_c$, and "High-carbon chrome bearing steel (SUJ2Z, SUJ3Z)" is displayed in the combo box 244 for the specification of the bearing material. When the read button 223 is selected under a state where the designation number is input into the text box 232, the bearing dynamic load rating C, the bearing static load rating $C_0$, and the inner and outer diameters of the bearing which correspond to the designation number are displayed in the text boxes 233 to 236, respectively. When the save button 224 is selected, the data which are set in the display area 221 are stored. When the initialization button 225 is selected, the data of the display area 221 are returned to the initial state.

Next, the control proceeds to step S417 to judge whether the calculation button 222 is selected or not. If the calculation button is not selected, the control proceeds to step S418 to judge whether the return button 226 is selected or not. If the return button 226 is selected, the control returns to step S413, and, if the return button 226 is not selected, the control returns to step S417.

If a result of the judgement in step S417 shows that the calculation button 222 is selected, the control proceeds to step S419 to judge whether the designation number is input or not. If the designation number is input, the control proceeds to step S420 in which it is judged whether the operation condition items, i.e., the load P/C acting on the bearing, the rotation number of the bearing, the lubricant, the operating viscosity v, the contamination degree coefficient $a_c$, and the specification of the bearing material are input or not. If the operation condition items are input, it is judged that the user requests the life period of the bearing, and the control proceeds to step S422 to perform the above-mentioned bearing life calculating process of the first embodiment, thereby calculating the lubrication parameter κ, the load parameter $\{(P-Pu)/C\} \cdot 1/a_c$, and the life correction coefficient $a_{NSK}$, and the rolling bearing life period $L_A$ is calculated on the basis of the calculated parameters and coefficient. Then, the control proceeds to step S423 in which the calculated rolling bearing life period $L_A$ is displayed, and display screen information for displaying the delivery time and cost of the optimum bearing is transmitted to the information processing apparatus of the user. Thereafter, the control proceeds to step S424 to judge whether an end button included in the display screen information is selected or not. If the end button is selected, the control returns to step S401, and, if the end button is not selected, the control proceeds to step S425 to judge whether the return button is selected or not. If the return button is selected, the control returns to step S416, and, if the return button is not selected, the control returns to step S424.

If a result of the judgement in step S420 shows that the operation condition items are not input, the control proceeds to step S426 to judge whether a demanded bearing life period $L_D$ is input or not. If the demanded bearing life period $L_D$ is not input, the control proceeds to step S427 in which guidance information for prompting the user to input operation condition or the demanded bearing life period is transmitted to the information processing apparatus of the user, and then returns to step S420. If the demanded bearing life period $L_D$ is input, it is judged that the user requests the optimum operation condition, and the control proceeds to step S428 to perform an optimum operation condition determining process.

Figure 30:
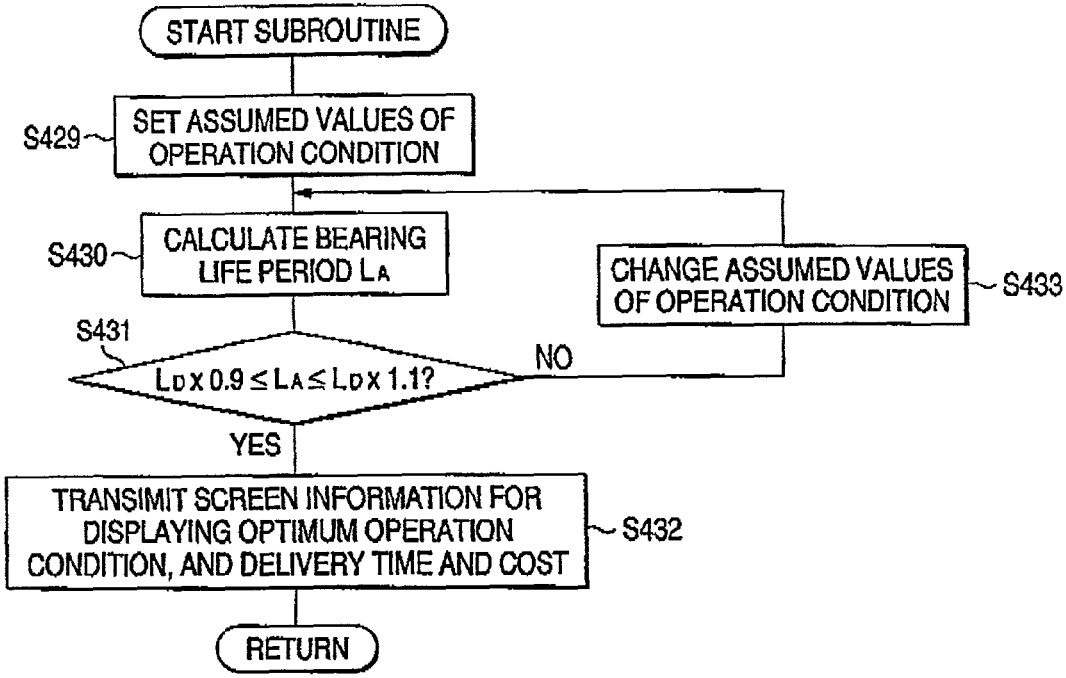
FIG. 30 is a flowchart showing an example of a procedure of an optimum operation condition determining process of FIG. 29.

In the optimum operation condition determining process, as shown in FIG. 30, the control first proceeds to step S429 in which assumed values are set as operation condition.

In the assumed values, for example, P/C=0.1 is set as an assumed value of the load acting on the bearing, a value which is 1/10 of the allowable rotation number is set as that of the bearing rotation number, 50° C. is set as that of the operating temperature, oil: ISO VG68 or grease: NS7 is set as that of the lubricant, $a_c$=0.5 is set as that of the contamination degree coefficient $a_c$, and SUJ2 is set as that of the bearing material.

Next, the control proceeds to step S430 to perform the above-mentioned bearing life calculating process of the first embodiment, on the basis of the assumed values, and the bearing dynamic load rating C and the bearing static load rating $C_0$ based on the designation number, thereby calculating the lubrication parameter κ, the load parameter $\{(P-Pu)/C\} \cdot 1/a_c$, and the life correction coefficient $a_{NSK}$, and the rolling bearing life period $L_A$ is calculated on the basis of the calculated parameters and coefficient. Thereafter, the control proceeds to step S431.

In step S431, it is judged whether the calculated bearing life period $L_A$ is within, for example, ±10% of the input demanded bearing life period $L_D$ or not. If $L_D \times 0.9 \leq L_A \leq L_D \times 1.1$, it is judged that the assumed operation condition is optimum condition. Thereafter, the control proceeds to step S432 in which display information for an optimum condition display screen for displaying the optimum operation condition is transmitted to the information processing apparatus of the user and then displayed, and display screen information for displaying the delivery time and cost of the optimum bearing is transmitted to the information processing apparatus of the user and then displayed. Thereafter, the subroutine process is ended, and the control proceeds to step S424 of FIG. 29.

If a result of the judgement in step S431 shows that $L_A < L_D \times 0.9$ or $L_A > L_D \times 1.1$, the control proceeds to step S433 in which the assumed values of the operation condition are changed to subsequent assumed values that are preset, and then proceeds to step S430.

Returning to FIG. 29, if a result of the judgement in step S419 shows that the designation number is not input, the control proceeds to step S434 to judge whether the above-mentioned operation condition is input or not. If the operation condition is input, the control proceeds to step S435 to judge whether the demanded bearing life period $L_D$ is input or not. If the demanded bearing life period $L_D$ is input, it is judged that the user requests the selection of the optimum bearing, and the control proceeds to step S436 to perform an optimum bearing determining process.

Figure 31:
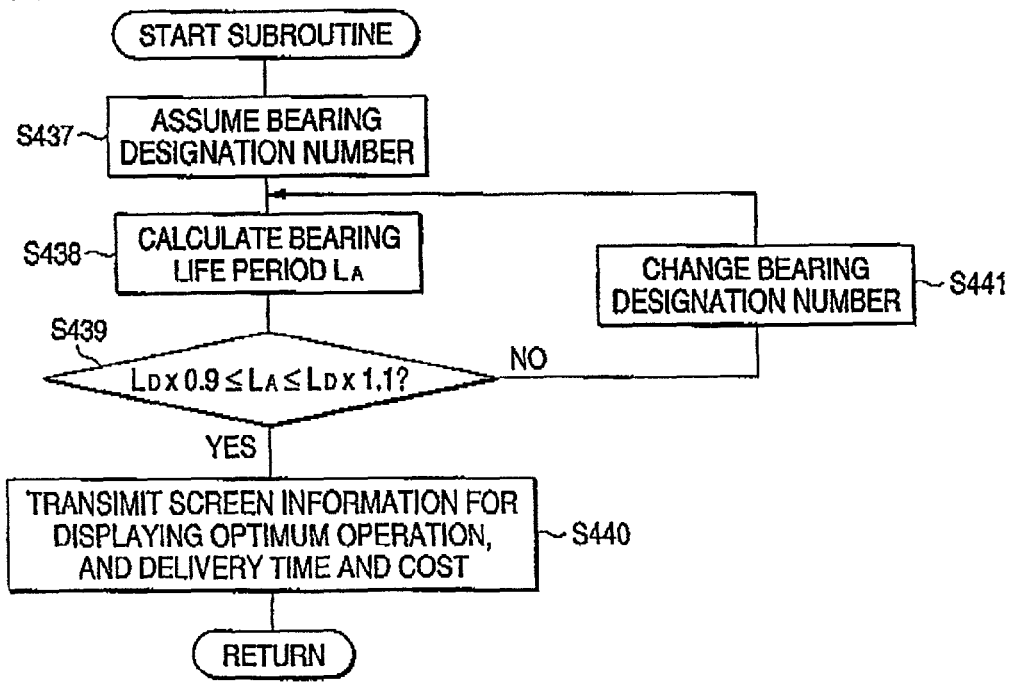
FIG. 31 is a flowchart showing an example of a procedure of an optimum bearing determining process of FIG. 29.

In the optimum bearing determining process, as shown in FIG. 31, the bearing type is first referred in step S437. In the case where the bearing type is a standard bearing which is produced in a large number, for example, a radial ball bearing, one of designation number 6206 indicating a deep groove ball bearing, and designation number 7206 indicating an angular ball bearing is assumed; in the case of a radial roller bearing, one of designation number NU206 indicating a cylindrical roller bearing, and designation number HR30206 indicating a tapered roller bearing is assumed; in the case of a thrust ball bearing, designation number 51306 indicating a thrust ball bearing is assumed; and, in the case of a thrust roller bearing, designation number 29420 indicating a self-aligning thrust roller bearing is assumed.

Next, the control proceeds to step S438 to perform the above-mentioned bearing life calculating process of the first embodiment, on the basis of the assumed designation number, and operation condition, thereby calculating the lubrication parameter κ, the load parameter $\{(P-Pu)/C\} \cdot 1/a_c$, and the life correction coefficient $a_{NSK}$, and the rolling bearing life period $L_A$ is calculated on the basis of the calculated parameters and coefficient. Thereafter, the control proceeds to step S439.

In step S439, it is judged whether the calculated bearing life period $L_A$ is within, for example, ±10% of the input demanded bearing life period $L_D$ or not. If $L_D \times 0.9 \leq L_A \leq L_D \times 1.1$, it is judged that the assumed designation number is optimum condition. Thereafter, the control proceeds to step S440 in which the optimum bearing designation number is displayed, and information of an optimum bearing selection display screen for displaying the delivery time and cost of the optimum bearing is transmitted to the information processing apparatus of the user, and then proceeds to step S424.

If a result of the judgement in step S439 shows that $L_A < L_D \times 0.9$ or $L_A > L_D \times 1.1$, the control proceeds to step S441 in which the assumed bearing designation number is changed to a larger or smaller number, and then returns to step S438.

Returning again to FIG. 29, if a result of the judgement in step S434 shows that operation condition is not input, the control proceeds to step S442 in which guidance information for prompting the user to input the designation number or operation condition is transmitted to the information processing apparatus of the user, and then returns to step S419. If a result of the judgement in step S435 shows that the demanded bearing life period $L_D$ is not input, the control proceeds to step S443 in which guidance information for prompting the user to input the designation number or the demanded bearing life period $L_D$ is transmitted to the information processing apparatus of the user, and then returns to step S419.

Next, the operation of the second embodiment will be described.

It is assumed that the user accesses the WWW server 202 through the Internet 200. First, a user registration input screen for inputting the user account information and the password is displayed. If the user is a registered user, the user can input the user account information and the password into the user registration input screen, thereby enabling the bearing selecting process to be performed. In the case where the user is an unregistered user, when predetermined items are input into the user registration screen, the user is registered, and user account information and a password are set, thereby enabling the bearing selecting process to be performed.

In the bearing selecting process, first, the bearing kind input screen shown in FIG. 32 is displayed. In the bearing kind input screen, a ball bearing or a roller bearing is selected as an essential input item, and a radial bearing or a thrust bearing is selected. Since the column designation is an optional item, it is not necessary to perform the column designation.

When, after selection of the essential items is completed, the next button 216 is selected, the input screen for inputting a desired delivery time and a desired cost is displayed. When they are necessary, one or both of the desired delivery time and the desired cost are input, and, when they are not necessary, the input operation is skipped.

Next, the data information input screen shown in FIG. 33 is displayed. In the data information input screen, when the bearing type such as a deep groove ball bearing, an angular ball bearing, a cylindrical roller bearing, or a self-aligning roller bearing has been determined and the life period $L_A$ of a bearing the designation number of which has been determined is to be known, at least the load P/C acting on the bearing, the bearing rotation number, the operating temperature, and the lubricant kind which are essential input items of operation condition are input. In the case where the operating viscosity ν, the contamination degree coefficient $a_c$, and the specification of the bearing material have not yet been input, oil: ISO VG68 is set when oil only is designated as the lubricant, or grease: NS7 is set when grease only is designated. When the contamination degree coefficient $a_c$ has not yet been input, $a_c = 0.5$ is set. When the specification of the bearing material has not yet been input, SUJ2 is set.

When the input of operation condition is completed and the calculation button 222 is selected, calculations similar to those of the first embodiment to calculate the lubrication parameter κ, the load parameter $\{(P-Pu)/C\} \cdot 1/a_c$, and the life correction coefficient $a_{NSK}$, and the rolling bearing life period $L_A$ is calculated on the basis of the calculated parameters and coefficient. The calculated rolling bearing life period $L_A$ is output through the display device 3 or the printer 6.

When optimum operation condition is to be known, the bearing designation number and the demanded bearing life period $L_D$ are input into the data information input screen of FIG. 33.

When "16306" is input as the bearing designation number, "5000 hr" is input as the demanded bearing life period $L_D$, and the calculation button 222 is selected, operation condition is set in the following manner. An assumed value P/C=0.1 (P=2,670 N) is set as the load acting on the bearing, 5,000 rpm is set as an assumed value of the bearing rotation number, 70° C. is set as that of the operating temperature, ISO VG68 is set as that of the lubricant, 0.5 is set as that of the contamination degree coefficient $a_c$.

When a life calculating process similar to that of the first embodiment is performed based on the condition, the load parameter $\{(P-Pu)/C\}\cdot 1/a_c=0.14$, the lubrication parameter $\kappa=2.24$, and the life correction coefficient $a_{NSK}=25.57$ are calculated, and the bearing life period $L_A=85,243$ hours is calculated on the basis of the calculated parameters and coefficient.

The bearing life period $L_A$ is 1.7 times longer than the demanded bearing life period $L_D=50,000$ hours, and longer than $L_D \times 1.1=55,000$ hours. Therefore, the assumed value of the load P/C acting on the bearing is changed to P/C=0.125 (P=3,337.5), and the life predicting calculation is again performed on the basis of the new assumed value. As a result, the bearing life period $L_A=23,286$ hours is calculated. The bearing life period $L_A$ is shorter than the demanded bearing life period $L_D=50,000$ hours, and also than $L_D \times 0.9=45,000$ hours. Therefore, the assumed value of the load P/C acting on the bearing is changed to P/C=0.11 (P=2,937 N), and the life predicting calculation is again performed on the basis of the new assumed value. As a result, the bearing life period $L_A=48,116$ hours is calculated. The bearing life period $L_A$ is shorter than the demanded bearing life period $L_D=50,000$ hours, but longer than $L_D \times 0.9=45,000$ hours and within an allowable range. Therefore, the load P/C acting on the bearing is changed to a convenient value or P=2,900 N, and the life predicting calculation is again performed. As a result, the bearing life period $L_A=51,832$ hours is calculated. This life period satisfies the demanded bearing life period $L_D=50,000$ hours.

Therefore, an answer screen is displayed on the display device 3. In the screen, the operation condition including the bearing designation number "6306", the load P/C acting on the bearing P=2,900 N, the bearing rotation number: 5,000 rpm, the operating temperature: 70° C., the lubricant: ISO VG68, and the contamination degree coefficient $a_c$=0.5, and the bearing life period $L_A$=51,832 hours are displayed, and an estimated amount and a delivery time of the bearing are displayed.

Figure 34:
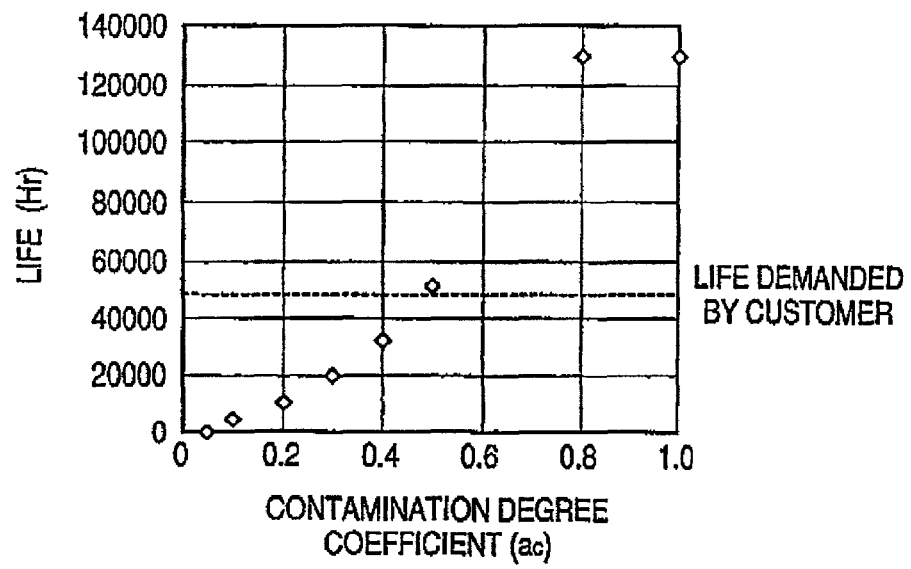
FIGS. 34(a) and 34(b) are views showing graphs in which relationships between a life period, and the contamination degree coefficient and the bearing load are displayed in a parametric manner.
Figure 34:
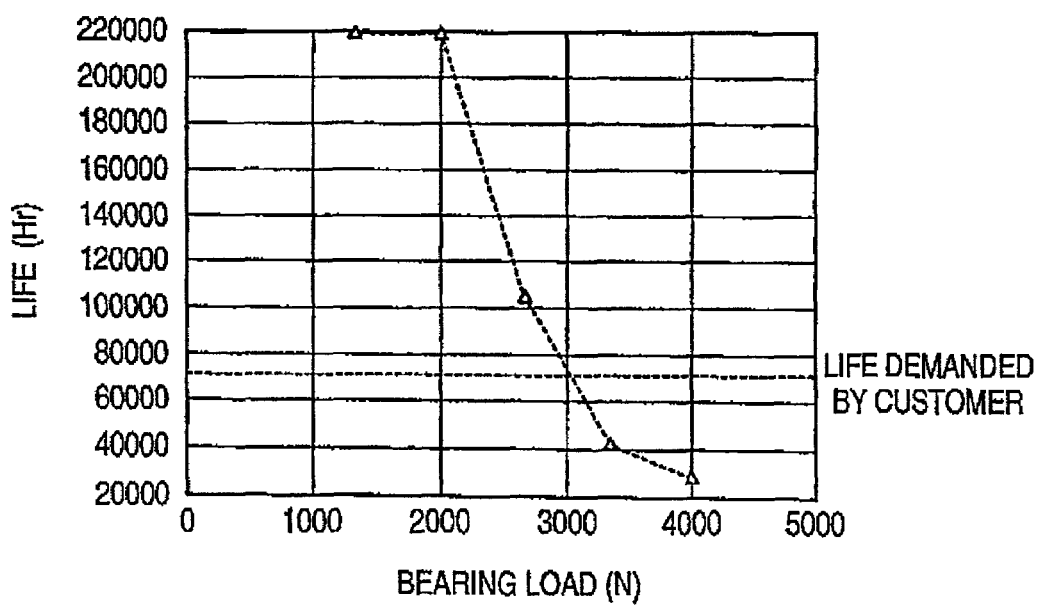

In place of the answer screen displaying the values, a graph in which, as shown in FIG. 34A, the ordinate indicates the life period, the abscissa indicates the contamination degree coefficient $a_c$, and relationships between the life period $L_A$ and the demanded life period $L_D$ in the case of the contamination degree coefficient $a_c$ of 0.05, 0.1, 0.2, 0.4, 0.5, 0.8, and 1 are shown in a parametric manner, and a graph in which, as shown in FIG. 34B, the ordinate indicates the life period, the abscissa indicates the bearing load P, and relationships between the life period $L_A$ and the demanded life period $L_D$ in the case of the bearing load P of 2,000 N, 2,670 N, 3337.5 N, and 4,000 N are shown in a parametric manner may be displayed. In this case, the user can easily know a limit value which satisfies the demanded life period $L_D$.

The case where, while designating operation condition and the demanded life period $L_D$, an optimum bearing of an inner diameter of 30 mm is to be known will be considered. When the bearing kind is set as a ball bearing and a radial bearing is set, "6306" is assumed as the designation number of a usual deep groove ball bearing. A life predicting calculation is performed on the deep groove ball bearing to calculate the bearing life period $L_A$. Designation numbers "6906", "6006", "6206", and "6306" which are 47, 55, 62, and 72, respectively in outer diameter of the bearing size are sequentially assumed, whereby a bearing designation number in which the calculated life period is within an allowable range with respect to the demanded life period $L_D$ is selected as an optimum bearing.

In the second embodiment described above, the bearing selection program is installed into the WWW server 202. The invention is not restricted to this. Alternatively, the bearing selection program may be installed into a server connected to a local area network, and an information processing terminal such as a personal computer may access the server through the local area network.

In the second embodiment described above, the user registration is performed in the WWW server 202. The invention is not restricted to this. Alternatively, the user registration may be performed by mail or using a facsimile apparatus.

In the second embodiment described above, the bearing selection application program is installed into the hard disk of the WWW server 202. The invention is not restricted to this. Alternatively, the program may be stored into a storage medium other than a hard disk, such as a compact disk (CD) or a magnetooptical disk (MO), and carried or installed into another information processing apparatus.

While only certain embodiments of the invention have been specifically described herein, it will apparent that numerous modifications may be made thereto without departing from the spirit and scope of the invention.

What is claimed is:

1. A method of using a computer to predict a life of a rolling bearing having a specification which a basic dynamic load rating C and a basic static load rating $C_0$ are calculable, wherein, when a dynamic equivalent load is P, a load index is p, a viscosity ratio of a lubricant is $\kappa$, a contamination degree coefficient is $a_c$, a fatigue limit load is Pu, and a life correction coefficient is $a_{NSK}$, causing the computer to calculate a correction rating life $L_A$ of the rolling bearing at a certain reliability coefficient $a_1$ by the following relations:

$$L_A = a_1 \cdot a_{NSK} \cdot (C/P)^p$$

$$a_{NSK} \propto f[F(\kappa), \{(P-Pu)/C\}\cdot 1/a_c];$$

wherein a function $F(\kappa)$ of the viscosity ratio $\kappa$ is set as a lubrication parameter $a_L$, and wherein the life correction coefficient $a_{NSK}$ is calculated on the basis of the lubrication parameter $a_L$ and a load parameter $\{(P-Pu)/C\}\cdot 1/a_c$.

2. The method according to claim 1, wherein a material coefficient $a_m$ is applied to the contamination degree coefficient $a_c$ as a degree of influence of steel at which the life is prolonged by a component of the steel and a heat treatment; and the contamination degree coefficient $a_c$ is set in view of a material coefficient $a_m$ as a of influence of steel at which the life is prolonged by a component of the steel and a heat treatment.

3. An apparatus for predicting a life of a rolling bearing having a specification which a basic dynamic load rating C and a basic static load rating $C_0$ are calculable, comprising:

a data information inputting means for inputting data information including the basic dynamic load rating C and the basic static load rating $C_0$ of said rolling bearing;

a dynamic equivalent load calculating means for calculating a dynamic equivalent load on the basis of the data information input by said data information inputting means;

a reliability setting means for setting a reliability coefficient;

a lubrication parameter calculating means for calculating a lubrication parameter on the basis of the inputting data information;

a contamination degree setting means for setting a contamination degree;

a fatigue limit load calculating means for calculating a fatigue limit load;

a load parameter determining means for determining a load parameter on the basis of the basic dynamic load, the dynamic equivalent load, the fatigue limit load, and the contamination degree coefficient;

a life correction coefficient setting means for setting a life correction coefficient on the basis of the lubrication parameter and the load parameter, and a bearing life calculating means for calculating the life of the bearing on the basis of the reliability coefficient the life correction coefficient the basic dynamic load rating; the dynamic equivalent load, and a load index.

4. The apparatus according to claim 3, wherein said contamination degree setting means sets a contamination degree coefficient in view of a material coefficient as a degree of influence of steel at which the life is prolonged by a component of the steel and a heat treatment.

5. The apparatus according to claim 4, wherein said life correction coefficient setting means calculates the life correction coefficient on the basis of the load parameter and the lubrication parameter and with reference to a life correction coefficient calculation map which indicates relationships among values of the parameter and the life correction coefficient with using the lubrication parameter as a parameter.

6. The apparatus according to claim 3, wherein said lubrication parameter calculating means calculates a viscosity ratio κ which is a ratio of a kinematic viscosity ν of a used lubricant at an operating temperature to a required viscosity $v_1$ at the operating temperature, from an operating kinematic viscosity ν of the used lubricant, a mean diameter dm of said bearing, and a rotation number of said bearing.

7. The apparatus according to claim 6, wherein said life correction coefficient setting means calculates the life correction coefficient on the basis of the load parameter and the lubrication parameter and with reference to a life correction coefficient calculation map which indicates relationships among values of the parameters and the life correction coefficient with using the lubrication parameter as a parameter.

8. The apparatus according to claim 3, wherein said life correction coefficient setting means calculates the life correction coefficient on the basis of the load parameter and the lubrication parameter and with reference to a life correction coefficient calculation map which indicates relationships among values of the parameter and the life correction coefficient with using the lubrication parameter as a parameter.

9. The apparatus according to claim 3, further comprising:

an exhibiting means for exhibiting the life of the bearing which is calculated by said bearing life calculating means.

10. An apparatus for predicting a life of a rolling bearing having a specification which a basic dynamic load rating C and a basic static load rating $C_0$ are calculable, comprising:

a data information inputting means for inputting data information including the basic dynamic load rating C and the basic static load rating $C_0$ of said rolling bearing;

a dynamic equivalent load calculating means for calculating a dynamic equivalent load on the basis of the data information input by said data information inputting means;

a reliability setting means for setting a reliability coefficient;

a lubrication parameter calculating means for calculating a lubrication parameter on the basis of the inputting data information;

a contamination degree setting means for setting a contamination degree;

a fatigue limit load calculating means for calculating a fatigue limit load;

a load parameter determining means for determining a load parameter on the basis of the basic dynamic load, the dynamic equivalent load, the fatigue limit load, and the contamination degree coefficient;

a life correction coefficient setting means for setting a life correction coefficient on the basis of the lubrication parameter and the load parameter;

a bearing life calculating means for calculating the life of the bearing on the basis of the reliability coefficient the life correction coefficient the basic dynamic load rating, the dynamic equivalent load, and a load index; and a recalculation judging means for judging whether, when a calculation result of said bearing life calculating means fails to coincide with a desired life, a recalculation for making the calculation result coincident with the desired life is required or not.

11. The apparatus according to claim 10, wherein said contamination degree setting means sets a contamination degree coefficient in view of a material coefficient saving as a degree of influence of steel at which the life is prolonged by a component of the steel and a heat treatment.

12. The apparatus according to claim 11, wherein said life correction coefficient setting means calculates the life correction coefficient on the basis of the load parameter and the lubrication parameter and with reference to a life correction coefficient calculation map which indicates relationship among values of the parameter and the life correction coefficient with using the lubrication parameter as a parameter.

13. The apparatus according to claim 10, wherein said lubrication parameter calculating means calculates a viscosity ratio κ which is a ratio of a kinematic viscosity ν of a used lubricant at an operating temperature to a required viscosity $v_1$ at the operating temperature, from an operating kinematic viscosity ν of the used lubricant, a mean diameter dm of said bearing, and a rotation number N of said bearing.

14. The apparatus according to claim 13, wherein said life correction coefficient setting means calculates the life correction coefficient on the basis of the load parameter and the lubrication parameter and with reference to a life correction coefficient calculation map which indicates relationships among values of the parameter and the life correction coefficient with using the lubrication parameter as a parameter.

15. The apparatus according to claim 10, wherein said life correction coefficient setting means calculates the life correction coefficient on the basis of the load parameter and the lubrication parameter and with reference to a life correction coefficient calculation map which indicates relationships among values of the parameters and the life correction coefficient with using the lubrication parameter as a parameter.

16. The apparatus according to claim 10, further comprising:
an exhibiting means for exhibiting the life of the bearing which is calculated by said bearing life calculating means.

17. A rolling bearing selection apparatus using an apparatus for predicting a life of a rolling bearing comprising:
a bearing kind inputting means for inputting a bearing kind which is desired by user;
a data information inputting means for inputting necessary data information other than required data information required by the user, from necessary data information including the basic dynamic load rating C and the basic static load rating $C_0$ of said rolling bearing;
a data information assuming means for comparing the required data information which is input by said data information inputting means with said necessary data information, and assuming data information which is not input;
said life predicting apparatus for predicting a life of a rolling bearing according to claim 4 which performs calculation of predicting the bearing life on the basis of the data information which is input by said data information inputting means and the data information which is assumed by said data information assuming means;
a judging means for judging whether a calculation result of said life predicting apparatus satisfies the data information which is input by said data information inputting means or not;
a data information exhibiting means for, when a judgement result of said judging means indicates that the calculation result satisfies the data information, exhibiting the data information which is set by said data information assuming means; and
a recalculating means for, when the judgement result of said judging means indicates that the calculation result does not satisfy the data information, changing the data information which is assumed by said data information assuming means, and causing said life predicting apparatus to again perform the calculation.

18. The rolling bearing selection apparatus according to claim 17, wherein at least one of said data information inputting means, said data information assuming means, said life predicting apparatus, said judging means, said data information exhibiting means, and said recalculating means is accessible through an Internet.

19. The rolling bearing selection apparatus according to claim 18, further comprising:
a user registration accepting means for accepting user registration through the Internet,
wherein only a user who is registered in said user registration accepting means is allowed to access at least one of said data information inputting means, said data information assuming means, said life predicting apparatus, said judging means, said data information exhibiting means, and said recalculating means, through the Internet.

20. The rolling bearing selection apparatus according to claim 18, wherein a language which is handled in said data information inputting means, said data information assuming means, said apparatus for predicting a life of a rolling bearing, said judging means, said data information exhibiting means, and said recalculating means is selectable.

21. The rolling bearing selection apparatus according to claim 17, wherein said data information exhibiting means performs at least one of exhibition of prediction of the life of the rolling bearing, exhibition of an optimum bearing, and exhibition of optimum service condition.

22. The rolling bearing selection apparatus according to claim 17, wherein said data information exhibiting means exhibits at least one of prediction of the life of the rolling bearing, an optimum bearing, and optimum service condition, as image information in which a parameter is changeable.

23. The rolling bearing selection apparatus according to claim 22, wherein the image information is displayed as a characteristic diagram in which one axis indicates a predicted value of the life, and another axis indicates one selected from a bearing size, a bearing load, a rotation speed, a kind of a lubricant; a degree of contamination, a service, a material kind, and a reliability coefficient.

24. The rolling bearing selection apparatus according to claim 17, further comprising:
a delivery information exhibiting means for exhibiting at least one of a delivery time and an estimated amount of the rolling bearing based on the data information exhibited by said data information exhibiting means.

25. A computer-readable storage medium storing a life prediction computer program product embodied thereon for predicting a life of a rolling bearing having a specification which a basic dynamic load rating C and a basic static load rating $C_0$ are calculable,
said computer program product comprising code that when executed, causes a computer to perform the following:
inputting data information including the basic dynamic load rating C and the basic static load rating $C_0$ of said rolling bearing;
calculating a dynamic equivalent load on the basis of the data information which is input in said data information inputting step;
setting a reliability coefficient;
calculating a lubrication parameter on the basis of the data information;
setting a contamination degree;
calculating a fatigue limit load;
determining a load parameter on the basis of the basic dynamic load, the dynamic equivalent load, the fatigue limit load, and the contamination degree;
setting a life correction coefficient on the basis of the lubrication parameter and the load parameter; and
calculating the life of the bearing on the basis of the reliability coefficient the life correction coefficient the basic dynamic load rating, the dynamic equivalent load, and a load index.

26. A computer-readable storage medium storing a life prediction computer program product embodied thereon for predicting a life of a rolling bearing having a specification which a basic dynamic load rating C and a basic static load rating $C_0$ are calculable,
said computer program product comprising code that, when executed, causes a computer to perform the following:
inputting data information including the basic dynamic load rating C and the basic static load rating $C_0$ of said rolling bearing;

calculating a dynamic equivalent load on the basis of the data information which is input in said data information inputting step;
setting are liability coefficient;
calculating a lubrication parameter on the basis of the data information;
setting a contamination degree;
calculating a fatigue limit load;
determining a load parameter on the basis of the basic dynamic load, the dynamic equivalent load, the fatigue limit load, and the contamination degree;
setting a life correction coefficient on the basis of the lubrication parameter and the load parameter;
calculating the life of the bearing on the basis of the reliability coefficient, the life correction coefficient, the basic dynamic load rating, the dynamic equivalent load, and a load index; and
judging whether, when a calculation result of said bearing life fails to coincide with a desired life, a recalculation for making the calculation result coincident with the desired life is required or not.

27. A storage medium storing a bearing selection program for selecting a rolling bearing according to a specification required by a user, said program executing the steps of:

inputting a bearing kind which is desired by the user;
inputting necessary data information other than required data information required by the user, from necessary data information including the basic dynamic load rating C and the basic static load rating $C_0$ of said rolling bearing;
comparing the required data information with the necessary data information to assume data information which is not input;
predicting a life by using the life prediction program according to claim 26 on the basis of the required data information and assumed data information other than the required data information;
judging whether a result of the life prediction satisfies the required data information or not;
exhibiting the assumed data information as bearing selection information, when the life prediction result satisfies the required data information; and,
changing the assumed data information, and causing said life prediction program to again perform the calculation, when the life prediction result does not satisfy the required data information.

\* \* \* \* \*